United States Patent
Yokoyama et al.

(10) Patent No.: US 8,976,271 B2
(45) Date of Patent: Mar. 10, 2015

(54) OPTICAL SYSTEM AND IMAGE PICKUP APPARATUS

(71) Applicant: Canon Kabushiki Kaisha, Tokyo (JP)

(72) Inventors: Takayoshi Yokoyama, Utsunomiya (JP); Arata Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 13/941,991

(22) Filed: Jul. 15, 2013

(65) Prior Publication Data

US 2014/0022417 A1    Jan. 23, 2014

(30) Foreign Application Priority Data

Jul. 19, 2012 (JP) .................................. 2012-160421
Jul. 19, 2012 (JP) .................................. 2012-160422

(51) Int. Cl.
| | |
|---|---|
| H04N 5/262 | (2006.01) |
| H04N 5/232 | (2006.01) |
| G03B 13/00 | (2006.01) |
| G02B 15/14 | (2006.01) |
| G02B 15/173 | (2006.01) |

(52) U.S. Cl.
CPC ............ *G02B 15/14* (2013.01); *H04N 5/23296* (2013.01); *G02B 15/173* (2013.01)
USPC ...................... 348/240.99; 348/345

(58) Field of Classification Search
None
See application file for complete search history.

(56) References Cited

U.S. PATENT DOCUMENTS

2010/0225759 A1* 9/2010 Mathieu ................... 348/143

FOREIGN PATENT DOCUMENTS

| JP | 2005-509333 A | 4/2005 |
| JP | 2010-56992 A | 3/2010 |
| JP | 2011-028166 A | 2/2011 |
| WO | 03-007239 | 1/2003 |

* cited by examiner

*Primary Examiner* — Albert Cutler
(74) *Attorney, Agent, or Firm* — Carter, DeLuca, Farrell & Schmidt, LLP

(57) ABSTRACT

The optical system capable of performing zooming includes a first lens unit and a second lens unit and satisfies conditions of $|(\Delta TMyu+\Delta TMyl)/(\Delta WMyu+\Delta WMyl)|<0.67$ and $0.75<|(\Delta WMyu+\Delta WMyl)|/2P<16.0$. $\Delta WMyu$ represents a lateral aberration amount for a d-line of a 70 percent upper ray reaching an 80 percent image height at a wide-angle side middle focal length, $\Delta WMyl$ represents a lateral aberration amount for the d-line of a 70 percent lower ray reaching the 80 percent image height at the wide-angle side middle focal length, $\Delta TMyu$ represents a lateral aberration amount for the d-line of the 70 percent upper ray reaching the 80 percent image height at a telephoto side middle focal length, $\Delta TMyl$ represents a lateral aberration amount for the d-line of the 70 percent lower ray reaching the 80 percent image height at the telephoto side middle focal length, and P represents a pixel pitch of the image sensor.

15 Claims, 32 Drawing Sheets

OPTICAL SYSTEM AND IMAGE PICKUP APPARATUS

BACKGROUND OF THE INVENTION

1. Field of the Invention

The present invention relates to an optical system used for image pickup apparatuses such as digital still cameras and video cameras, and particularly to an optical system suitable for a case where an image restoration process is performed on an image produced by image capturing.

2. Description of the Related Art

Images obtained by capturing an object through optical apparatuses such as digital cameras and interchangeable lenses include a blur component as an image degradation component caused by various aberrations of an image capturing optical system (hereinafter simply referred to as "an optical system"), such as spherical aberration, coma aberration, field curvature and astigmatism. Such a blur component is generated because a light flux emitted from one point of an object forms an image with some divergence on an image pickup surface, the light flux being normally converged at one point if there is no aberration or diffraction.

The blur component herein is optically expressed as a point spread function (PSF), which is different from blur caused by defocusing. Moreover, color blur in a color image caused due to longitudinal chromatic aberration, chromatic spherical aberration or chromatic coma aberration of the optical system can be said to be a difference between blurring degrees of respective light wavelengths. In addition, horizontal color shift caused by chromatic aberration of magnification of the optical system can be said to be position shift or phase shift of color light components caused by differences of image capturing magnifications for the respective color light components.

An optical transfer function (OTF) obtained by performing Fourier transform on the point spread function (PSF) is frequency component information of aberration, which is expressed by complex number. An absolute value of the optical transfer function (OTF), that is, an amplitude component is called a modulation transfer function (MTF), and a phase component is called a phase transfer function (PTF). The MTF and PTF are respectively a frequency characteristic of the amplitude component and a frequency characteristic of the phase component of image degradation caused by the aberration. The phase component is herein shown as a phase angle by the following expression where Re(OTF) and Im(OTF) respectively represent a real part and an imaginary part of the OTF.

$$PTF=\tan^{-1}(Im(OTF)/Re(OTF))$$

Thus, the optical transfer function (OTF) of the optical system degrades the amplitude component and the phase component of the image. Respective points of the object in the degraded image are asymmetrically blurred like coma aberration.

Moreover, the chromatic aberration of magnification is generated in an image pickup apparatus that captures, according to its spectral characteristics, color components such as R, G and B whose imaging positions are mutually shifted due to differences of imaging magnifications of its optical system for respective light wavelengths. Therefore, not only the shift of the imaging positions among the color components is generated, but also shift of imaging positions among wavelengths in each color component, that is, image spread due to the phase shift is generated. Thus, although, strictly speaking, the chromatic aberration of magnification is not merely a color shift that is parallel shift of colors, this specification treats the color shift as the chromatic aberration of magnification.

As a method for correcting such degradation of the amplitude component (MTF) and degradation of the phase component (PTF) in the degraded image (input image), there is known a method using information on the optical transfer function (OTF) of the optical system. This method is referred to as "image restoration" or "image recovery", and a process for correcting the degraded image by using the information on the optical transfer function (OTF) of the optical system is hereinafter referred to as "an image restoration process" or simply "image restoration". As one of the image restoration processes, a convolution method that performs convolution of an image restoration filter having an inverse characteristic to the optical transfer function on an input image in a real space (see Japanese Unexamined Patent Application Publication (Translation of PCT Application) No. 2005-509333). Moreover, Japanese Patent Laid-Open No. 2010-56992 discloses a method of performing the image restoration process on an input image with filter coefficients held for correcting degradation of the input image.

On the other hand, it is generally difficult to decrease variation of aberration of an optical system due to variation of object distance. Therefore, emphasis on optical performance in a state where the optical system is focused on an infinite object distance is likely to deteriorate the aberration in a state where the optical system is focused on a closest object distance. Japanese Patent Laid-Open No. 2011-028166 discloses a method of providing a desired resolution (MTF width) by generating spherical aberration in order to perform good image restoration on an image obtained by image capturing of objects whose distances are mutually different.

When premising that the image restoration is performed, some aberration of an optical system is allowed, which enables downsizing of the optical system, higher magnification thereof and higher image quality over an entire object distance range. In other words, correcting, by using the image restoration image, degradation generated due to increase of refractive powers of respective lens units constituting the optical system in order to decrease its size, increase its magnification and improve image quality over the entire object distance range enables higher quality image while achieving downsizing of the optical system and higher magnification thereof.

However, an excessive strength of the image restoration emphasizes a noise component included in the degraded image. Moreover, an excessive allowable aberration amount for the optical system makes it impossible to sufficiently correct the image degradation by the image restoration. For example, an excessive field curvature causes tilt of an image plane on an image sensor even though there is a little manufacturing error of lenses constituting the optical system or a little tilt of the image sensor, which significantly causes an "uneven blur" which is asymmetry of resolving power. In this case, it is impossible to correct the image degradation well by the image restoration.

Therefore, in order to achieve the decreases in size of the optical system, the increase in magnification thereof and the improvement in image quality over the entire object distance range on the premise that the image restoration is performed, it is necessary to consider generation of appropriate aberration for the image restoration. Japanese Unexamined Patent Application Publication (Translation of PCT Application) No. 2005-509333 and Japanese Patent Laid-Open Nos. 2010-56992 and 2011-028166 do not disclose such appropriate aberration for the image restoration at all.

BRIEF SUMMARY OF THE INVENTION

The present invention provides an optical system appropriate for downsizing, higher magnification and higher image quality over the entire object distance range on the premise that the image restoration is performed, and provides an image pickup apparatus performing the image restoration on an image produced by image capturing through the optical system.

The present invention provides as one aspect thereof an optical system capable of performing variation of magnification. The optical system includes, in order from an object side to an image side, a first lens unit and a second lens unit. At least one of the first and second lens units is moved during the variation of magnification. The optical system forms an optical image on an image sensor provided in an image pickup apparatus. The optical system satisfies the following conditions:

$$|(\Delta TMyu+\Delta TMyl)/(\Delta WMyu+\Delta WMyl)|<0.67$$

$$0.75<|(\Delta WMyu+\Delta wMyl)|/2P<16.0$$

where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and, among meridional rays passing through the optical system, an upper ray and a lower lay each passing through a position corresponding to 70 percent of an effective light flux diameter are respectively referred to as a 70 percent upper ray and a 70 percent lower ray, ΔWMyu represents a lateral aberration amount for a d-line of the 70 percent upper ray reaching the 80 percent image height at the wide-angle side middle focal length, ΔWMyl represents a lateral aberration amount for the d-line of the 70 percent lower ray reaching the 80 percent image height at the wide-angle side middle focal length, ΔTMyu represents a lateral aberration amount for the d-line of the 70 percent upper ray reaching the 80 percent image height at the telephoto side middle focal length, ΔTMyl represents a lateral aberration amount for the d-line of the 70 percent lower ray reaching the 80 percent image height at the telephoto side middle focal length, P represents a pixel pitch of the image sensor, and when fw represents a focal length of the optical system at the wide-angle end, ft represents a focal length of the optical system at the telephoto end, and fm=√(fw×ft), the wide-angle side middle focal length fwm is expressed as fwm=√(fw×fm), and the telephoto side middle focal length ftm is expressed as ftm=√(fm×ft).

The present invention provides as another aspect thereof an optical system capable of performing variation of magnification. The optical system includes, in order from an object side to an image side, a first lens unit and a second lens unit. At least one of the first and second lens units is moved during the variation of magnification. The optical system forms an optical image on an image sensor provided in an image pickup apparatus. The optical system satisfies the following conditions:

$$Stm/Swm<0.67$$

$$0.75<Swm/2P<16.0$$

where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and a diameter of a spot formed by a light flux included in an area up to 70 percent of an effective light flux diameter in a point image intensity distribution of a d-line at a position where an MTF in a meridional direction for the d-line passing through the optical system and then reaching the 80 percent image height becomes peak is referred to as a 70 percent spot diameter, Swm represents the 70 percent spot diameter at the wide-angle side middle focal length, Stm represents the 70 percent spot diameter at the telephoto side middle focal length, P represents a pixel pitch of the image sensor, and when fw represents a focal length of the optical system at the wide-angle end, ft represents a focal length of the optical system at the telephoto end, and fm=√(fw×ft), the wide-angle side middle focal length fwm is expressed as fwm=√(fw×fm), and the telephoto side middle focal length ftm is expressed as ftm=√(fm×ft).

The present invention provides as still another aspect thereof an optical system capable of an optical system capable of focusing on various object distances. The optical system includes a focus lens unit movable for focusing and another lens unit. The optical system forms an optical image on an image sensor provided in an image pickup apparatus. The optical system satisfies the following conditions in a case where an input image is produced by using output from the image sensor and an image restoration process is performed on the input image by using an image restoration filter having filter values corresponding to aberration of the optical system:

$$1<|\Delta yum+\Delta ylm|/|\Delta yui+\Delta yli|<12$$

$$2<|(\Delta yum+\Delta ylm)|/2p<6$$

where, when an image height corresponding to 80 percent of a maximum image height of the optical system is referred to as an 80 percent image height, and, among meridional rays passing thorough the optical system, an upper ray and a lower lay each passing through a position corresponding to 70 percent of an effective light flux diameter are respectively referred to as a 70 percent upper ray and a 70 percent lower ray, Δyum represents a lateral aberration amount for a d-line of the 70 percent upper ray reaching the 80 percent image height in a state where the optical system is focused on the middle object distance, Δylm represents a lateral aberration amount for the d-line of the 70 percent lower ray reaching the 80 percent image height in the state where the optical system is focused on the middle object distance, Δyui represents a lateral aberration amount for the d-line of the 70 percent upper ray reaching the 80 percent image height in a state where the optical system is focused on an infinite object distance, Δyli represents a lateral aberration amount for the d-line of the 70 percent lower ray reaching the 80 percent image height in the state where the optical system is focused on the infinite object distance, and p represents a pixel pitch of the image sensor, and when f represents a focal length of the entire optical system, and dl represents a diagonal length of the image sensor, the middle object distance is defined as (f/dl)×520.

The present invention provides as yet another aspect thereof an image pickup apparatus including an image sensor photoelectrically converting an object image formed by an optical system, and an image processor configured to perform an image restoration process on an input image input from the image sensor by using an image restoration filter having filter values corresponding to aberration of the optical system. The optical system is any one of the above optical systems.

Other aspects of the present invention will become apparent from the following description and the attached drawings.

DETAILED DESCRIPTION OF THE EMBODIMENTS

Figure 1A:
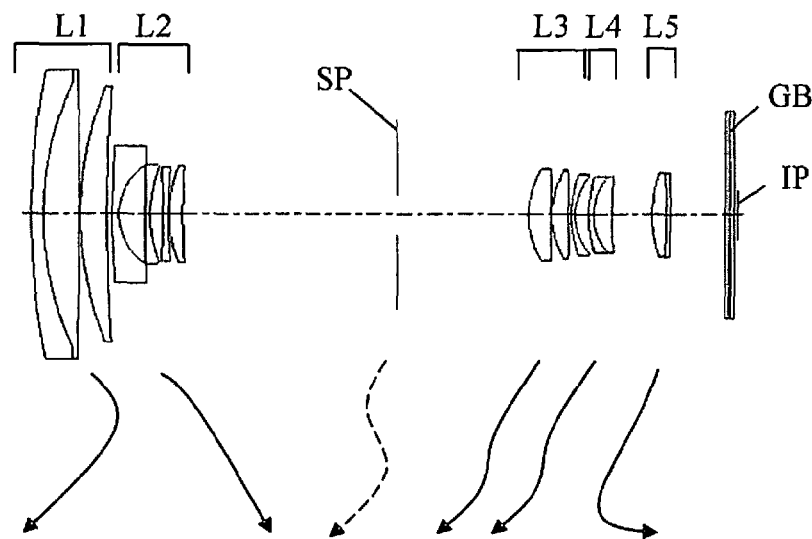
FIG. 1A is a sectional view of a zoom lens that is Embodiment 1 (Numerical Example 1) of the present invention at a wide-angle end.

Exemplary embodiments of the present invention will be described below with reference to the accompanied drawings.

First of all, prior to description of specific embodiments, description will be made of definition of terms to be used in the embodiments and an image restoration process performed in the embodiments.

"Input Image"

The input image is a digital image produced by image capturing performed by an image pickup apparatus, that is, by using output from an image sensor photoelectrically converting an object image formed by an image capturing optical system. The image sensor is constituted by a photoelectric conversion element such as a CCD sensor or a CMOS sensor. The digital image is degraded in response to an optical transfer function (OTF) of the image capturing optical system constituted by lenses and various optical filters. The optical transfer function includes information on aberration of the image capturing optical system. The image capturing optical system may be constituted by reflective surfaces such as mirrors each having curvature. Moreover, the image capturing optical system may be detachably attachable (interchangeable) to the image pickup apparatus. In the image pickup apparatus, the image sensor and a signal processor that produces the digital image (input image) by using the output from the image sensor constitute an image capturing system.

The input image has information on color components such as R, G and B components. The color components can be also expressed by, other than the RGB, an optionally selected one of general color spaces such as LCH (lightness, chroma and hue), YCbCr (luminance, blue color difference and red color difference), XYZ, Lab, Yuv and JCh, or can be expressed by color temperature.

The input image and a restored image (output image) can be provided with information on an image capturing condition in the image pickup apparatus at a time of producing the input image, the image capturing condition including a focal length and an aperture value of the image capturing optical system, an image capturing distance (object distance) and the like. The information on the image capturing condition is hereinafter referred to as "image capturing condition information". In addition, the input image can be provided with various correction information to be used for correction of the input image. When outputting the input image from the image pickup apparatus to an image processing apparatus separated therefrom and performing the image restoration process in the image processing apparatus, it is desirable to add the image capturing condition information and the correction information to the input image. The image processing apparatus can receive the image capturing condition information and the correction information from the image pickup apparatus not only by addition to the input image, but also through direct or indirect communication and through a storage medium detachably attachable to these apparatuses.

"Image Restoration Process"

The outline of the image restoration process is as follows. When g(x,y) represents an input image (degraded image) produced through image capturing performed by the image pickup apparatus, f(x,y) represents a non-degraded original image, h(x,y) represents a point spread function (PSF) that forms a Fourier pair with the optical transfer function (OTF), * represents convolution, and (x,y) represents coordinates in the input image, the following expression is established:

$$g(x,y)=h(x,y)*f(x,y).$$

Converting the above expression into a form of a two-dimensional frequency surface through Fourier transform provides the following expression of a form of a product for each frequency:

$$G(u,v)=H(u,v)\cdot F(u,v)$$

where H represents a result of the Fourier transform of the point spread function (PSF), in other words, the optical transfer function (OTF), G and F respectively represent results of the Fourier transform of g and h, and (u,v) represents coordinates on the two-dimensional frequency surface, in other words, a frequency.

Dividing both sides of the above expression by H as below provides the original image from the degraded image produced through the image capturing:

$$G(u,v)/H(u,v)=F(u,v)$$

Returning F(u,v), that is, G(u,v)/H(u,v) to a real surface by inverse Fourier transform provides a restored image equivalent to the original image f(x,y).

When R represents a result of the inverse Fourier transform of $H^{-1}$, performing a convolution process for an image in the real surface as represented by the following expression also enables provision of the original image:

$$g(x,y)*R(x,y)=f(x,y).$$

This R(x,y) in the above expression is an image restoration filter. When the input image is a two-dimensional image, the image restoration filter is generally also a two-dimensional filter having taps (cells) each corresponding to each of pixels of the two-dimensional image. Moreover, increase of the number of the taps (cells) in the image restoration filter generally improves image restoration accuracy, so that a realizable number of the taps is set depending on requested image quality, image processing capability, aberration characteristics of the image capturing optical system and the like.

Since the image restoration filter needs to reflect at least the aberration characteristics, the image restoration filter is different from a conventional edge enhancement filter (high-pass filter) or the like having about three taps in each of horizontal and vertical directions. The image restoration filter is produced based on the optical transfer function (OTF), which can highly accurately correct degradation of amplitude and phase components of the degraded image (input image).

Moreover, since an actual input image (degraded image) includes a noise component, use of an image restoration filter produced from the complete inverse number of the optical transfer function (OTF) as described above not only restores the degraded image, but also significantly amplifies the noise component. This is because such an image restoration filter raises a modulation transfer function (MTF), that is, an amplitude component of the image capturing optical system to 1 over an entire frequency range in a state where amplitude of the noise component is added to the amplitude component of the input image. Although the MTF corresponding to amplitude degradation by the image capturing optical system is returned to 1, power spectrum of the noise component is simultaneously raised, which results in amplification of the noise component according to a degree of raising of the MTF, that is, a restoration gain.

Therefore, the noise component included in the input image makes it impossible to provide a good restored image as an image for appreciation. Such raising of the noise component is shown by the following expressions where N represents the noise component:

$$G(u,v)=H(u,v)\cdot F(u,v)+N(u,v)$$

$$G(u,v)/H(u,v)=F(u,v)+N(u,v)/H(u,v)$$

As a method for solving such a problem, there is known, for example, a Wiener filter expressed by the following expression (1), which controls image restoration degree according to an intensity ratio (SNR) of an image signal and a noise signal.

$$M(u, v) = \frac{1}{H(u, v)} \frac{|H(u, v)|^2}{|H(u, v)|^2 + SNR^2} \quad (1)$$

In the above expression (1), M(u,v) represents a frequency characteristic of the Wiener filter, and |H(u,v)| represents an absolute value (MTF) of the optical transfer function (OTF). This method decreases, at each frequency, the restoration gain as the MTF is lower, in other words, increases the restoration gain as the MTF is higher. The MTF of general image capturing optical systems is high on a low frequency side and low on a high frequency side, so that the method resultantly suppresses the restoration gain on the high frequency side of the image signal.

Figures 16A, 16B:
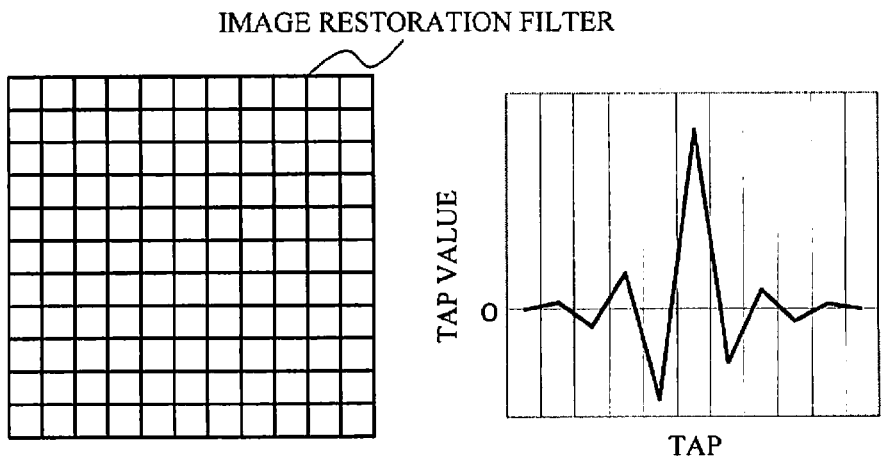
FIGS. 16A and 16B show an image restoration filter used in an image restoration process performed on an image captured through the zoom lens of each embodiment.

An example of the image restoration filter is shown in FIGS. 16A and 16B. For the image restoration filter, the number of the taps (cells) is decided corresponding to aberration characteristics of the image capturing optical system and required image restoration accuracy.

The image restoration filter shown in FIG. 16A is a two-dimensional filter having 11×11 taps. Although FIG. 16A omits values in the respective taps, FIG. 16B shows one cross section of this image restoration filter where values of the taps (in other words, filter values or filter coefficients, and hereinafter also referred to as "tap values") is shown by a polygonal line. A distribution of the tap values in the image restoration filter plays a role to return signal values (PSF) spatially spread due to the aberration to, ideally, one point.

The image restoration process performs convolution of each tap value of the image restoration filter on each pixel (corresponding to each tap) of the input image. In the convolution, in order to improve the signal value of a certain pixel in the input image, that pixel is matched to a center tap of the image restoration filter. Then, a product of the pixel signal value of the input image and the tap value of the image restoration filter is calculated for each corresponding pair of the pixel in the input image and the tap of the image restoration filter, and the signal value of the pixel corresponding to the center tap of the filter is replaced by a total sum of the products.

Figures 17A, 17B:
FIGS. 17A and 17B show correction of a point image by the image restoration process.
Figure 18A:
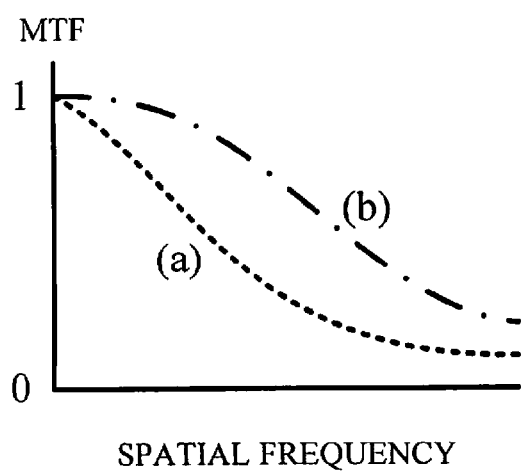
FIGS. 18A and 18B respectively show correction of amplitude and correction of phase by the image restoration process.
Figure 18B:
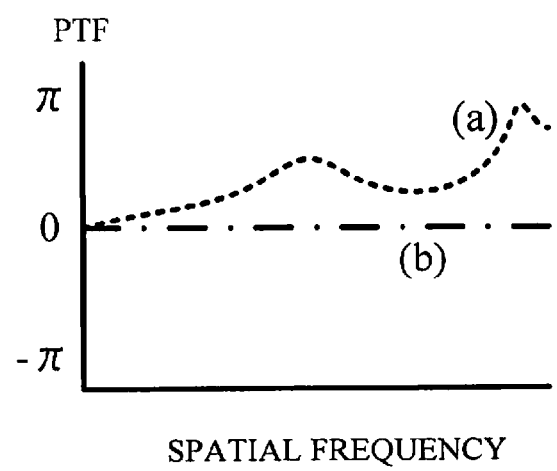

Characteristics of the image restoration in a real space and a frequency space will be described with reference to FIGS. 17A, 17B, 18A and 18B. FIG. 17A shows a PSF (point spread function) before the image restoration, and FIG. 17B shows a PSF after the image restoration. FIG. 18A shows (a) an MTF before the image restoration and (b) an MTF after the image restoration. FIG. 18B shows (a) a PTF (phase transfer function) before the image restoration and (b) a PTF after the image restoration. The PSF before the image restoration asymmetrically spreads, and the PTF changes non-linearly with frequency due to the asymmetry. The image restoration process amplifies the MTF and corrects the PTF to zero, so that the PSF after the image restoration becomes symmetric and sharp.

This image restoration filter can be obtained by inverse Fourier transform of a function designed on the basis of an inverse function of the optical transfer function (OTF) of the image capturing optical system. The image restoration filter used in the embodiments can be arbitrarily changed, and for example, the Wiener filter may be used as the image restoration filter. In the case of using the Wiener filter, the image restoration filter for the convolution on the input image in the real space can be produced by the inverse Fourier transform of the expression (1).

Moreover, since the optical transfer function (OTF) changes depending on image heights (positions in the input image) even though the image capturing condition is same, the image restoration filter to be used is changed depending on the image heights.

Description is hereinafter made of specific examples of zoom lenses as image capturing optical systems which are first to fifth embodiments (Embodiments 1 to 5) of the present invention. The zoom lens of each embodiment is capable of performing variation of magnification and achieves downsizing and higher magnification by generating appropriate aberration for correction of image degradation by the image restoration process.

FIGS. 1A, 4A, 7A, 11A and 13A are respectively sectional views of the zoom lenses of Embodiments 1 to 5 at a wide-angle end. Arrows drawn below respective lens units (L1 to L5) and an aperture stop (SP) show movements thereof in an optical axis direction during variation of magnification (hereinafter simply referred to as "zooming") from the wide-angle end to a telephoto end.

Figure 1B:
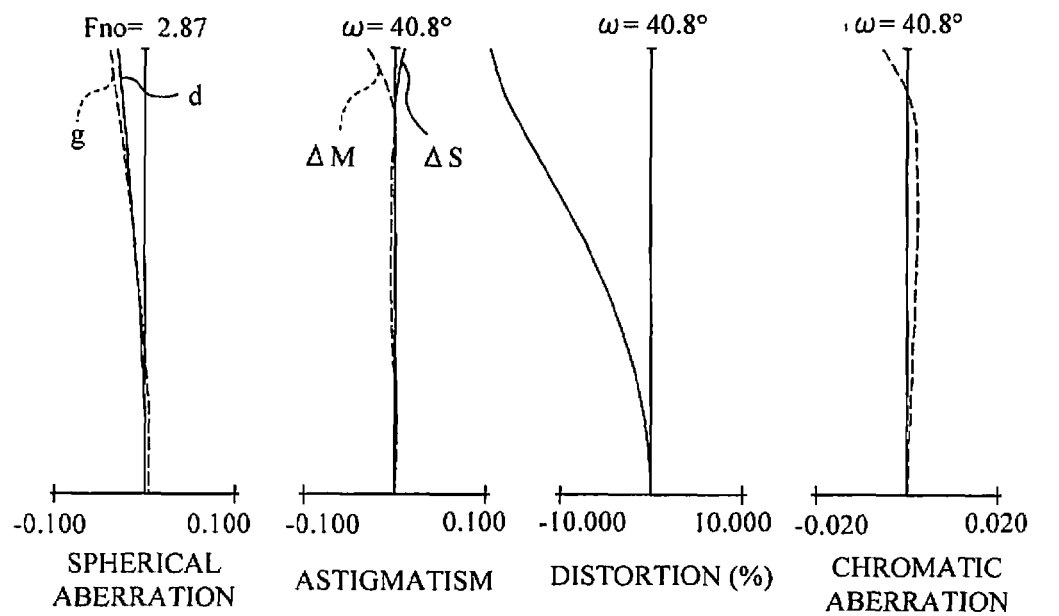
FIGS. 1B and 1C are longitudinal and lateral aberration charts of this zoom lens at the wide-angle end.
Figure 1C:
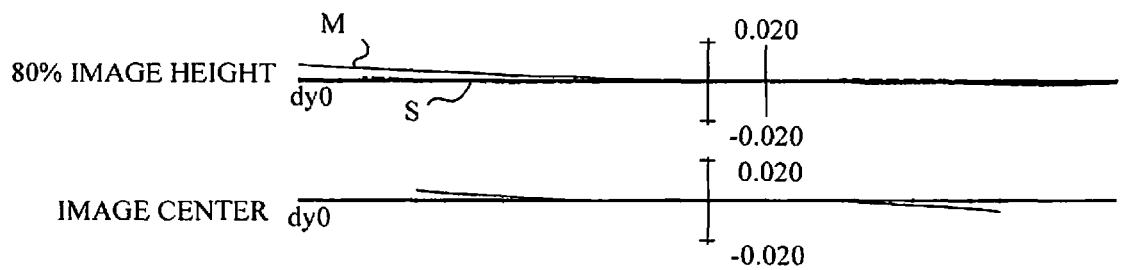
Figure 2A:
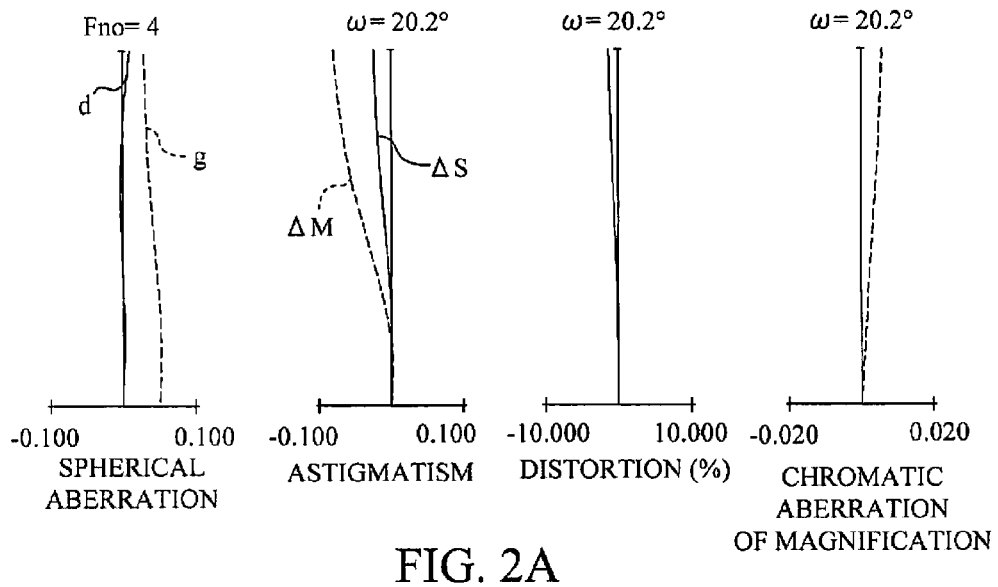
FIGS. 2A and 2B are longitudinal and lateral aberration charts of the zoom lens of Embodiment 1 at a wide-angle side middle focal length.
Figure 2B:
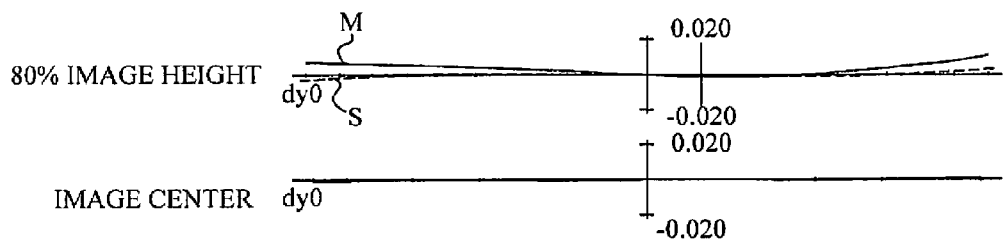
Figure 2C:
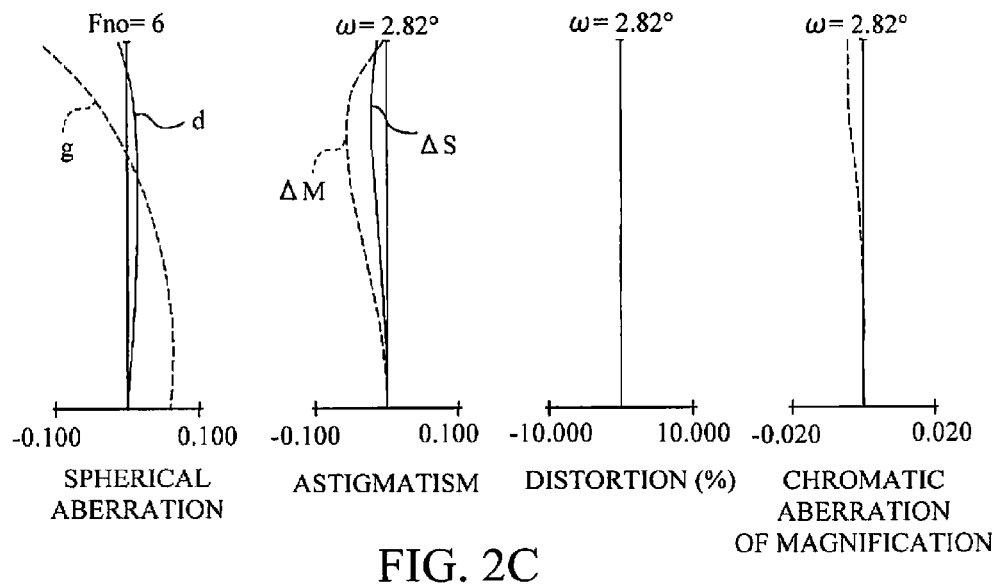
FIGS. 2C and 2D are longitudinal and lateral aberration charts of the zoom lens of Embodiment 1 at a telephoto side middle focal length.
Figure 2D:
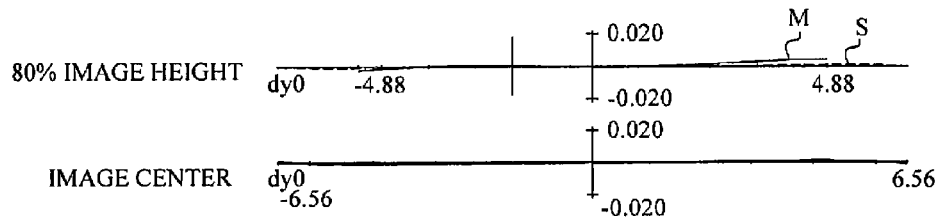
Figure 3A:
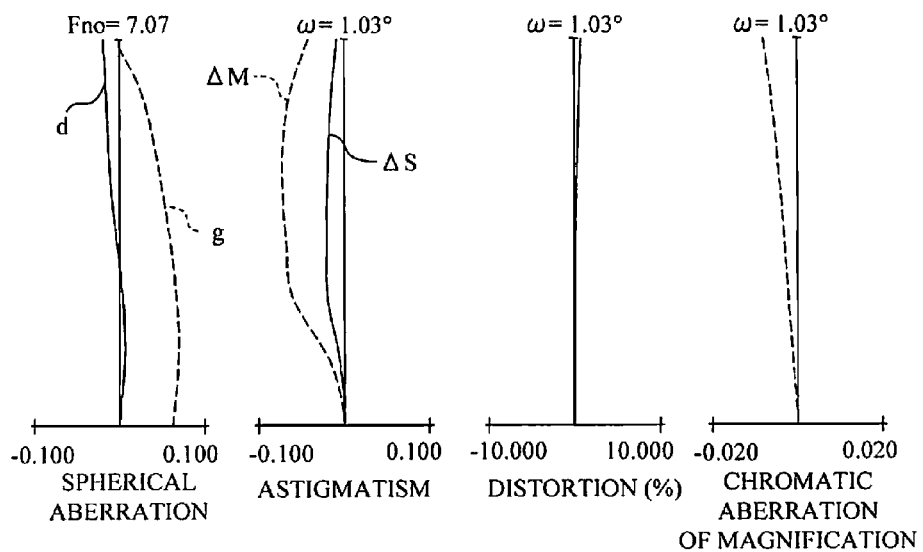
FIGS. 3A and 3B are longitudinal and lateral aberration charts of the zoom lens of Embodiment 1 at a telephoto end.
Figure 3B:
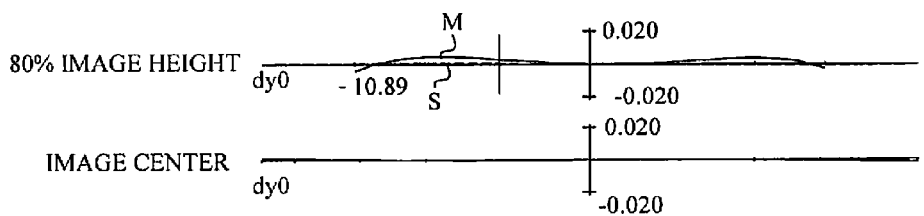

FIGS. 1B and 1C are longitudinal and lateral aberration charts of the zoom lens of Embodiment 1 at the wide-angle end. The longitudinal aberration charts show spherical aberration, astigmatism, distortion and chromatic aberration of magnification. The lateral aberration charts show lateral aberrations at an image center and at an 80 percent image height (described later). Moreover, FIGS. 2A and 2B are longitudinal and lateral aberration charts of the zoom lens of Embodiment 1 at a wide-angle side middle focal length. FIGS. 2C and 2D are longitudinal and lateral aberration charts of the zoom lens of Embodiment 1 at a telephoto side middle focal length. The wide-angle side and telephoto side middle focal lengths will be described later. Furthermore, FIGS. 3A and 3B are longitudinal and lateral aberration charts of the zoom lens of Embodiment 1 at the telephoto end.

Figure 4A:
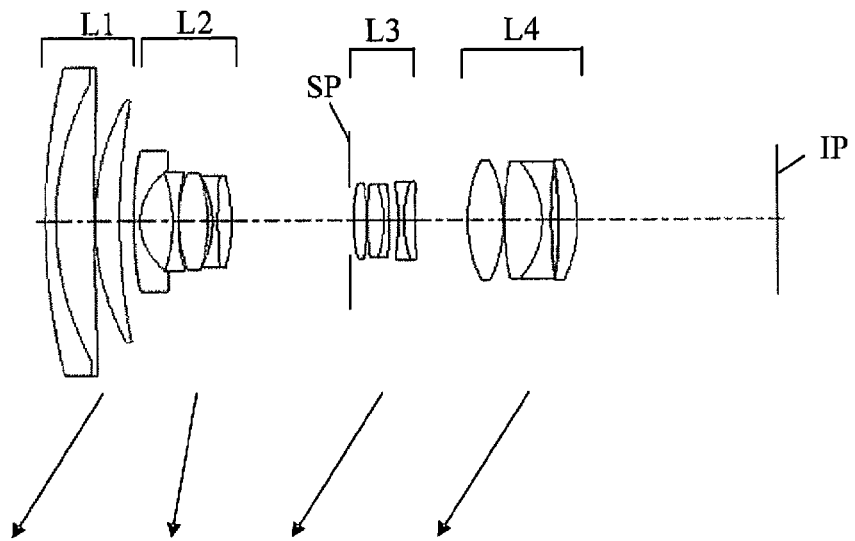
FIG. 4A is a sectional view of a zoom lens that is Embodiment 2 (Numerical Example 2) of the present invention at a wide-angle end.
Figure 4B:
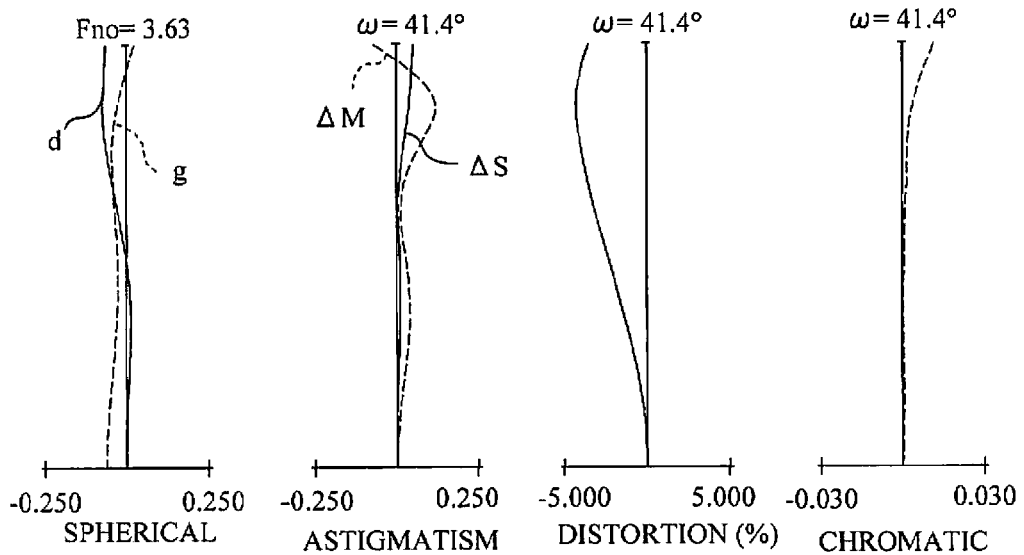
FIGS. 4B and 4C are longitudinal and lateral aberration charts of this zoom lens at the wide-angle end.
Figure 4C:
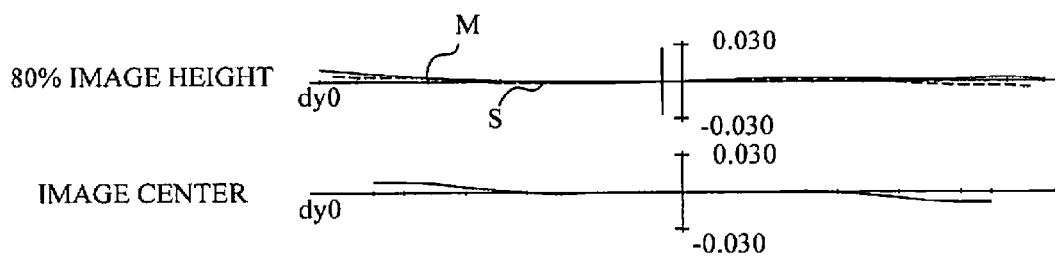
Figure 5A:
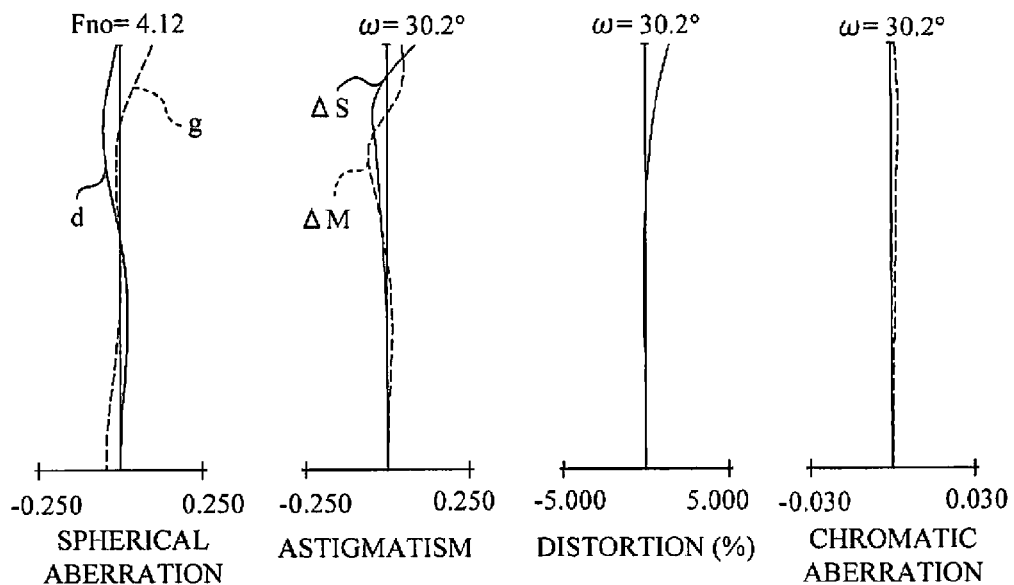
FIGS. 5A and 5B are longitudinal and lateral aberration charts of the zoom lens of Embodiment 2 at a wide-angle side middle focal length.
Figure 5B:
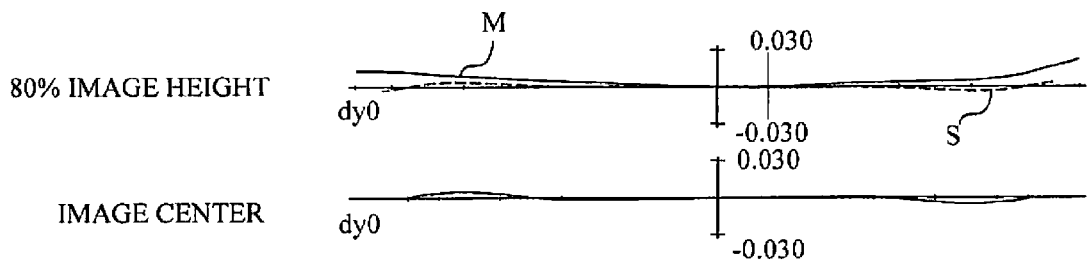
Figure 5C:
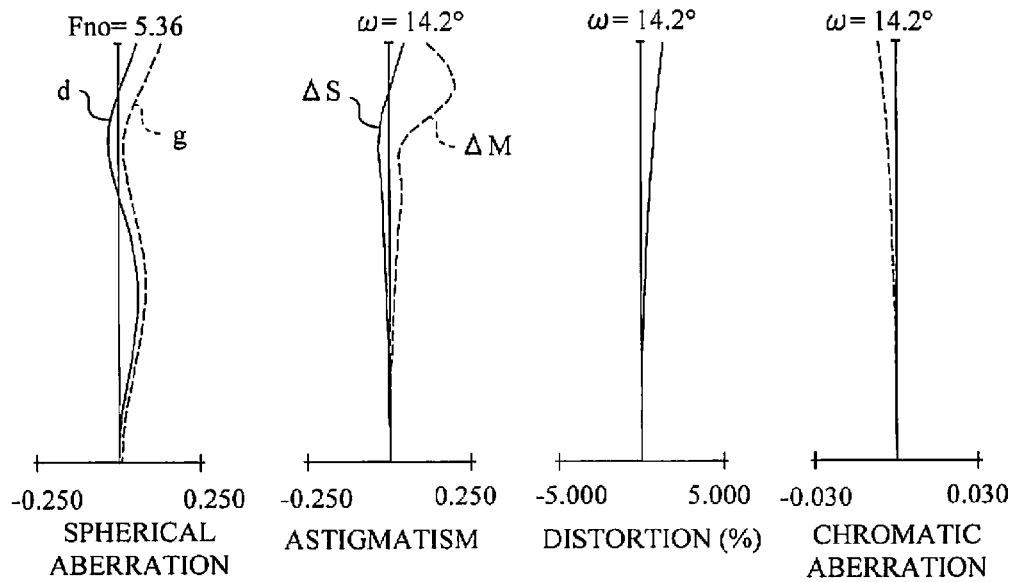
FIGS. 5C and 5D are longitudinal and lateral aberration charts of the zoom lens of Embodiment 2 at a telephoto side middle focal length.
Figure 5D:
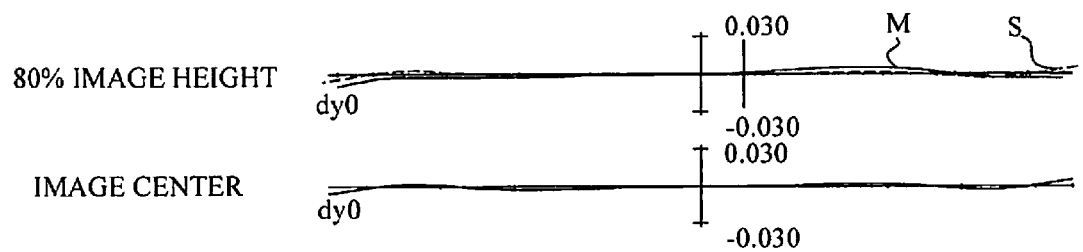
Figure 6A:
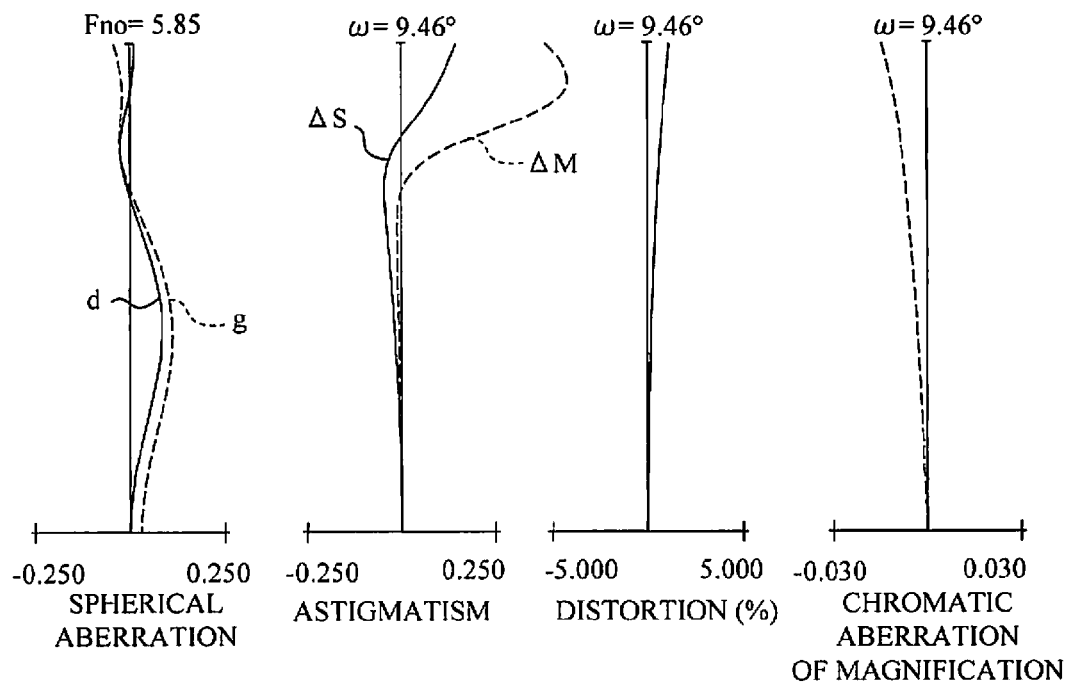
FIGS. 6A and 6B are longitudinal and lateral aberration charts of the zoom lens of Embodiment 2 at a telephoto end.
Figure 6B:
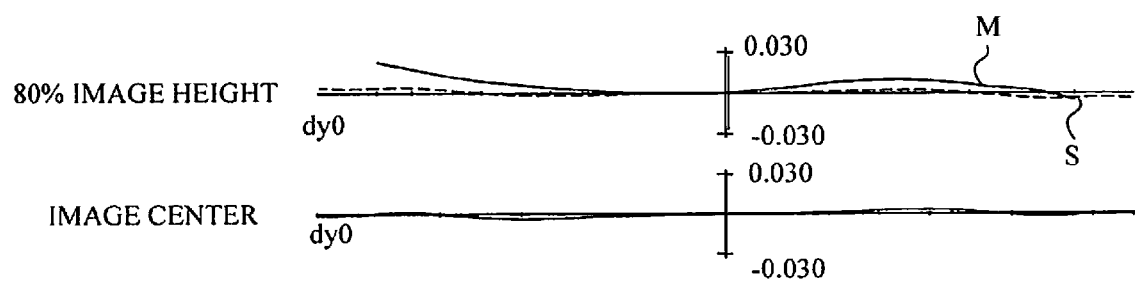

Similarly, FIGS. 4B and 4C are longitudinal and lateral aberration charts of the zoom lens of Embodiment 2 at the wide-angle end. FIGS. 5A and 5B are longitudinal and lateral aberration charts of the zoom lens of Embodiment 2 at a wide-angle side middle focal length. FIGS. 5C and 5D are longitudinal and lateral aberration charts of the zoom lens of Embodiment 2 at a telephoto side middle focal length. Furthermore, FIGS. 6A and 6B are longitudinal and lateral aberration charts of the zoom lens of Embodiment 2 at the telephoto end.

Figure 7A:
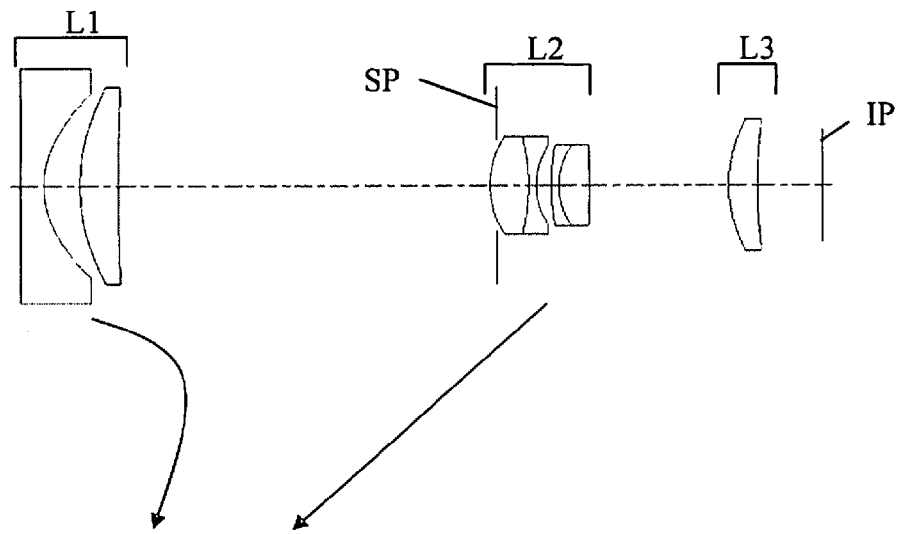
FIG. 7A is a sectional view of a zoom lens that is Embodiment 3 (Numerical Example 3) of the present invention at a wide-angle end.
Figure 7B:
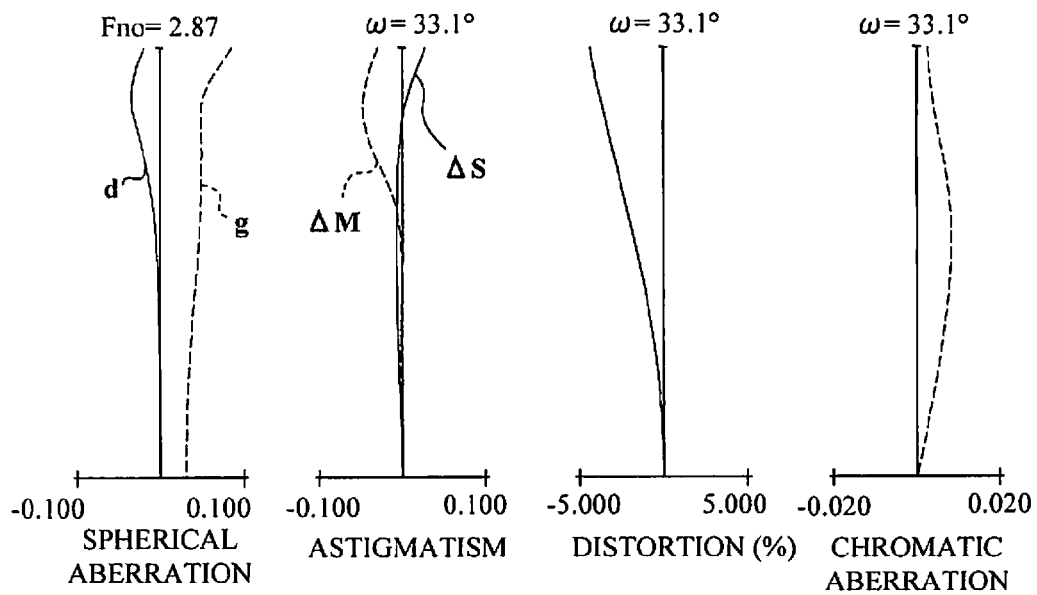
FIGS. 7B and 7C are longitudinal and lateral aberration charts of this zoom lens at the wide-angle end.
Figure 7C:
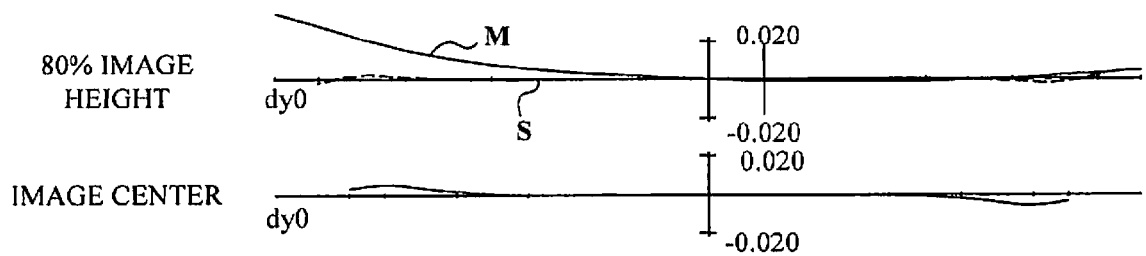
Figure 8A:
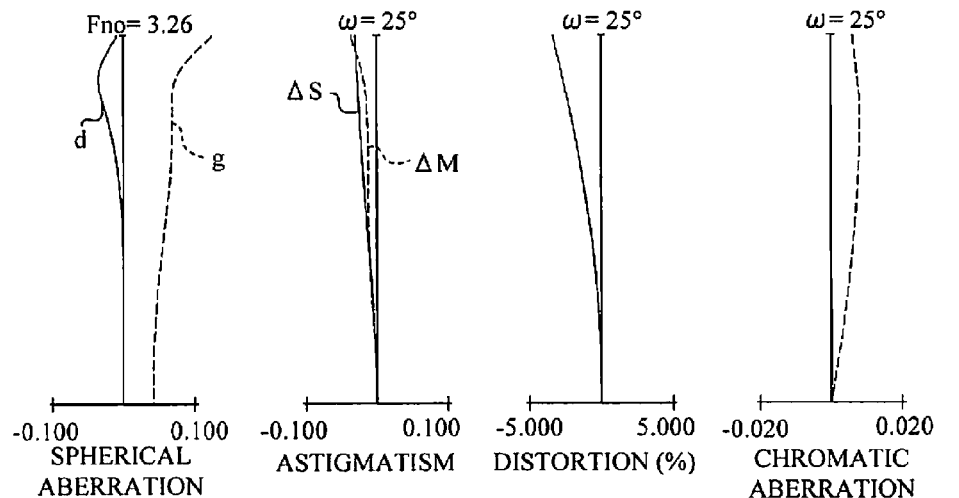
FIGS. 8A and 8B are longitudinal and lateral aberration charts of the zoom lens of Embodiment 3 at a wide-angle side middle focal length.
Figure 8B:
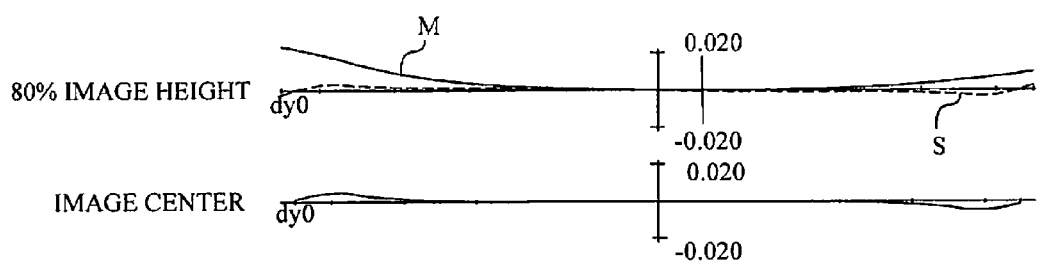
Figure 8C:
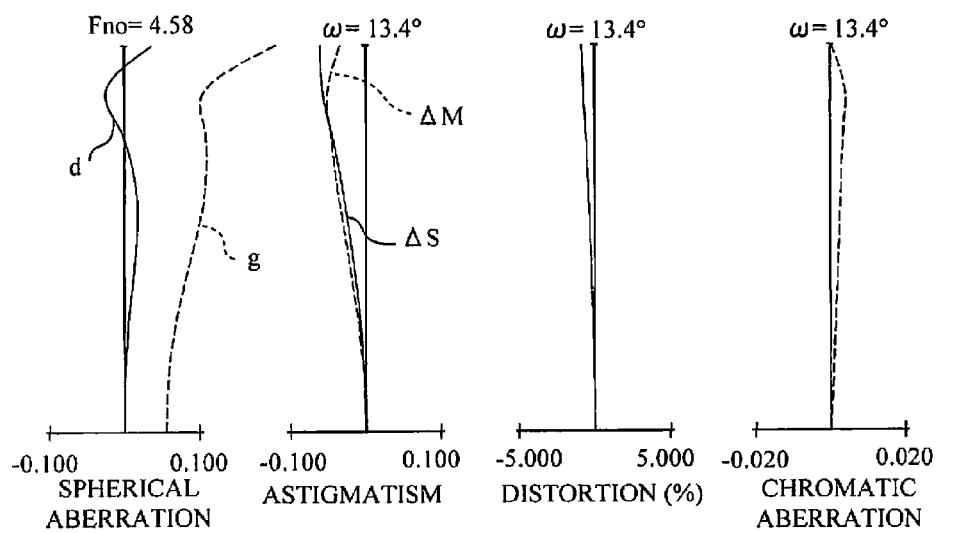
FIGS. 8C and 8D are longitudinal and lateral aberration charts of the zoom lens of Embodiment 3 at a telephoto side middle focal length.
Figure 8D:
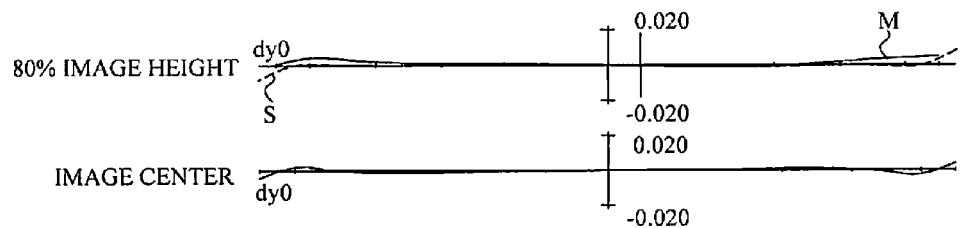
Figure 9A:
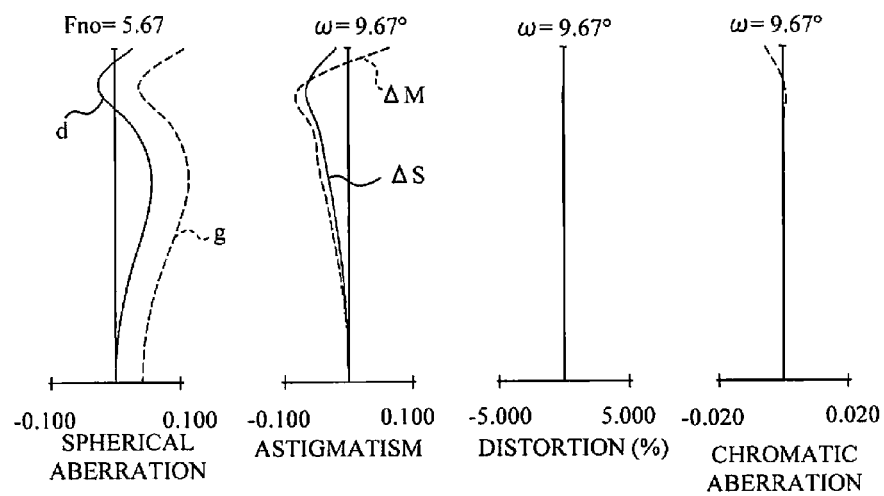
FIGS. 9A and 9B are longitudinal and lateral aberration charts of the zoom lens of Embodiment 3 at a telephoto end.
Figure 9B:
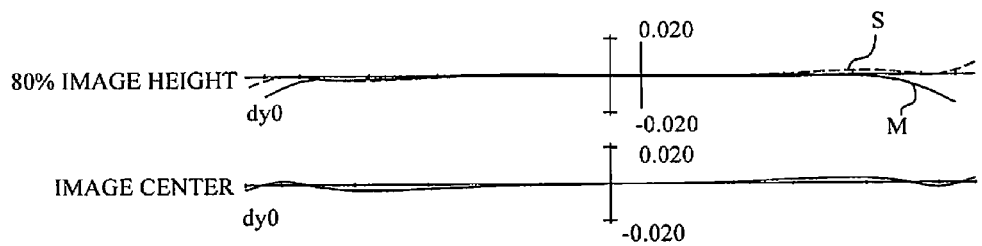

FIGS. 7B and 7C are longitudinal and lateral aberration charts of the zoom lens of Embodiment 3 at the wide-angle end. FIGS. 8A and 8B are longitudinal and lateral aberration charts of the zoom lens of Embodiment 3 at a wide-angle side middle focal length. FIGS. 8C and 8D are longitudinal and lateral aberration charts of the zoom lens of Embodiment 3 at a telephoto side middle focal length. Furthermore, FIGS. 9A and 9B are longitudinal and lateral aberration charts of the zoom lens of Embodiment 3 at the telephoto end.

Figure 10A:
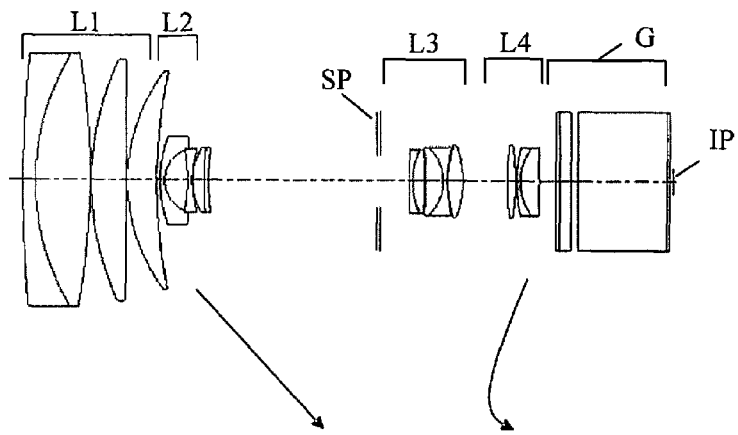
FIG. 10A is a sectional view of a zoom lens that is Embodiment 4 (Numerical Example 4) of the present invention at a wide-angle end.
Figure 10B:
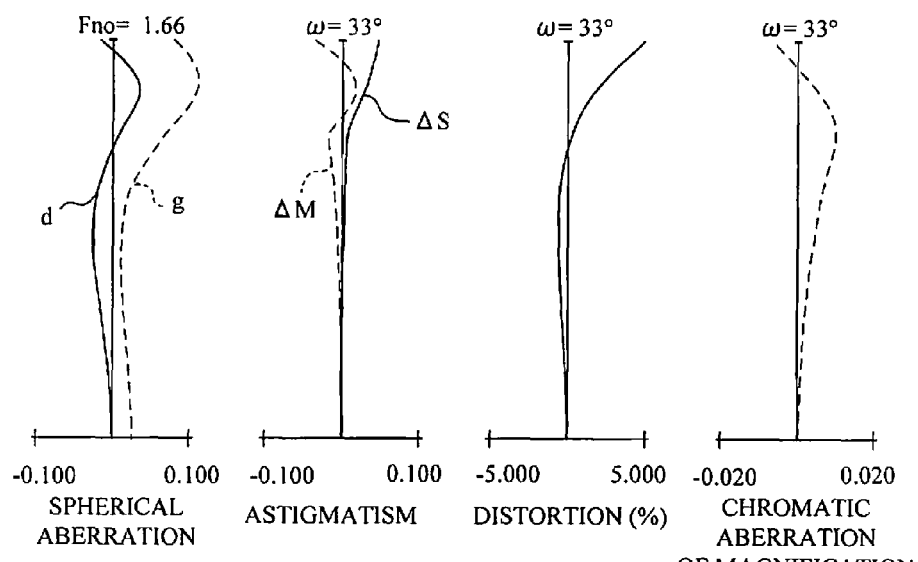
FIGS. 10B and 10C are longitudinal and lateral aberration charts of this zoom lens at the wide-angle end.
Figure 10C:
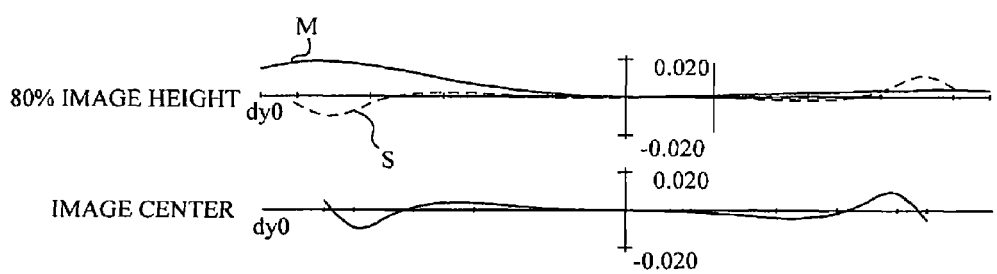
Figure 11A:
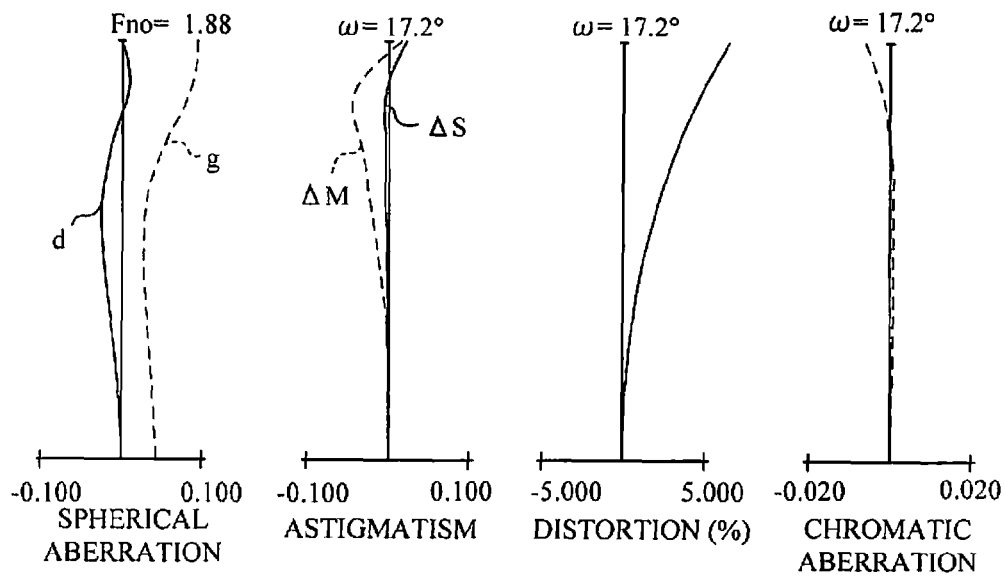
FIGS. 11A and 11B are longitudinal and lateral aberration charts of the zoom lens of Embodiment 4 at a wide-angle side middle focal length.
Figure 11B:
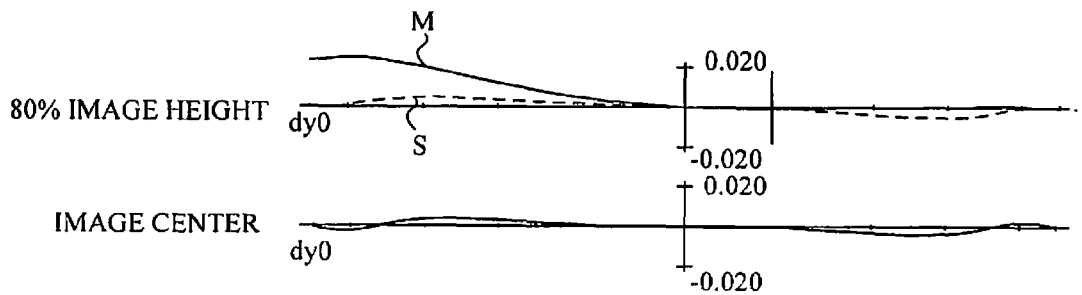
Figure 11C:
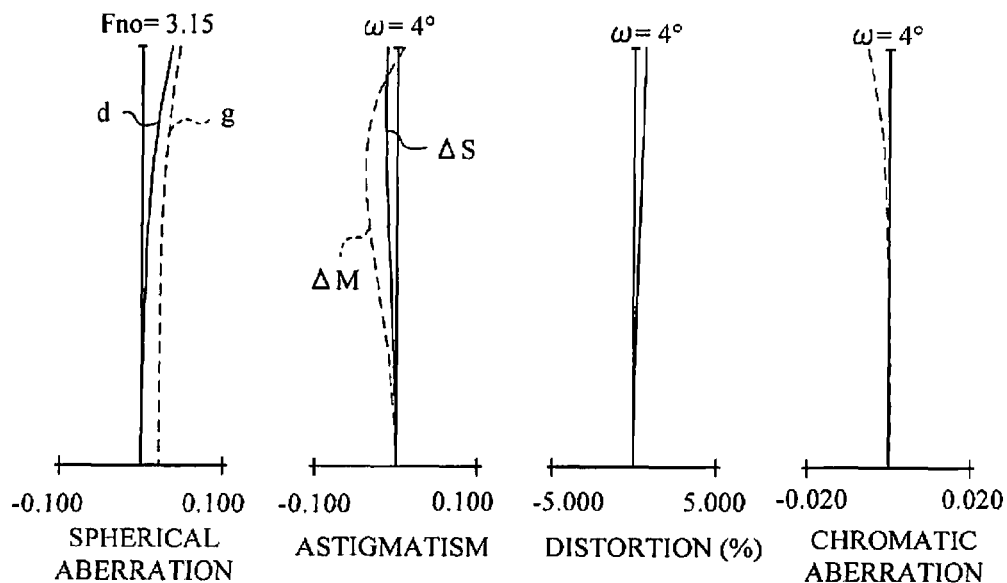
FIGS. 11C and 11D are longitudinal and lateral aberration charts of the zoom lens of Embodiment 4 at a telephoto side middle focal length.
Figure 11D:
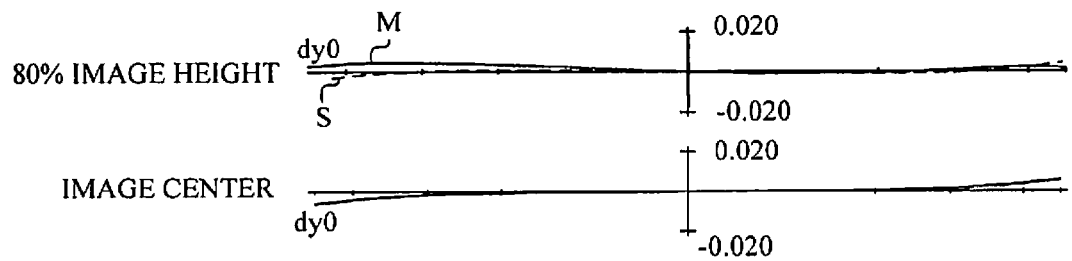
Figure 12A:
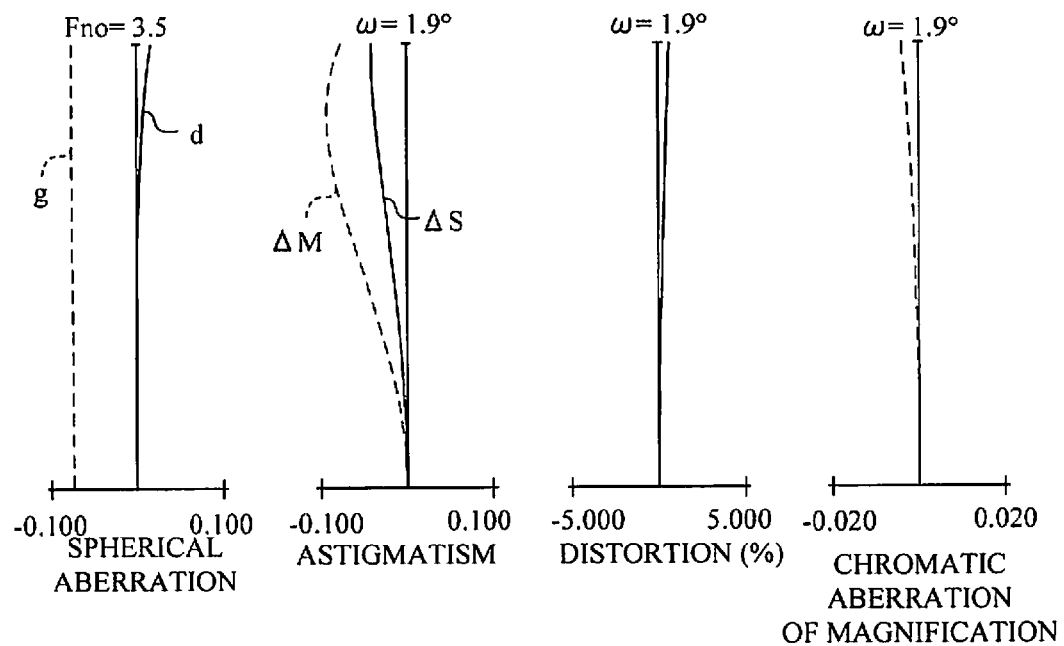
FIGS. 12A and 12B are longitudinal and lateral aberration charts of the zoom lens of Embodiment 4 at a telephoto end.
Figure 12B:
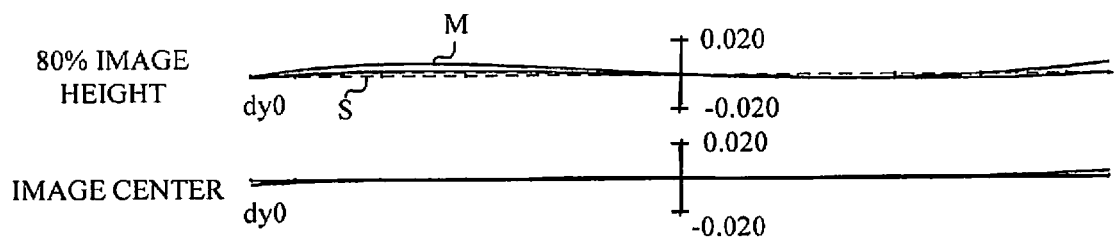

FIGS. 10B and 10C are longitudinal and lateral aberration charts of the zoom lens of Embodiment 4 at the wide-angle end. FIGS. 11A and 11B are longitudinal and lateral aberration charts of the zoom lens of Embodiment 4 at a wide-angle side middle focal length. FIGS. 11C and 11D are longitudinal and lateral aberration charts of the zoom lens of Embodiment 4 at a telephoto side middle focal length. Furthermore, FIGS. 12A and 12B are longitudinal and lateral aberration charts of the zoom lens of Embodiment 4 at the telephoto end.

Figure 13A:
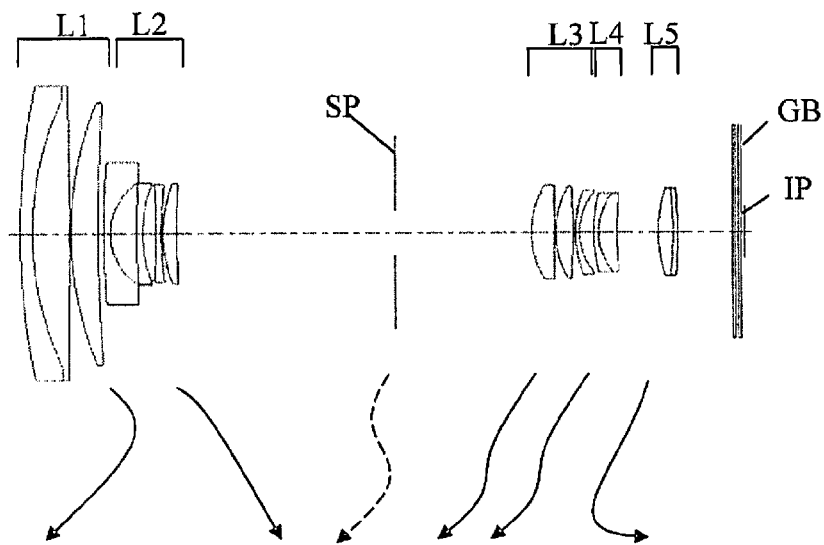
FIG. 13A is a sectional view of a zoom lens that is Embodiment 5 (Numerical Example 5) of the present invention at a wide-angle end.
Figure 13B:
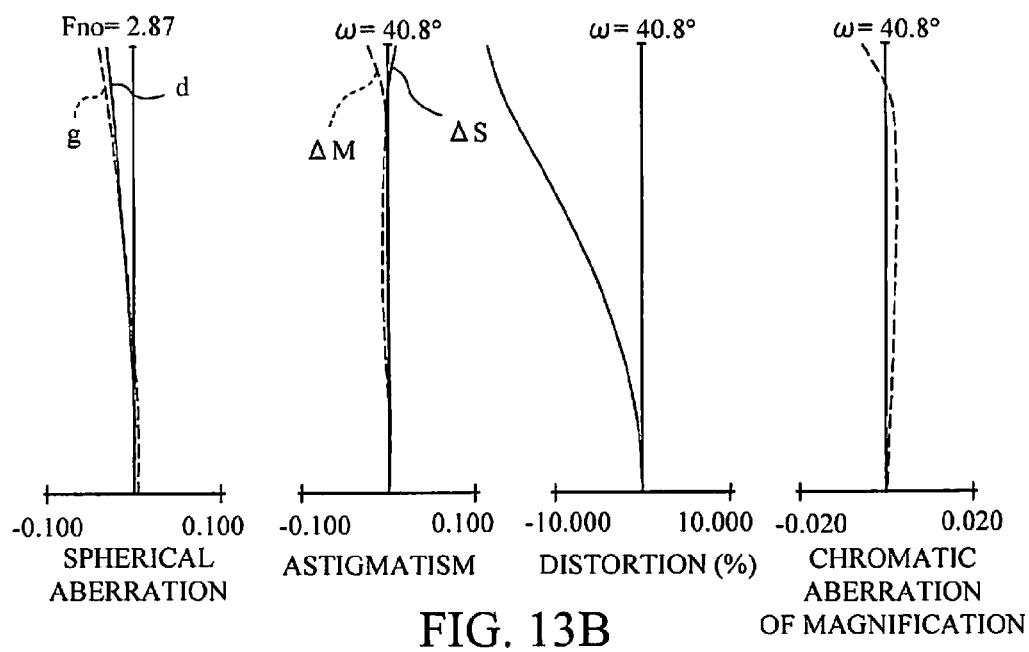
FIGS. 13B and 13C are longitudinal and lateral aberration charts of this zoom lens at the wide-angle end.
Figure 13C:
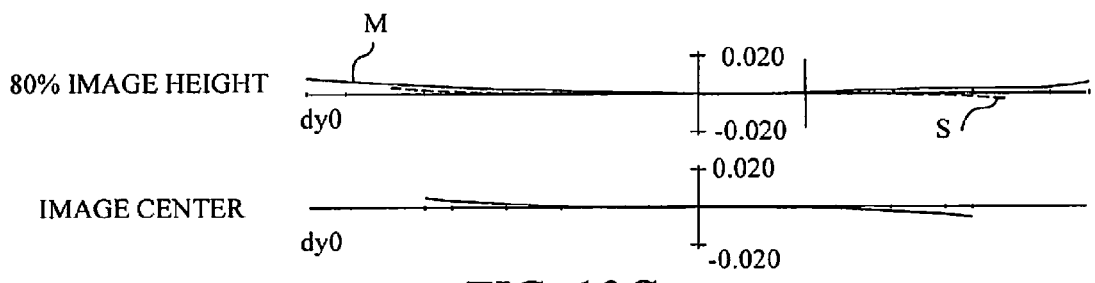
Figure 14A:
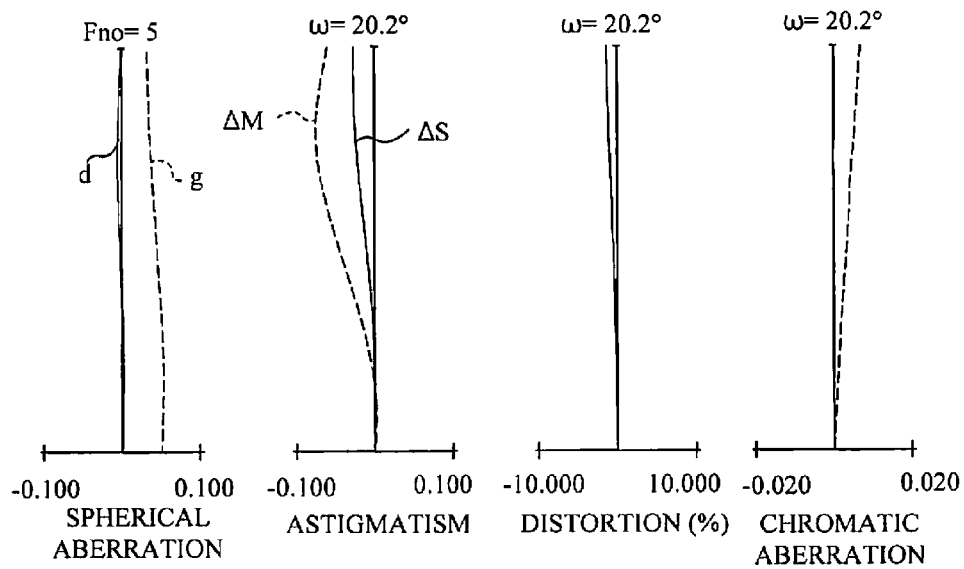
FIGS. 14A and 14B are longitudinal and lateral aberration charts of the zoom lens of Embodiment 5 at a wide-angle side middle focal length.
Figure 14B:
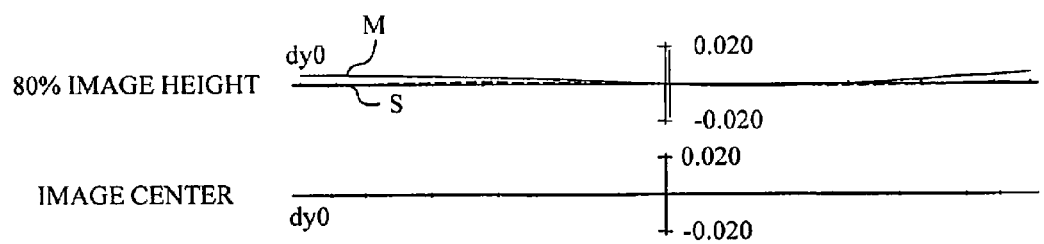
Figure 14C:
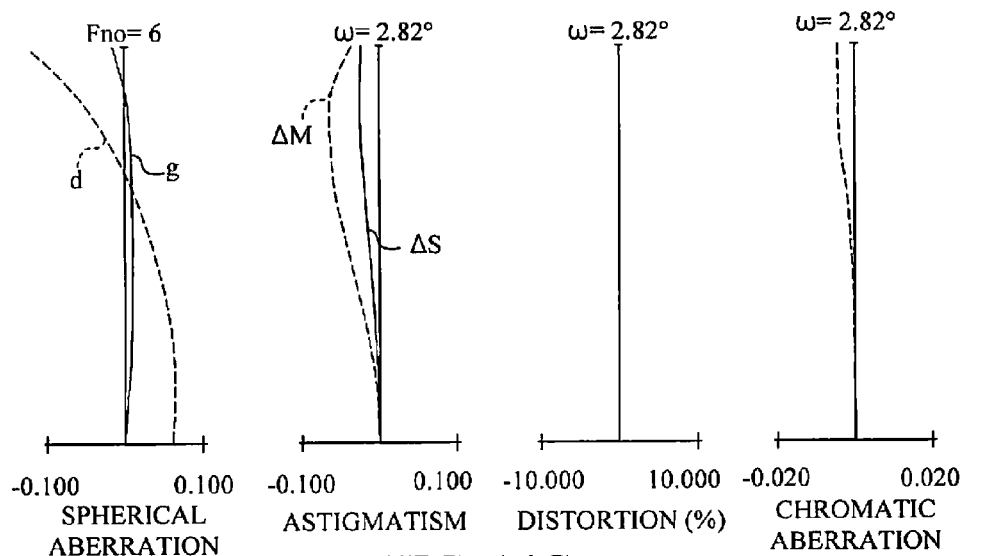
FIGS. 14C and 14D are longitudinal and lateral aberration charts of the zoom lens of Embodiment 5 at a telephoto side middle focal length.
Figure 14D:
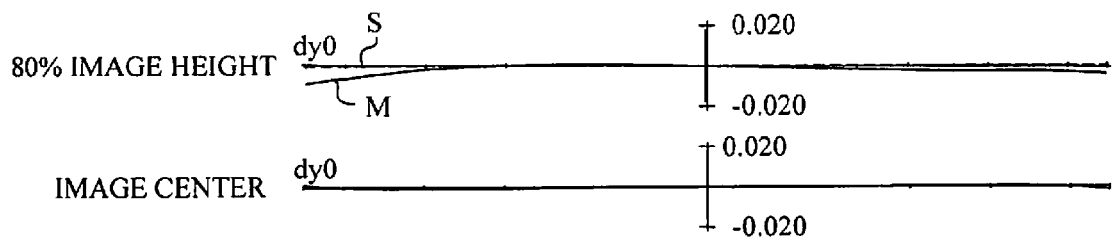
Figure 15A:
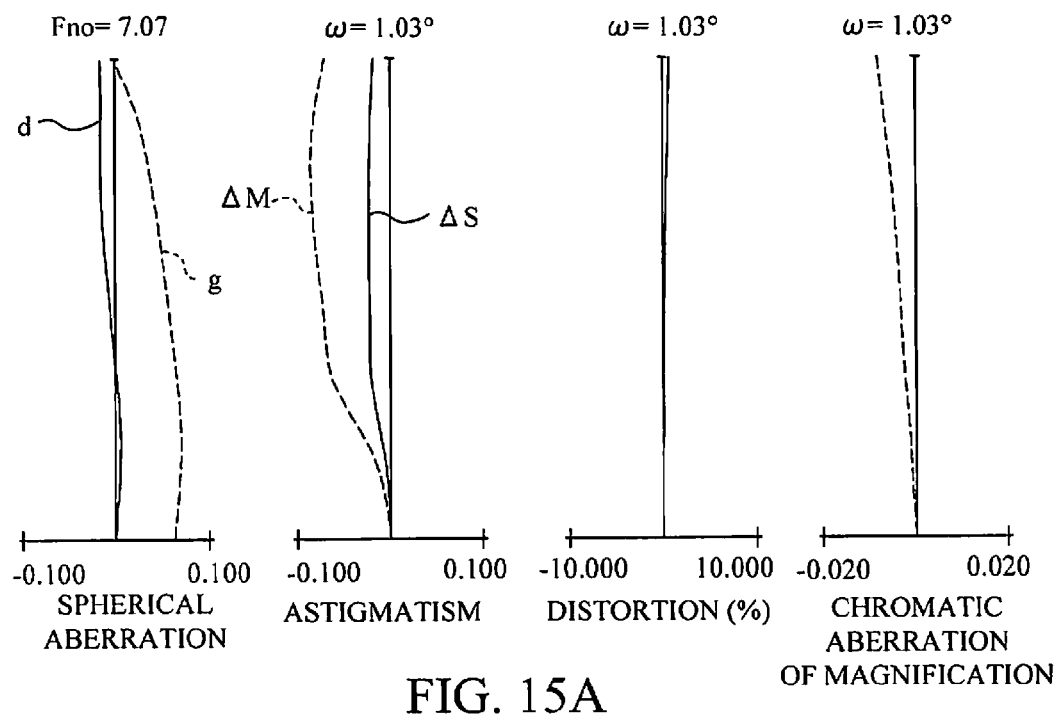
FIGS. 15A and 15B are longitudinal and lateral aberration charts of the zoom lens of Embodiment 5 at a telephoto end.
Figure 15B:
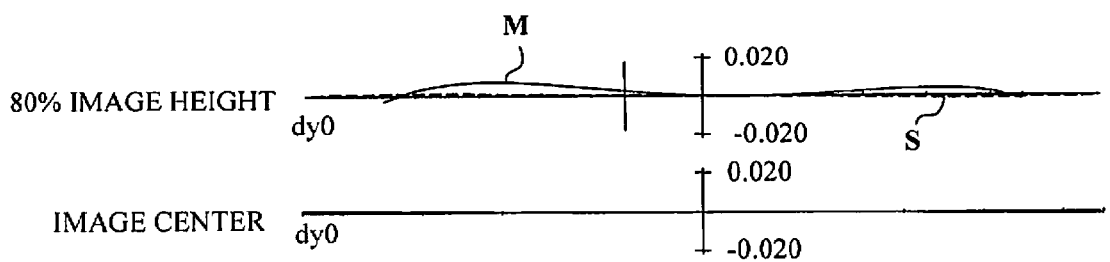

FIGS. 13B and 13C are longitudinal and lateral aberration charts of the zoom lens of Embodiment 5 at the wide-angle end. FIGS. 14A and 14B are longitudinal and lateral aberration charts of the zoom lens of Embodiment 5 at a wide-angle side middle focal length. FIGS. 14C and 14D are longitudinal and lateral aberration charts of the zoom lens of Embodiment 5 at a telephoto side middle focal length. Furthermore, FIGS. 15A and 15B are longitudinal and lateral aberration charts of the zoom lens of Embodiment 5 at the telephoto end.

In each embodiment, when fw represents a focal length of the zoom lens at the wide-angle end and fm represents a focal length thereof at the telephoto end, a middle focal length fm is defined as follows:

$$fm = \sqrt{(fw \times ft)}$$

On the basis of this definition, the wide-angle side middle focal length fwm that is a middle focal length fm closer to the wide-angle end than to the telephoto end is defined as follows:

$$fwm = \sqrt{(fw \times fm)}, \text{ and}$$

the telephoto side middle focal length ftm that is a middle focal length fm closer to the telephoto end than to the wide-angle end is defined as follows:

$$ftm = \sqrt{(fm \times ft)}$$

In the sectional views of each embodiment, reference characters L1 to L5 denote first to fifth lens units, reference characters GB and G denote a glass block such as an optical filter or a color separation prism, reference character SP denotes an aperture stop. Moreover, reference character IP denotes an image plane.

In each longitudinal aberration chart, reference characters d and g respectively denote aberration for a d-line and aberration for a g-line. Moreover, reference characters AM and AS respectively denote aberration in a meridional image plane and aberration in a sagittal image plane. In addition, in each lateral aberration chart, reference character S denotes aberration of sagittal rays, and reference character M denotes aberration of meridional rays. The aberration chart of the chromatic aberration of magnification shows chromatic aberration of magnification for the g-line.

The zoom lens of each embodiment is designed on a premise that the image restoration process is performed, by using an image restoration filter having filter values corresponding to the aberration of the zoom lens, on an input image produced by image capturing of an object image formed by the zoom lens through the image sensor. On such a premise, the zoom lens of each embodiment satisfies the following both conditions (1) and (2). In the conditions (1) and (2), an image height corresponding to 80 percent of a maximum image height of the zoom lens, that is, an image height from a center of the image sensor (image center) to a peripheral side part thereof corresponding to 80 percent of a size of the image sensor (sensor size) is referred to as "the 80 percent image height". Moreover, among meridional rays passing thorough the zoom lens, an upper ray and a lower lay each passing through a position corresponding to 70 percent of an effective light flux diameter are respectively referred to as "a 70 percent upper ray" and "a 70 percent lower ray".

$$|(\Delta TMyu + \Delta TMyl)/(\Delta WMyu + \Delta WMyl)| < 0.67 \quad (1)$$

$$0.75 < |(\Delta WMyu + \Delta WMyl)|/2P < 16.0 \quad (2)$$

In the conditions (1) and (2), $\Delta WMyu$ represents a lateral aberration amount for the d-line of the 70 percent upper ray reaching the 80 percent image height at the wide-angle side middle focal length, $\Delta WMyl$ represents a lateral aberration amount for the d-line of the 70 percent lower ray reaching the 80 percent image height at the wide-angle side middle focal length, $\Delta TMyu$ represents a lateral aberration amount for the d-line of the 70 percent upper ray reaching the 80 percent image height at the telephoto side middle focal length, $\Delta TMyl$ represents a lateral aberration amount for the d-line of the 70 percent lower ray reaching the 80 percent image height at the telephoto side middle focal length, and P represents a pixel pitch of the image sensor.

Satisfying both the conditions (1) and (2) makes it possible to achieve a zoom lens appropriate for downsizing and higher magnification on the premise that the image restoration is performed. As mentioned above, downsizing of the zoom lens and higher magnification thereof require increase of refractive powers of the respective lens units constituting the zoom lens. However, the increase of refractive powers of the lens units increases aberration variation, particularly variation of field curvature, during the zooming. Specifically, the field curvature becomes large toward an under side in a zoom range from the wide-angle end to the middle focal length, and the field curvature becomes large toward an over side in a zoom range from the middle focal length to the telephoto end.

In such variation of the field curvature during the zooming, correction of one of the under field curvature and the over field curvature increases the other. Therefore, conventional zoom lenses designed without the premise that the image restoration is performed are designed, in order to provide good optical performance over the entire zoom range, so as to approximately equalize (balance) variation amounts of the under field curvature and over field curvature while allowing residual field curvature over the entire zoom range.

Figure 19A:
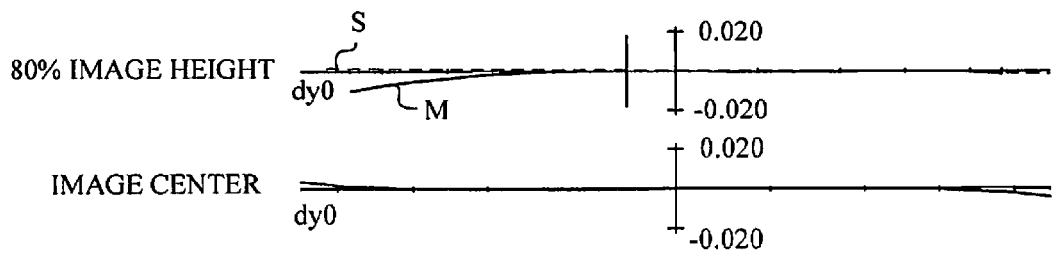
FIGS. 19A and 19B are lateral aberration charts showing aberration generated on a premise that the image restoration process is performed in Embodiments 1 to 5.

In such zoom lenses having the residual field curvature, intentionally generating coma aberration makes it possible to correct the field curvature during the zooming. Description of this correction method is made with reference to FIGS. 19A and 19B. FIG. 19A is typical lateral aberration charts in the zoom range from the middle focal length to the telephoto end.

Figure 19B:
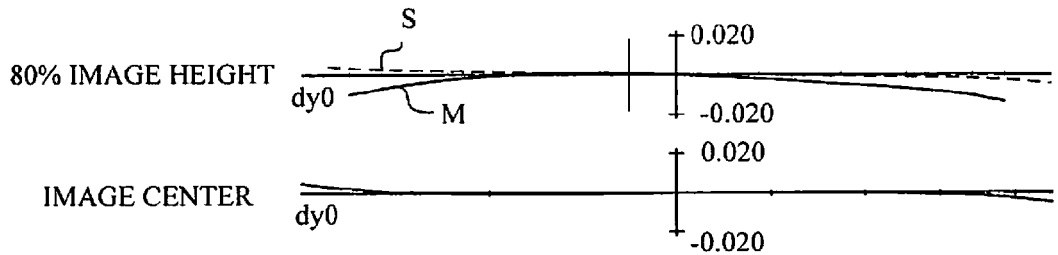

As understood from FIG. 19A, the meridional image plane is tilted to the over side at the 80 percent image height. This is because, especially, lower rays of the meridional rays are generated in a minus direction. Therefore, as shown in FIG. 19B, generating upper rays of the meridional rays in the minus direction makes it possible to improve a tendency of such over side tilting of the entire meridional image plane.

Although the improvement of the variation of the field curvature is achieved by increasing the coma aberration and thereby resolution is deteriorated, correcting the resolution deterioration (that is, image degradation) by the image restoration enables achievement of good image quality with improvement of the variation of the field curvature.

Similarly, in the zoom range from the wide-angle range to the middle focal length, the meridional image plane is tilted to the under side because the lower rays of the meridional rays are generated on a plus side. Thus, generating upper rays of the meridional rays in the plus direction makes it possible to improve a tendency of under side tilting of the entire meridional image plane.

As described above, correcting the image degradation due to the generation of the coma aberration by the image restoration enables achievement of a zoom lens whose field curvature generated during the zooming is corrected. However, in general zoom lenses, an F-number thereof is increased from the wide-angle end toward the telephoto end, so that the coma aberration generated in the zoom range from the middle focal length to the telephoto end in order to correct the field curvature causes, in combination with an influence of diffraction, significant image degradation. In this case, the image restoration cannot provide a good restored image or extremely strong image restoration results in an image whose noise is emphasized.

Thus, it is desirable to optically correct the field curvature generated in the zoom range from the middle focal length to the telephoto end and, on the other hand, to decrease the field curvature generated in the zoom range from the wide-angle end to the middle focal length by generating the coma aberration and then correct the image degradation due to the coma aberration by the image restoration. Since the F-number is smaller (brighter) and the influence (image degradation) of the diffraction is also smaller in the zoom range from the wide-angle end to the middle focal length than those in the zoom range from the middle focal length to the telephoto end, it is possible to provide an image whose degradation due to the coma aberration can be sufficiently corrected by the image restoration.

The condition (1) limits a ratio of a coma aberration amount generated in the zoom range from the wide-angle end to the middle focal length and that in the zoom range from the middle focal length to the telephoto end. A higher value of the condition (1) than its upper limit excessively increases the coma aberration amount in the zoom range from the middle focal length to the telephoto end, which causes significant image degradation.

It is desirable to change the numerical range of the condition (1) as follows:

$$|(\Delta TMyu+\Delta TMyl)/(\Delta WMyu+\Delta WMyl)|<0.55 \qquad (1)'$$

The condition (2) relates to downsizing of the zoom lens, higher magnification thereof and higher image quality. A lower value of the condition (2) than its lower limit indicates that the coma aberration amount for correcting the variation of the field curvature during the zooming is insufficient. This means that sufficient refractive powers are not provided to the respective lens units constituting the zoom lens, which makes impossible to decrease the size of the zoom lens.

On the other hand, a higher value of the condition (2) than its upper limit excessively increases the coma aberration amount and thereby causes significant image degradation before the image restoration, which makes it impossible to perform good image restoration or which makes it necessary to perform extremely strong image restoration, resulting in increase in noise.

It is desirable to change the numerical range of the condition (2) as follows:

$$1.20<|(\Delta WMyu+\Delta WMyl)|/2P<14.0 \qquad (2)'$$

It is more desirable to change the numerical range of the condition (2)' as follows:

$$1.20<|(\Delta WMyu+\Delta WMyl)|/2P<8.0 \qquad (2)''$$

Moreover, the zoom lens of each embodiment also satisfies both the following conditions (3) and (4). In the conditions (3) and (4), a diameter of a spot formed by a light flux included in an area up to percent of an effective light flux diameter in a point image intensity distribution of the d-line at a position where an MTF in a meridional direction for the d-line passing through the optical system and then reaching the 80 percent image height becomes peak is referred to as "a 70 percent spot diameter".

$$Stm/Swm<0.67 \qquad (3)$$

$$0.75<Swm/2P<16.0 \qquad (4)$$

In the conditions (3) and (4), Swm represent the 70 percent spot diameter at the wide-angle side middle focal length, and Stm represents the 70 percent spot diameter at the telephoto side middle focal length.

The conditions (3) and (4) are required to be satisfied for achieving, as well as the conditions (1) and (2), a zoom lens appropriate for downsizing and higher magnification on the premise that the image restoration is performed. The condition (3) limits, as well as the condition (1), the ratio of the coma aberration amount generated in the zoom range from the wide-angle end to the middle focal length and that in the zoom range from the middle focal length to the telephoto end. A higher value of the condition (3) than its upper limit excessively increases the coma aberration amount in the zoom range from the middle focal length to the telephoto end, which causes significant image degradation and thereby makes it impossible to perform good image restoration.

It is desirable to change the numerical range of the condition (3) as follows:

$$Swm/Stm<0.55 \qquad (3)'$$

The condition (4) relates, as well as the condition (2), to downsizing of the zoom lens, higher magnification thereof and higher image quality. A lower value of the condition (4) than its lower limit indicates that variation of the field curvature during the zooming is insufficient. This means that refractive powers of the respective lens units constituting the zoom lens are weak, which makes impossible to downsize the zoom lens. On the other hand, a higher value of the condition (4) than its upper limit excessively increases the coma aberration amount, which makes it impossible to perform good image restoration.

It is desirable to change the numerical range of the condition (4) as follows:

$$1.20<Swm/2P<14.0 \qquad (4)'$$

It is more desirable to change the numerical range of the condition (4)' as follows:

$$1.20<Swm/2P<8.0 \qquad (4)''$$

Although the zoom lens of each embodiment satisfies all the conditions (1) to (4), it is not necessarily necessary to satisfy all the conditions (1) to (4). In other words, a zoom lens satisfying at least one of a pair of the conditions (1) and (2) and a pair of the conditions (3) and (4) is included in embodiments of the present invention.

The conventional zoom lenses are not designed in consideration of generation of appropriate come aberration for the image restoration like the zoom lens of each embodiment. In other words, the conventional zoom lenses are, even if they satisfy any one or more of the conditions (1) to (4) in part of a middle focal length range, merely zoom lenses whose optical performance is not corrected.

Furthermore, the zoom lens of each of Embodiments 1, 2, 4 and 5 includes, in order from an object side to an image side, a first lens unit L1 having a positive refractive power and a second lens unit L2 having a negative refractive power, and satisfies the following conditions:

$$0.30 < f1/ft < 1.20 \quad (5)$$

$$-0.20 < f2/ft < -0.03 \quad (6)$$

where, as mentioned above, f1 represents the focal length of the first lens unit L1, and f2 represents the focal length of the second lens unit L2.

These conditions (5) and (6) relate to downsizing of the zoom lens. A higher refractive power of the first lens unit L1 making a value of the condition (5) lower than its lower limit can downsize the zoom lens but excessively increases the variation of the field curvature during the zooming, which makes it necessary to generate large coma aberration for correcting the field curvature, resulting in significant image degradation. Such significant image degradation makes it impossible to provide a good restored image even though the image restoration is performed or requires extremely strong image restoration, resulting in an image whose noise is emphasized. On the other hand, a lower refractive power of the first lens unit L1 making the value of the condition (5) higher than its upper limit makes it impossible to downsize the zoom lens.

It is desirable to change the numerical range of the condition (5) as follows:

$$0.35 < f1/ft < 1.00 \quad (5)'$$

A higher refractive power of the second lens unit L2 making a value of the condition (6) higher than its upper limit can downsize the zoom lens but excessively increases the variation of the field curvature during the zooming, as well as the condition (5). On the other hand, a lower refractive power of the second lens unit L2 making the value of the condition (6) lower than its lower limit makes it impossible to downsize the zoom lens.

It is desirable to change the numerical range of the condition (6) as follows:

$$-0.18 < f2/ft < -0.035 \quad (6)'$$

The zoom lens of Embodiment 3, in order from the object side to the image side, a first lens unit L1 having a negative refractive power and a second lens unit L2 having a positive refractive power, and satisfies the following conditions:

$$-1.20 < f1/ft < -0.30 \quad (7)$$

$$0.20 < f2/ft < 1.10 \quad (8)$$

where, as well as in the conditions (5) and (6), f1 represents the focal length of the first lens unit L1, and f2 represents the focal length of the second lens unit L2.

These conditions (7) and (8) also relate to downsizing of the zoom lens. A higher refractive power of the first lens unit L1 making a value of the condition (7) higher than its upper limit can downsize the zoom lens but excessively increases the variation of the field curvature during the zooming, as with the case where the value of the condition (5) is lower than its lower limit. On the other hand, a lower refractive power of the first lens unit L1 making the value of the condition (7) lower than its lower limit makes it impossible to downsize the zoom lens.

It is desirable to change the numerical range of the condition (7) as follows:

$$-1.00 < f1/ft < -0.50 \quad (7)'$$

A higher refractive power of the second lens unit L2 making a value of the condition (8) lower than its lower limit can downsize the zoom lens but excessively increases the variation of the field curvature during the zooming, as well as the condition (7). On the other hand, a lower refractive power of the second lens unit L2 making the value of the condition (6) higher than its upper limit makes it impossible to downsize the zoom lens.

It is desirable to change the numerical range of the condition (8) as follows:

$$0.04 < f2/ft < 0.09 \quad (8)'$$

Figure 20:
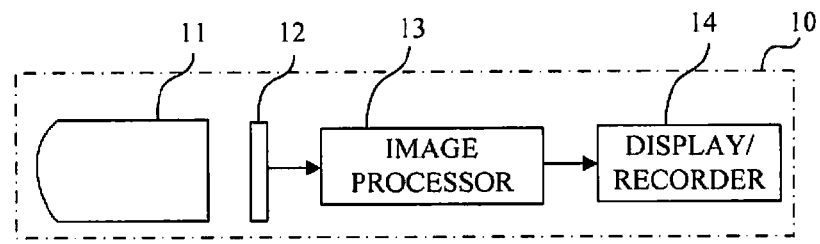
FIG. 20 is a block diagram showing a configuration of an image pickup apparatus including the zoom lens of any one of Embodiments 1 to 5 or an optical system of any one of Embodiments 6 to 8 of the present invention.

FIG. 20 shows an image pickup apparatus 10 that performs image capturing using the zoom lens of any one of Embodiments 1 to 5 as an image capturing optical system. Reference numeral 12 denotes an image sensor placed at a position of the image plane IP shown in the sectional view of each embodiment. Reference numeral 13 denotes an image processor that performs various image processes on output from the image sensor 12 to produce an image (input image) and performs the image restoration process on the image. Reference numeral 14 denotes a display/recorder that displays a resulting image (restored image) of the image restoration process on a monitor or records it to a recording medium such as a semiconductor memory.

Specific numerical examples (Numerical Examples 1 to 5) corresponding to Embodiments 1 to 5 are hereinafter described.

[Embodiment 1]

The zoom lens of Embodiment 1 (Numerical Example 1) shown in FIG. 1A is constituted by, in order from the object side to the image side, the first lens unit L1 having a positive refractive power, the second lens unit L2 having a negative refractive power, the aperture stop SP, a third lens unit L3 having a positive refractive power, a fourth lens unit L4 having a negative refractive power, a fifth lens unit L5 having a positive refractive power and the glass block GB. The zoom lens of this embodiment has a maximum image height of 3.875 mm. At a position of the image plane IP, a 1/2.3"-type image sensor having a size of 4.65 mm×6.2 mm is placed. The image sensor has a pixel pitch of 1.4 μm.

Various numerical values of the zoom lens of Numerical Example 1 are shown below. In the numerical values, ri (i=1, 2, 3, ...) denotes a curvature radius of an i-th lens surface counted from the object side, and di denotes a lens thickness or an aerial distance between the i-th lens surface and an (i+1)-th lens surface. Moreover, ndi and vdi respectively denote a refractive index and an Abbe number of a material of an i-th lens for the d-line. Furthermore, an aspheric shape of an aspheric lens surface is expressed by the following expression where X represents a position (coordinates) in the optical axis direction, Y represents a position (coordinates) in a direction orthogonal to the optical axis direction and Ai (i=1, 2, 3, ...) denote aspheric coefficients:

$$X = (Y^2/R)/[1 + \{1-(K+1)(Y/R)^2\}^{1/2}] + A4Y^4 + A6Y^6 + A8Y^8 + A10Y^{10} + \ldots$$

In addition, e±M means ×10$^{\pm M}$. Table 1 shows relations of Numerical Example 1 and the above-described conditions (1) to (6).

NUMERICAL EXAMPLE 1

Unit mm

Surface data

| Surface No. | r | d | nd | vd | Effective diameter |
|---|---|---|---|---|---|
| 1 | 108.138 | 1.80 | 1.72047 | 34.7 | 41.97 |
| 2 | 46.882 | 5.40 | 1.49700 | 81.5 | 38.17 |
| 3 | -948.171 | 0.18 | | | 38.03 |
| 4 | 51.472 | 3.98 | 1.59282 | 68.6 | 37.28 |
| 5 | 280.538 | (Variable) | | | 36.84 |
| 6 | 142.905 | 0.95 | 1.88300 | 40.8 | 19.54 |
| 7 | 9.034 | 3.87 | | | 14.13 |
| 8 | 416.426 | 0.80 | 1.80400 | 46.6 | 13.84 |
| 9 | 19.874 | 1.93 | | | 13.27 |
| 10 | -96.523 | 0.70 | 1.80400 | 46.6 | 13.28 |
| 11 | 62.894 | 0.20 | | | 13.36 |
| 12 | 19.599 | 1.99 | 1.94595 | 18.0 | 13.69 |
| 13 | 111.949 | (Variable) | | | 13.48 |
| 14 (SP) | ∞ | (Variable) | | | 8.74 |
| 15* | 12.947 | 3.32 | 1.55332 | 71.7 | 12.70 |
| 16* | -54226.283 | 0.20 | | | 12.59 |
| 17 | 13.679 | 2.52 | 1.43875 | 94.9 | 12.49 |
| 18 | -123.194 | 0.33 | | | 12.20 |
| 19 | 17.754 | 0.60 | 1.83400 | 37.2 | 11.42 |
| 20 | 9.366 | (Variable) | | | 10.62 |
| 21 | 21.048 | 0.70 | 1.90366 | 31.3 | 10.60 |
| 22 | 9.010 | 2.66 | 1.58144 | 40.8 | 10.18 |
| 23 | 60.714 | (Variable) | | | 10.12 |
| 24 | 21.195 | 2.14 | 1.49700 | 81.5 | 11.73 |
| 25 | -53.651 | 0.60 | 2.00069 | 25.5 | 11.65 |
| 26 | -104.874 | (Variable) | | | 11.64 |
| 27 | ∞ | 0.30 | 1.51633 | 64.1 | 30.00 |
| 28 | ∞ | 0.47 | | | 30.00 |
| 29 | ∞ | 0.50 | 1.51633 | 64.1 | 30.00 |
| 30 | ∞ | (Variable) | | | 30.00 |
| IP | ∞ | | | | |

Aspheric data

15th surface

K = -2.43594e+000    A4 = 7.98678e-005    A6 = -2.91092e-007
A8 = 5.25522e-009    A10 = -3.88944e-011

16th surface

K = -1.89560e+010    A4 = 2.31285e-005    A6 = 2.28540e-007

Various data
Zoom ratio 55.70

| | Tele | Wide-middle | Tele-middle | Tele |
|---|---|---|---|---|
| Focal length | 3.86 | 10.55 | 78.70 | 215.00 |
| F-number | 2.87 | 4.00 | 6.00 | 7.07 |
| Field angle | 40.81 | 20.17 | 2.82 | 0.95 |
| Image height | 3.33 | 3.88 | 3.88 | 3.56 |
| Entire lens length | 105.00 | 99.99 | 142.21 | 150.99 |
| Back focus | 0.52 | 0.52 | 0.52 | 0.52 |
| d5 | 0.78 | 12.45 | 57.11 | 66.09 |
| d13 | 31.87 | 8.46 | 4.52 | 1.50 |
| d14 | 19.63 | 14.65 | 2.19 | 1.50 |
| d20 | 2.16 | 1.70 | 4.11 | 4.45 |
| d23 | 5.84 | 12.92 | 10.83 | 32.80 |
| d26 | 8.05 | 13.16 | 26.79 | 7.99 |
| d30 | 0.52 | 0.52 | 0.52 | 0.52 |
| Entrance pupil position | 18.64 | 35.11 | 327.50 | 697.27 |
| Exit pupil Position | 75.99 | 421.93 | -76.34 | 1211.72 |
| Front principal point | 22.70 | 45.93 | 325.62 | 950.44 |
| Rear principal point | -3.34 | -10.03 | -78.18 | -214.48 |

Lens unit Data

| Unit | Start surface | Focal length | Lens unit length | Front principal point | Rear principal point |
|---|---|---|---|---|---|
| 1 | 1 | 84.83 | 11.36 | 3.23 | -4.14 |
| 2 | 6 | -8.98 | 10.45 | 0.80 | -7.77 |
| SP | 14 | ∞ | 0.00 | 0.00 | -0.00 |
| 3 | 15 | 21.73 | 6.96 | -2.41 | -6.21 |
| 4 | 21 | -637.69 | 3.36 | 21.04 | 18.36 |
| 5 | 24 | 42.45 | 2.74 | 0.13 | -1.60 |
| GB | 27 | ∞ | 1.27 | 0.50 | -0.50 |

Single lens data

| Lens | Start surface | Focal length |
|---|---|---|
| 1 | 1 | -116.31 |
| 2 | 2 | 90.05 |
| 3 | 4 | 105.65 |
| 4 | 6 | -10.96 |
| 5 | 8 | -25.98 |
| 6 | 10 | -47.27 |
| 7 | 12 | 24.85 |
| 8 | 15 | 23.39 |
| 9 | 17 | 28.22 |
| 10 | 19 | -24.57 |
| 11 | 21 | -17.93 |
| 12 | 22 | 17.86 |
| 13 | 24 | 30.86 |
| 14 | 25 | -110.42 |
| 15 | 27 | 0.00 |
| 16 | 29 | 0.00 |

[Embodiment 2]

The zoom lens of Embodiment 2 (Numerical Example 2) shown in FIG. 4A is constituted by, in order from the object side to the image side, the first lens unit L1 having a positive refractive power, the second lens unit L2 having a negative refractive power, a third lens unit L3 having a positive refractive power and a fourth lens unit L4 having a positive refractive power. The third lens unit L3 includes the aperture stop SP at its most-object side position. The zoom lens of this embodiment has a maximum image height of 13.66 mm. At a position of the image plane IP, an APS-C image sensor having a size of 16.7 mm×23.4 mm is placed. The image sensor has a pixel pitch of 4.3 μm.

Various numerical values of the zoom lens of Numerical Example 2 are shown below. Table 1 shows relations of Numerical Example 2 and the above-described conditions (1) to (6).

NUMERICAL EXAMPLE 2

Unit mm

Surface data

| Surface No. | r | d | nd | vd | Effective diameter |
|---|---|---|---|---|---|
| 1 | 113.657 | 1.90 | 1.84666 | 23.8 | 53.98 |
| 2 | 53.183 | 6.88 | 1.61800 | 63.4 | 48.92 |
| 3 | 523.832 | 0.15 | | | 47.42 |
| 4 | 46.041 | 4.39 | 1.80400 | 46.6 | 42.45 |
| 5 | 119.645 | (Variable) | | | 41.67 |
| 6* | 120.426 | 0.05 | 1.51640 | 52.2 | 24.20 |
| 7 | 65.257 | 1.20 | 1.88300 | 40.8 | 24.12 |

-continued

Unit mm

| | | | | | |
|---|---|---|---|---|---|
| 8 | 11.378 | 5.80 | | | 17.37 |
| 9 | −26.336 | 0.90 | 1.88300 | 40.8 | 16.94 |
| 10 | 35.376 | 0.15 | | | 16.40 |
| 11 | 26.235 | 5.14 | 1.80610 | 33.3 | 16.45 |
| 12 | −26.406 | 0.81 | | | 15.84 |
| 13 | −17.560 | 0.90 | 1.77250 | 49.6 | 15.62 |
| 14 | 113.521 | 2.48 | 1.80518 | 25.4 | 15.44 |
| 15 | −32.837 | (Variable) | | | 15.36 |
| 16 (SP) | ∞ | 0.63 | | | 12.38 |
| 17 | 28.653 | 2.48 | 1.62588 | 35.7 | 12.72 |
| 18 | −43.758 | 0.15 | | | 12.69 |
| 19 | 57.180 | 2.82 | 1.49700 | 81.5 | 12.48 |
| 20 | −21.362 | 0.90 | 1.84666 | 23.8 | 12.23 |
| 21 | −185.810 | 1.69 | | | 12.21 |
| 22* | −39.542 | 1.10 | 1.85135 | 40.1 | 12.13 |
| 23 | 23.050 | 1.97 | 1.84666 | 23.8 | 12.84 |
| 24 | 149.326 | (Variable) | | | 13.19 |
| 25 | 24.802 | 6.39 | 1.48749 | 70.2 | 20.47 |
| 26 | −27.011 | 0.15 | | | 20.77 |
| 27 | 54.663 | 6.77 | 1.48749 | 70.2 | 20.14 |
| 28 | −16.385 | 1.60 | 1.85006 | 40.2 | 19.46 |
| 29* | 151.303 | 1.33 | | | 19.96 |
| 30 | −74.814 | 3.32 | 1.48749 | 70.2 | 20.01 |
| 31 | −26.114 | (Variable) | | | 20.74 |
| IP | ∞ | | | | |

Aspheric data

6th surface

K = 0.00000e+000  A4 = 3.31871e−005  A6 = −7.17135e−008
A8 = −3.88476e−011  A10 = 8.49129e−013

22nd surface

K = 0.00000e+000  A4 = 1.07044e−006  A6 = 1.54939e−007
A8 = −4.61739e−009  A10 = 4.32218e−011

29th surface

K = 0.00000e+000  A4 = 2.30287e−005  A6 = 8.82248e−009
A8 = −7.08911e−011  A10 = −9.36706e−014

Various data
Zoom ratio 5.29

| | Tele | Wide-middle | Tele-middle | Tele |
|---|---|---|---|---|
| Focal length | 15.50 | 23.51 | 54.07 | 82.00 |
| F-number | 3.63 | 4.12 | 5.36 | 5.85 |
| Field angle | 41.39 | 30.16 | 14.18 | 9.46 |
| Image height | 13.66 | 13.66 | 13.66 | 13.66 |
| Entire lens length | 130.51 | 137.58 | 159.48 | 170.51 |
| Back focus | 35.54 | 42.93 | 60.27 | 67.07 |
| d5 | 2.46 | 11.06 | 27.14 | 35.19 |
| d15 | 21.12 | 14.34 | 5.61 | 2.40 |
| d24 | 9.34 | 7.19 | 4.40 | 3.81 |
| d31 | 35.54 | 42.93 | 60.27 | 67.07 |
| Entrance pupil position | 25.33 | 40.80 | 87.54 | 128.46 |
| Exit pupil Position | −55.24 | −44.91 | −35.13 | −33.41 |
| Front principal point | 38.18 | 58.02 | 110.97 | 143.55 |
| Rear principal point | 20.04 | 19.43 | 6.21 | −14.93 |

Lens unit Data

| Unit | Start surface | Focal length | Lens unit length | Front principal point | Rear principal point |
|---|---|---|---|---|---|
| 1 | 1 | 77.81 | 13.32 | 2.56 | −5.29 |
| 2 | 6 | −12.59 | 17.43 | 0.66 | −13.13 |
| 3 | 16 | 86.07 | 11.74 | −13.91 | −18.89 |
| 4 | 25 | 31.42 | 19.56 | 1.86 | −12.41 |

-continued

Unit mm

Single lens data

| Lens | Start surface | Focal length |
|---|---|---|
| 1 | 1 | −119.78 |
| 2 | 2 | 95.25 |
| 3 | 4 | 90.68 |
| 4 | 6 | −275.93 |
| 5 | 7 | −15.77 |
| 6 | 9 | −16.98 |
| 7 | 11 | 17.07 |
| 8 | 13 | −19.63 |
| 9 | 14 | 31.87 |
| 10 | 17 | 28.03 |
| 11 | 19 | 31.67 |
| 12 | 20 | −28.58 |
| 13 | 22 | −16.97 |
| 14 | 23 | 31.97 |
| 15 | 25 | 27.64 |
| 16 | 27 | 26.69 |
| 17 | 28 | −17.32 |
| 18 | 30 | 80.49 |

[Embodiment 3]

The zoom lens of Embodiment 3 (Numerical Example 3) shown in FIG. 7A is constituted by, in order from the object side to the image side, the first lens unit L1 having a negative refractive power, the second lens unit L2 having a positive refractive power, a third lens unit L3 having a positive refractive power and a fourth lens unit L4 having a negative refractive power. The second lens unit L2 includes the aperture stop SP at its most-object side position. The zoom lens of this embodiment has a maximum image height of 3.875 mm. At a position of the image plane IP, a 1/2.3"-type image sensor having a size of 4.65 mm×6.2 mm is placed. The image sensor has a pixel pitch of 1.4 μm.

Various numerical values of the zoom lens of Numerical Example 3 are shown below. Table 1 shows relations of Numerical Example 3 and the above-described conditions (1) to (4), (7) and (8).

NUMERICAL EXAMPLE 3

Unit mm

Surface data

| Surface No. | r | d | nd | vd | Effective diameter |
|---|---|---|---|---|---|
| 1 | 295.700 | 2.75 | 1.80610 | 33.3 | 55.72 |
| 2 | 54.695 | 12.36 | 1.43875 | 94.9 | 53.95 |
| 3 | −164.648 | 0.28 | | | 54.02 |
| 4 | 64.541 | 7.90 | 1.43387 | 95.1 | 53.09 |
| 5 | −1787.494 | 0.20 | | | 52.40 |
| 6 | 41.571 | 6.53 | 1.72916 | 54.7 | 48.22 |
| 7 | 121.740 | (Variable) | | | 47.23 |
| 8 | 29.045 | 1.05 | 1.88300 | 40.8 | 18.73 |
| 9 | 7.595 | 5.10 | | | 13.38 |
| 10 | −31.677 | 0.95 | 1.83481 | 42.7 | 13.22 |
| 11 | 23.837 | 0.20 | | | 13.20 |
| 12 | 15.622 | 2.56 | 1.92286 | 18.9 | 13.61 |
| 13 | 162.193 | 0.85 | 1.59282 | 68.6 | 13.36 |
| 14 | 56.850 | (Variable) | | | 13.08 |
| 15 (SP) | ∞ | 0.72 | | | 11.44 |
| 16 | ∞ | 6.44 | | | 11.59 |
| 17 | 613.295 | 0.80 | 1.83481 | 42.7 | 12.91 |
| 18 | 17.223 | 2.69 | 1.80518 | 25.4 | 13.11 |
| 19 | −104.938 | 0.20 | | | 13.25 |

-continued

Unit mm

| | | | | | |
|---|---|---|---|---|---|
| 20* | −251.445 | 4.03 | 1.58313 | 59.4 | 13.29 |
| 21 | −10.187 | 0.85 | 1.76200 | 40.1 | 13.43 |
| 22 | 33.709 | 0.20 | | | 14.45 |
| 23 | 29.883 | 3.30 | 1.62299 | 58.2 | 14.75 |
| 24 | −21.973 | (Variable) | | | 15.04 |
| 25 | 96.299 | 1.86 | 1.69680 | 55.5 | 15.07 |
| 26 | −50.732 | 0.20 | | | 15.01 |
| 27 | 33.997 | 0.85 | 1.84666 | 23.9 | 14.51 |
| 28 | 13.453 | 4.33 | 1.69680 | 55.5 | 13.82 |
| 29 | −109.010 | (Variable) | | | 13.51 |
| 30 | ∞ | 0.80 | 1.52420 | 60.0 | 30.00 |
| 31 | ∞ | 2.43 | 1.54400 | 70.0 | 30.00 |
| 32 | ∞ | 1.50 | | | 30.00 |
| 33 | ∞ | 20.00 | 1.58913 | 61.1 | 30.00 |
| 34 | ∞ | 0.50 | 1.50000 | 60.0 | 30.00 |
| 35 | ∞ | (Variable) | | | 30.00 |
| IP | ∞ | | | | |

Aspheric data

20th surface

K = −1.27123e+000   A4 = −1.25967e−006   A6 = 3.75341e−009
A8 = −3.08875e−009  A10 = 5.88552e−011   A12 = 4.97575e−014

Various data
Zoom ratio 19.54

| | Tele | Wide-middle | Tele-middle | Tele |
|---|---|---|---|---|
| Focal length | 4.62 | 9.71 | 42.94 | 90.27 |
| F-number | 1.66 | 1.88 | 2.69 | 3.50 |
| Field angle | 33.00 | 17.16 | 4.00 | 1.90 |
| Image height | 3.00 | 3.00 | 3.00 | 3.00 |
| Entire lens length | 145.32 | 145.32 | 145.32 | 145.32 |
| Back focus | 0.80 | 0.80 | 0.80 | 0.80 |
| d7 | 0.75 | 15.65 | 33.04 | 38.03 |
| d14 | 37.82 | 22.92 | 5.53 | 0.54 |
| d24 | 9.89 | 7.94 | 6.42 | 12.03 |
| d29 | 3.63 | 5.57 | 7.09 | 1.49 |
| d35 | 0.80 | 0.80 | 0.80 | 0.80 |
| Entrance pupil position | 35.22 | 76.90 | 248.71 | 403.07 |
| Exit pupil Position | 99.39 | 141.08 | 215.36 | 76.74 |
| Front principal point | 40.06 | 87.29 | 300.23 | 600.63 |
| Rear principal point | −3.82 | −8.91 | −42.14 | −89.47 |

Lens unit Data

| Unit | Start surface | Focal length | Lens unit length | Front principal point | Rear principal point |
|---|---|---|---|---|---|
| 1 | 1 | 55.54 | 30.03 | 14.33 | −5.06 |
| 2 | 8 | −9.59 | 10.71 | 1.49 | −6.39 |
| 3 | 15 | 65.75 | 19.23 | 16.27 | 1.77 |
| 4 | 25 | 24.81 | 7.24 | 1.36 | −3.01 |
| G | 30 | ∞ | 25.23 | 8.26 | −8.26 |

Single lens data

| Lens | Start surface | Focal length |
|---|---|---|
| 1 | 1 | −83.68 |
| 2 | 2 | 95.21 |
| 3 | 4 | 143.76 |
| 4 | 6 | 83.70 |
| 5 | 8 | −11.92 |
| 6 | 10 | −16.17 |
| 7 | 12 | 18.58 |
| 8 | 13 | −148.09 |
| 9 | 17 | −21.24 |
| 10 | 18 | 18.56 |
| 11 | 20 | 18.10 |
| 12 | 21 | −10.18 |
| 13 | 23 | 20.83 |
| 14 | 25 | 47.93 |
| 15 | 27 | −26.80 |

-continued

Unit mm

| | | |
|---|---|---|
| 16 | 28 | 17.44 |
| 17 | 30 | 0.00 |
| 18 | 31 | 0.00 |
| 19 | 33 | 0.00 |
| 20 | 34 | 0.00 |

[Embodiment 4]

The zoom lens of Embodiment 4 (Numerical Example 4) shown in FIG. 10A is constituted by, in order from the object side to the image side, the first lens unit L1 having a positive refractive power, the second lens unit L2 having a negative refractive power, the aperture stop SP, a third lens unit L3 having a positive refractive power, a fourth lens unit L4 having a positive refractive power and the glass block G. The zoom lens of this embodiment has a maximum image height of 3.0 mm. At a position of the image plane IP, a ⅓"-type image sensor having a size of 3.6 mm×4.8 mm is placed. The image sensor has a pixel pitch of 2.7 μm.

Various numerical values of the zoom lens of Numerical Example 4 are shown below. Table 1 shows relations of Numerical Example 4 and the above-described conditions (1) to (6).

NUMERICAL EXAMPLE 4

Unit mm

Surface data

| Surface No. | r | d | nd | vd | Effective diameter |
|---|---|---|---|---|---|
| 1 | 295.700 | 2.75 | 1.80610 | 33.3 | 55.72 |
| 2 | 54.695 | 12.36 | 1.43875 | 94.9 | 53.95 |
| 3 | −164.648 | 0.28 | | | 54.02 |
| 4 | 64.541 | 7.90 | 1.43387 | 95.1 | 53.09 |
| 5 | −1787.494 | 0.20 | | | 52.40 |
| 6 | 41.571 | 6.53 | 1.72916 | 54.7 | 48.22 |
| 7 | 121.740 | (Variable) | | | 47.23 |
| 8 | 29.045 | 1.05 | 1.88300 | 40.8 | 18.73 |
| 9 | 7.595 | 5.10 | | | 13.38 |
| 10 | −31.677 | 0.95 | 1.83481 | 42.7 | 13.22 |
| 11 | 23.837 | 0.20 | | | 13.20 |
| 12 | 15.622 | 2.56 | 1.92286 | 18.9 | 13.61 |
| 13 | 162.193 | 0.85 | 1.59282 | 68.6 | 13.36 |
| 14 | 56.850 | (Variable) | | | 13.08 |
| 15 (SP) | ∞ | 0.72 | | | 11.44 |
| 16 | ∞ | 6.44 | | | 11.59 |
| 17 | 613.295 | 0.80 | 1.83481 | 42.7 | 12.91 |
| 18 | 17.223 | 2.69 | 1.80518 | 25.4 | 13.11 |
| 19 | −104.938 | (Variable) | | | 13.25 |
| 20* | −251.445 | 4.03 | 1.58313 | 59.4 | 13.29 |
| 21 | −10.187 | 0.85 | 1.76200 | 40.1 | 13.43 |
| 22 | 33.709 | 0.20 | | | 14.45 |
| 23 | 29.883 | 3.30 | 1.62299 | 58.2 | 14.75 |
| 24 | −21.973 | (Variable) | | | 15.04 |
| 25 | 96.299 | 1.86 | 1.69680 | 55.5 | 15.07 |
| 26 | −50.732 | 0.20 | | | 15.01 |
| 27 | 33.997 | 0.85 | 1.84666 | 23.9 | 14.51 |
| 28 | 13.453 | 4.33 | 1.69680 | 55.5 | 13.82 |
| 29 | −109.010 | (Variable) | | | 13.51 |
| 30 | ∞ | 0.80 | 1.52420 | 60.0 | 30.00 |
| 31 | ∞ | 2.43 | 1.54400 | 70.0 | 30.00 |
| 32 | ∞ | 1.50 | | | 30.00 |
| 33 | ∞ | 20.00 | 1.58913 | 61.1 | 30.00 |
| 34 | ∞ | 0.50 | 1.50000 | 60.0 | 30.00 |
| 35 | ∞ | (Variable) | | | 30.00 |
| IP | ∞ | | | | |

-continued

Unit mm

Aspheric data
20th surface

| | | |
|---|---|---|
| K = −1.27123e+000 | A4 = −1.25967e−006 | A6 = 3.75341e−009 |
| A8 = −3.08875e−009 | A10 = 5.88552e−011 | A12 = 4.97575e−014 |

Various data
Zoom ratio 19.54

| | Tele | Wide-middle | Tele-middle | Tele |
|---|---|---|---|---|
| Focal length | 4.62 | 9.71 | 42.94 | 90.27 |
| F-number | 1.66 | 1.88 | 2.69 | 3.50 |
| Field angle | 33.00 | 17.16 | 4.00 | 1.90 |
| Image height | 3.00 | 3.00 | 3.00 | 3.00 |
| Entire lens length | 145.32 | 145.32 | 145.32 | 145.32 |
| Back focus | 0.80 | 0.80 | 0.80 | 0.80 |
| d7 | 0.75 | 15.65 | 33.04 | 38.03 |
| d14 | 37.82 | 22.92 | 5.53 | 0.54 |
| d19 | 0.20 | 0.20 | 0.20 | 0.20 |
| d24 | 9.89 | 7.94 | 6.42 | 12.03 |
| d29 | 3.63 | 5.57 | 7.09 | 1.49 |
| d35 | 0.80 | 0.80 | 0.80 | 0.80 |
| Entrance pupil position | 35.22 | 76.90 | 248.71 | 403.07 |
| Exit pupil Position | 99.39 | 141.08 | 215.36 | 76.74 |
| Front principal point | 40.06 | 87.29 | 300.23 | 600.63 |
| Rear principal point | −3.82 | −8.91 | −42.14 | −89.47 |

Lens unit Data

| Unit | Start surface | Focal length | Lens unit length | Front principal point | Rear principal point |
|---|---|---|---|---|---|
| 1 | 1 | 55.54 | 30.03 | 14.33 | −5.06 |
| 2 | 8 | −9.59 | 10.71 | 1.49 | −6.39 |
| 3 | 15 | 136.72 | 10.65 | 9.08 | −0.01 |
| 4 | 20 | 115.02 | 8.38 | 12.38 | 7.82 |
| 5 | 25 | 24.81 | 7.24 | 1.36 | −3.01 |
| G | 30 | ∞ | 25.23 | 8.26 | −8.26 |

Single lens data

| Lens | Start surface | Focal length |
|---|---|---|
| 1 | 1 | −83.68 |
| 2 | 2 | 95.21 |
| 3 | 4 | 143.76 |
| 4 | 6 | 83.70 |
| 5 | 8 | −11.92 |
| 6 | 10 | −16.17 |
| 7 | 12 | 18.58 |
| 8 | 13 | −148.09 |
| 9 | 17 | −21.24 |
| 10 | 18 | 18.56 |
| 11 | 20 | 18.10 |
| 12 | 21 | −10.18 |
| 13 | 23 | 20.83 |
| 14 | 25 | 47.93 |
| 15 | 27 | −26.80 |
| 16 | 28 | 17.44 |
| 17 | 30 | 0.00 |
| 18 | 31 | 0.00 |
| 19 | 33 | 0.00 |
| 20 | 34 | 0.00 |

[Embodiment 5]

The zoom lens of Embodiment 5 (Numerical Example 5) shown in FIG. 13A is constituted by, in order from the object side to the image side, the first lens unit L1 having a positive refractive power, the second lens unit L2 having a negative refractive power, the aperture stop SP, a third lens unit L3 having a positive refractive power, a fourth lens unit L4 having a negative e refractive power, a fifth lens unit L5 having a positive refractive power and the glass block GB. The zoom lens of this embodiment has a maximum image height of 3.875 mm. At a position of the image plane IP, a 1/2.3″-type image sensor having a size of 4.65 mm×6.2 mm is placed. The image sensor has a pixel pitch of 0.3 μm.

Various numerical values of the zoom lens of Numerical Example 5 are shown below. Table 1 shows relations of Numerical Example 5 and the above-described conditions (1) to (6).

NUMERICAL EXAMPLE 5

Unit mm

Surface data

| Surface No. | r | d | nd | vd | Effective diameter |
|---|---|---|---|---|---|
| 1 | 108.139 | 1.80 | 1.72047 | 34.7 | 41.98 |
| 2 | 46.878 | 5.40 | 1.49700 | 81.5 | 38.18 |
| 3 | −948.122 | 0.18 | | | 38.05 |
| 4 | 51.472 | 3.98 | 1.59282 | 68.6 | 37.30 |
| 5 | 280.522 | (Variable) | | | 36.86 |
| 6 | 142.830 | 0.95 | 1.88300 | 40.8 | 19.54 |
| 7 | 9.035 | 3.88 | | | 14.13 |
| 8 | 417.772 | 0.80 | 1.80400 | 46.6 | 13.84 |
| 9 | 19.875 | 1.94 | | | 13.27 |
| 10 | −96.447 | 0.70 | 1.80400 | 46.6 | 13.28 |
| 11 | 62.883 | 0.20 | | | 13.36 |
| 12 | 19.599 | 2.00 | 1.94595 | 18.0 | 13.68 |
| 13 | 111.879 | Variable) | | | 13.48 |
| 14 (SP) | ∞ | (Variable) | | | 8.74 |
| 15* | 12.943 | 3.29 | 1.55332 | 71.7 | 12.69 |
| 16* | −54545.449 | 0.20 | | | 12.58 |
| 17 | 13.671 | 2.52 | 1.43875 | 94.9 | 12.49 |
| 18 | −123.226 | 0.32 | | | 12.19 |
| 19 | 17.759 | 0.60 | 1.83400 | 37.2 | 11.41 |
| 20 | 9.367 | (Variable) | | | 10.62 |
| 21 | 21.415 | 0.70 | 1.90366 | 31.3 | 10.60 |
| 22 | 8.940 | 2.68 | 1.59276 | 40.1 | 10.18 |
| 23 | 60.355 | (Variable) | | | 10.12 |
| 24 | 21.419 | 2.14 | 1.49796 | 81.5 | 11.72 |
| 25 | −51.928 | 0.60 | 2.00069 | 25.5 | 11.64 |
| 26 | −99.982 | (Variable) | | | 11.64 |
| 27 | ∞ | 0.30 | 1.51633 | 64.1 | 30.00 |
| 28 | ∞ | 0.47 | | | 30.00 |
| 29 | ∞ | 0.50 | 1.51633 | 64.1 | 30.00 |
| 30 | ∞ | (Variable) | | | 30.00 |
| IP | ∞ | | | | |

Aspheric data

15th surface

| | | |
|---|---|---|
| K = −2.41580e+000 | A4 = 7.89141e−005 | A6 = −3.47105e−007 |
| A8 = 6.16247e−009 | A10 = −4.91024e−011 | |

16th surface

| | | |
|---|---|---|
| K = −1.89560e+010 | A4 = 2.26087e−005 | A6 = 1.86093e−007 |

Various data
Zoom ratio 55.70

| | Tele | Wide-middle | Tele-middle | Tele |
|---|---|---|---|---|
| Focal length | 3.86 | 10.55 | 78.70 | 215.00 |
| F-number | 2.87 | 5.00 | 6.00 | 7.07 |
| Field angle | 40.81 | 20.17 | 2.82 | 0.95 |
| Image height | 3.33 | 3.88 | 3.88 | 3.56 |
| Entire lens length | 105.00 | 100.00 | 142.21 | 151.00 |
| Back focus | 0.52 | 0.52 | 0.52 | 0.52 |
| d5 | 0.78 | 12.45 | 57.12 | 66.10 |
| d13 | 31.86 | 8.45 | 4.52 | 1.50 |
| d14 | 19.63 | 14.64 | 2.19 | 1.50 |
| d20 | 2.01 | 1.51 | 3.85 | 4.17 |
| d23 | 5.98 | 13.07 | 11.05 | 33.06 |
| d26 | 8.08 | 13.19 | 26.82 | 8.00 |
| d30 | 0.52 | 0.52 | 0.52 | 0.52 |

-continued

Unit mm

| | | | | |
|---|---|---|---|---|
| Entrance pupil position | 18.65 | 35.12 | 327.64 | 697.90 |
| Exit pupil Position | 76.26 | 431.24 | −76.20 | 1259.01 |
| Front principal point | 22.70 | 45.93 | 325.62 | 949.63 |
| Rear principal point | −3.34 | −10.03 | −78.18 | −214.48 |

Lens unit Data

| Unit | Start surface | Focal length | Lens unit length | Front principal point | Rear principal point |
|---|---|---|---|---|---|
| 1 | 1 | 84.84 | 11.37 | 3.23 | −4.15 |
| 2 | 6 | −8.98 | 10.46 | 0.80 | −7.78 |
| SP | 14 | ∞ | 0.00 | 0.00 | −0.00 |
| 3 | 15 | 21.73 | 6.93 | −2.40 | −6.18 |
| 4 | 21 | −634.10 | 3.38 | 21.01 | 18.33 |
| 5 | 24 | 42.51 | 2.74 | 0.15 | −1.59 |
| GB | 27 | ∞ | 1.27 | 0.50 | −0.50 |

Single lens data

| Lens | Start surface | Focal length |
|---|---|---|
| 1 | 1 | −116.29 |
| 2 | 2 | 90.04 |
| 3 | 4 | 105.65 |
| 4 | 6 | −10.96 |
| 5 | 8 | −25.98 |
| 6 | 10 | −47.25 |
| 7 | 12 | 24.86 |
| 8 | 15 | 23.39 |
| 9 | 17 | 28.21 |
| 10 | 19 | −24.57 |
| 11 | 21 | −17.45 |
| 12 | 22 | 17.37 |
| 13 | 24 | 30.75 |
| 14 | 25 | −108.65 |
| 15 | 27 | 0.00 |
| 16 | 29 | 0.00 |

TABLE 1

Numerical Example 1

| | Numerical Example 1 | Numerical Example 2 | Numerical Example 3 | Numerical Example 4 | Numerical Example 5 |
|---|---|---|---|---|---|
| $|(\Delta TM_{yu} + \Delta TM_{yl})/(\Delta WM_{yu} + \Delta WM_{yl})|$ | 0.497 | 0.171 | 0.298 | 0.25 | 0.636 |
| $|(\Delta WM_{yu} + \Delta WM_{yl})|/2P$ | 2.504 | 1.577 | 4.453 | 3.751 | 13.46 |
| Swm/Stm | 0.497 | 0.171 | 0.298 | 0.25 | 0.636 |
| Swm/2P | 2.504 | 1.577 | 4.453 | 3.751 | 13.46 |
| f1/ft | 0.395 | 0.949 | −0.73 | 0.615 | 0.395 |
| f2/ft | −0.042 | −0.154 | 0.667 | −0.106 | −0.042 |

Each of Embodiments 1 to 5 can achieve a compact zoom lens having a high magnification with generating appropriate aberration for the image restoration. Performing image capturing using this zoom lens and then performing the image restoration process can achieve a compact image pickup apparatus capable of providing high quality images.

Next, description will be made of specific examples of an optical system (image capturing optical system) which is capable of focusing on objects at various object distances and which can provide high quality images over an entire range of the object distance with a compact size by generating aberration that generates image degradation appropriate for correction by the image restoration as sixth to eighth embodiments (Embodiments 6 to 8).

Figure 21:
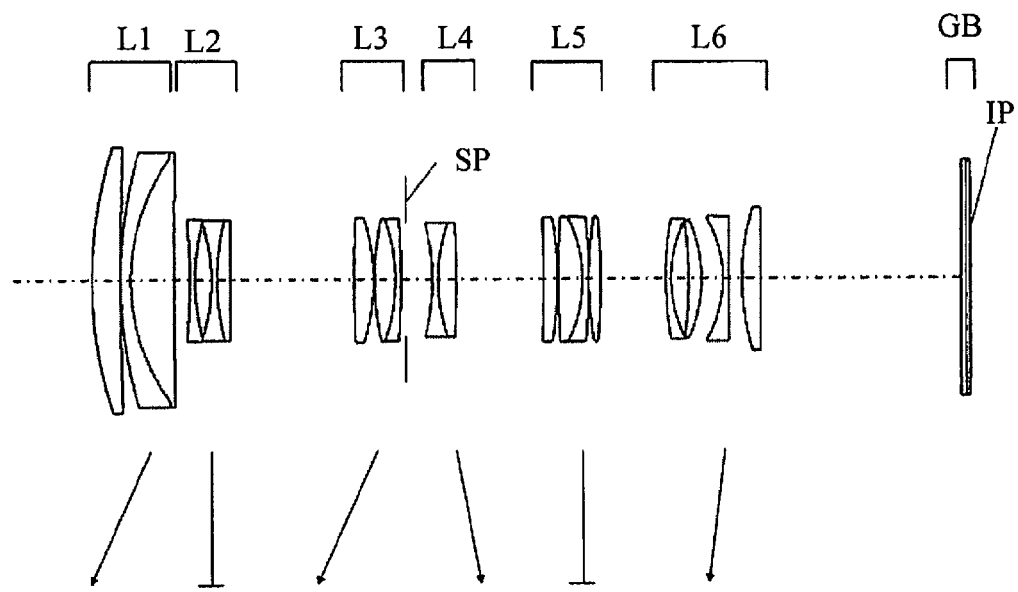
FIG. 21 is a sectional view of an optical system that is Embodiment 6 (Numerical Example 6) of the present invention at a wide-angle end.
Figure 26:
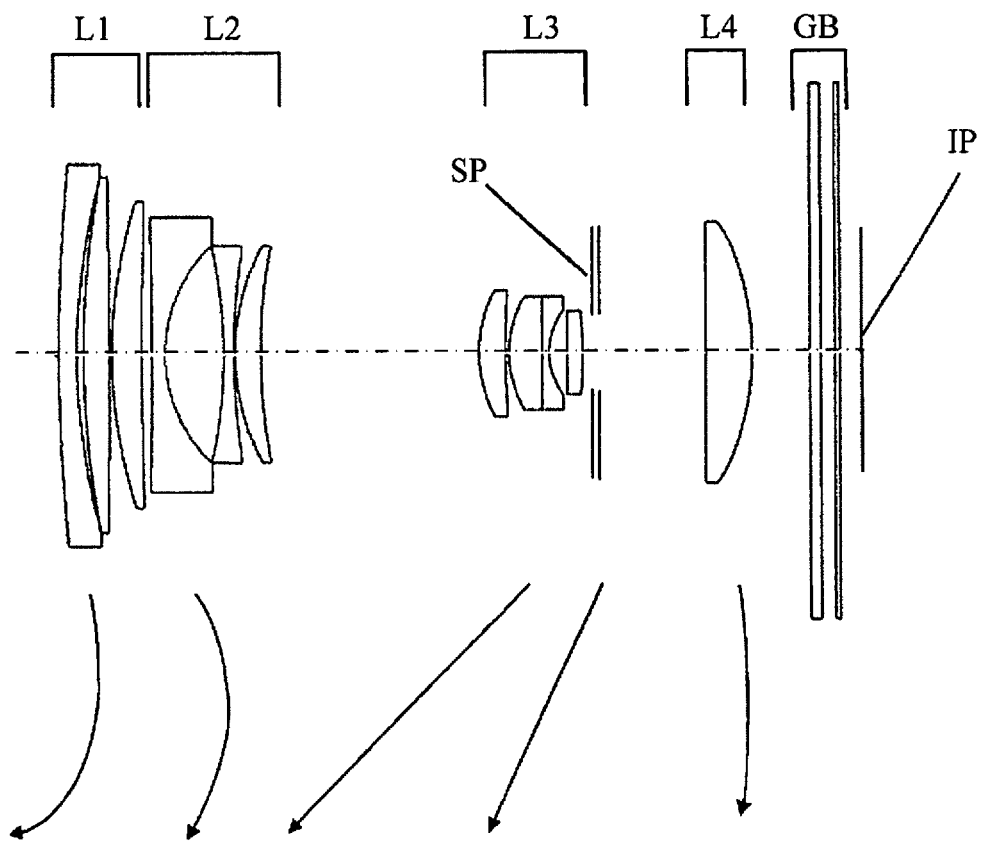
FIG. 26 is a sectional view of an optical system that is Embodiment 7 (Numerical Example 7) of the present invention at a wide-angle end.
Figure 31:
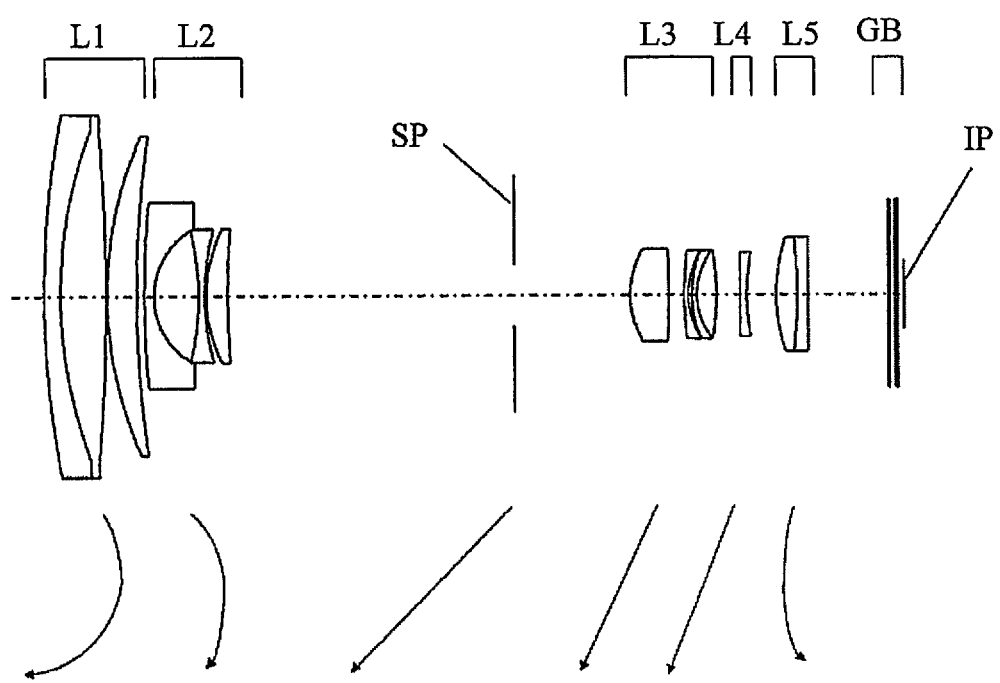
FIG. 31 is a sectional view of an optical system that is Embodiment 8 (Numerical Example 8) of the present invention at a wide-angle end.

FIGS. 21, 26 and 31 are respectively sectional views of the zoom lenses of Embodiments 6 to 8 at a wide-angle end. Arrows drawn below respective lens units (L1 to L6) and an aperture stop (SP) show movements thereof in an optical axis direction during variation of magnification (hereinafter simply referred to as "zooming") from the wide-angle end to a telephoto end. Although the optical system of each of Embodiments 6 to 8 is a zoom lens capable of zooming, a fixed focal length lens which is not capable of zooming but is capable of focusing by moving a focus lens unit such that an focused image is formed on an image pickup surface (image sensor surface) is included in embodiments of the present invention.

Figure 22A:
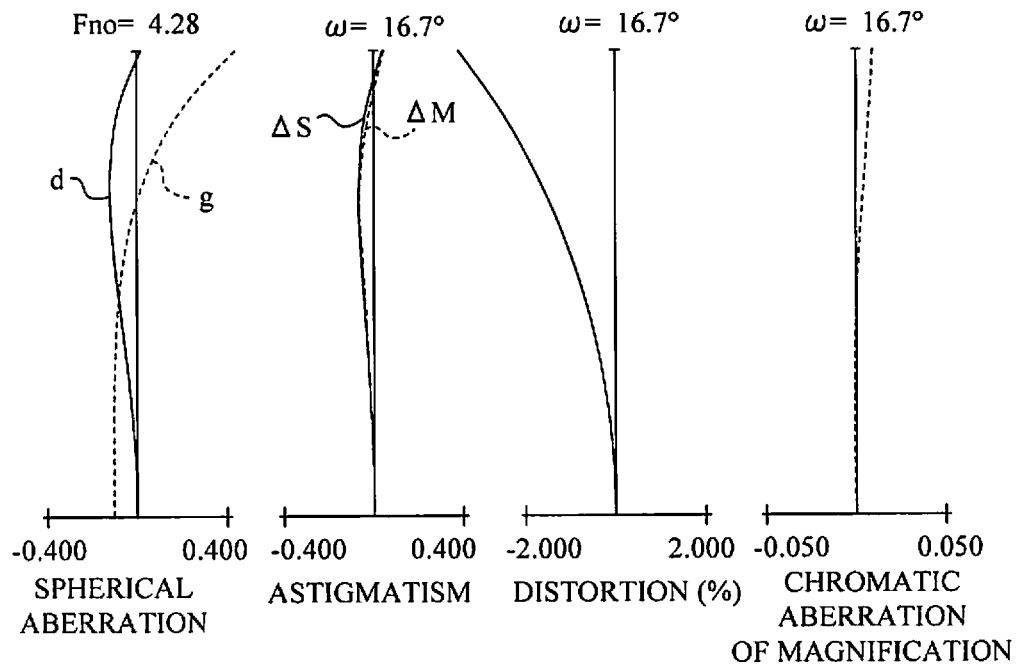
FIGS. 22A and 22B are longitudinal aberration charts of the optical system of Embodiment 6 at the wide-angle end and at a middle focal length in an infinite object distance in-focus state.
Figure 22B:
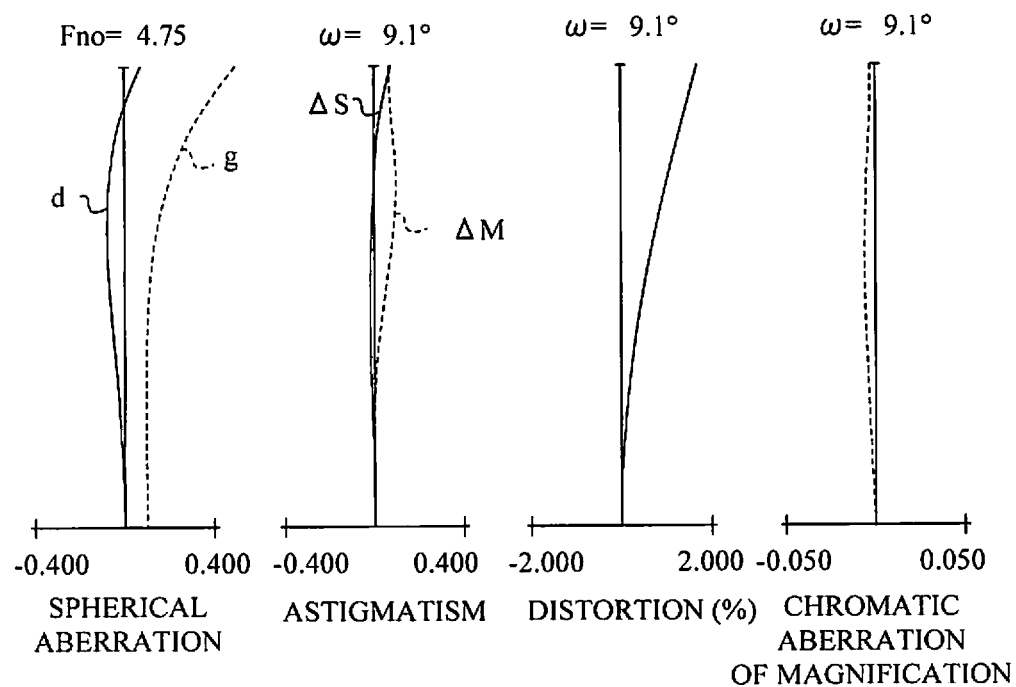
Figure 23A:
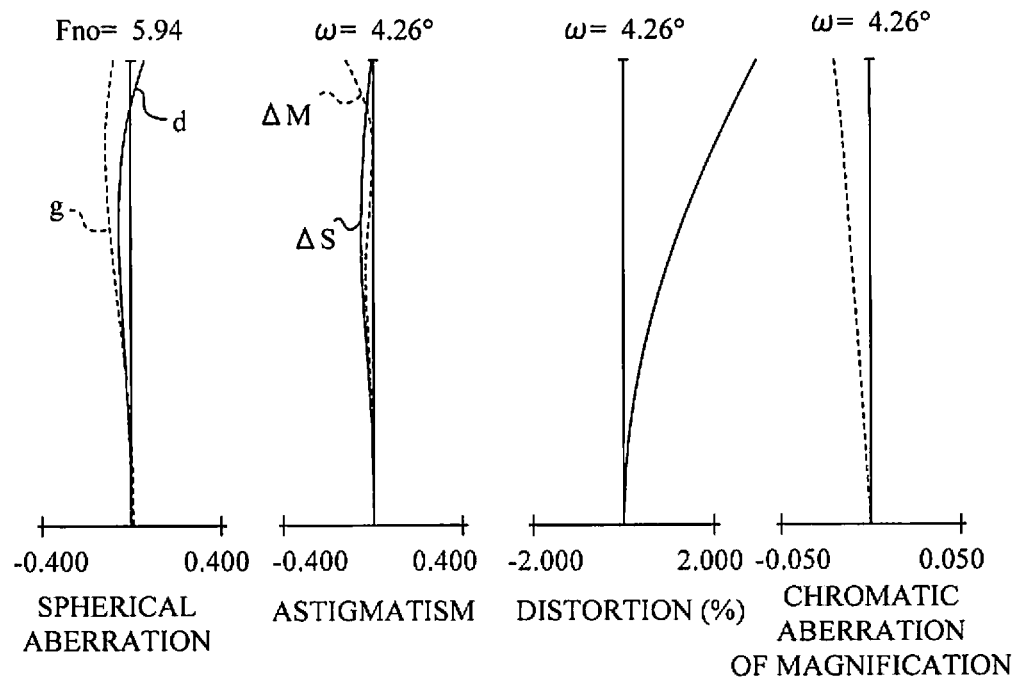
FIGS. 23A and 23B are longitudinal and lateral aberration charts of the optical system of Embodiment 6 at a telephoto end in the infinite object distance in-focus state.
Figure 23B:
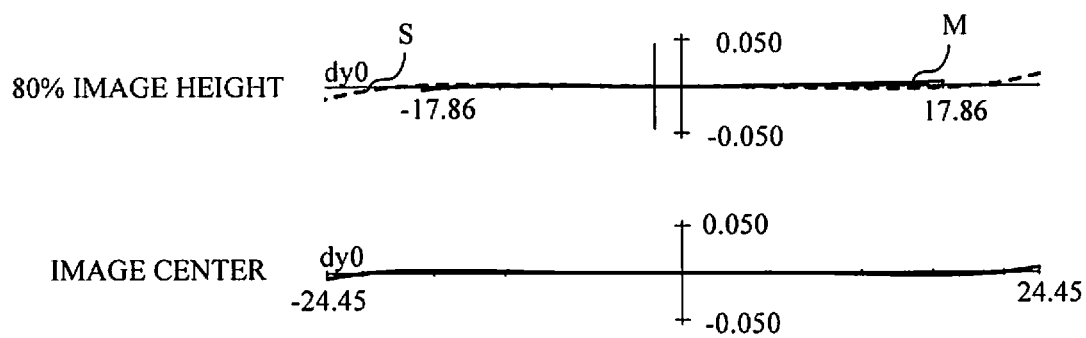

FIGS. 22A and 22B are longitudinal aberration charts of the optical system of Embodiment 6 at the wide-angle end and at a middle focal length in a state where the optical system is focused on an infinite object distance (infinity end). The state where the optical system is focused on the infinite object distance is hereinafter referred to as "an infinite object distance in-focus state". FIGS. 23A and 23B are longitudinal and lateral aberration charts of the optical system of Embodiment 6 at a telephoto end in the infinite object distance in-focus state. The longitudinal aberration charts show spherical aberration, astigmatism, distortion and chromatic aberration of magnification. The lateral aberration charts show lateral aberrations at an image center and at an 80 percent image height (described later).

Figure 24A:
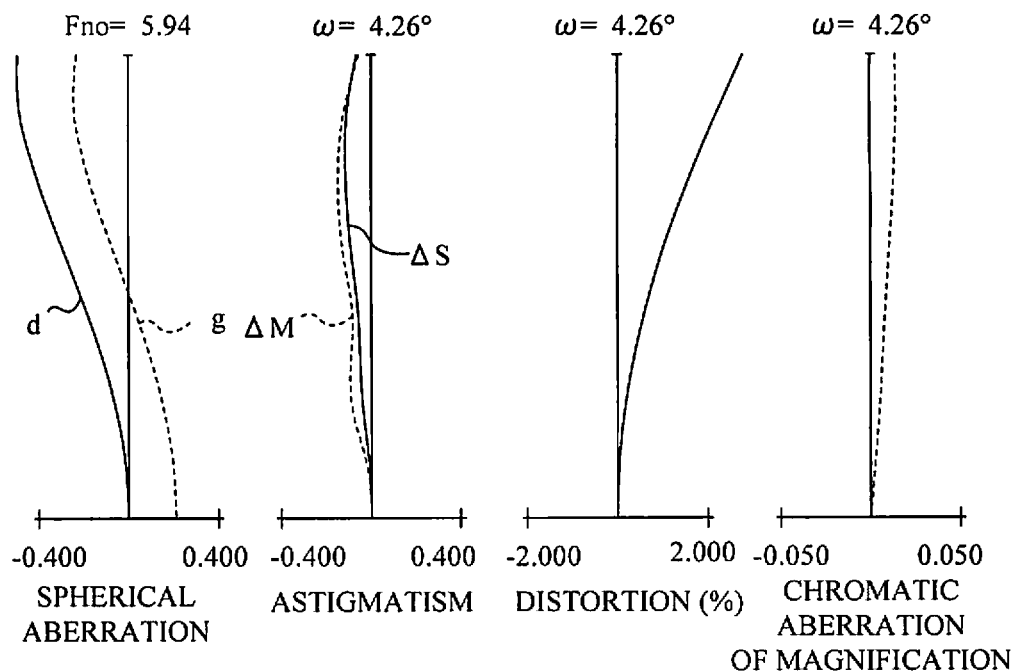
FIGS. 24A and 24B are longitudinal and lateral aberration charts of the optical system of Embodiment 6 at the telephoto end in a closest object distance in-focus state.
Figure 24B:
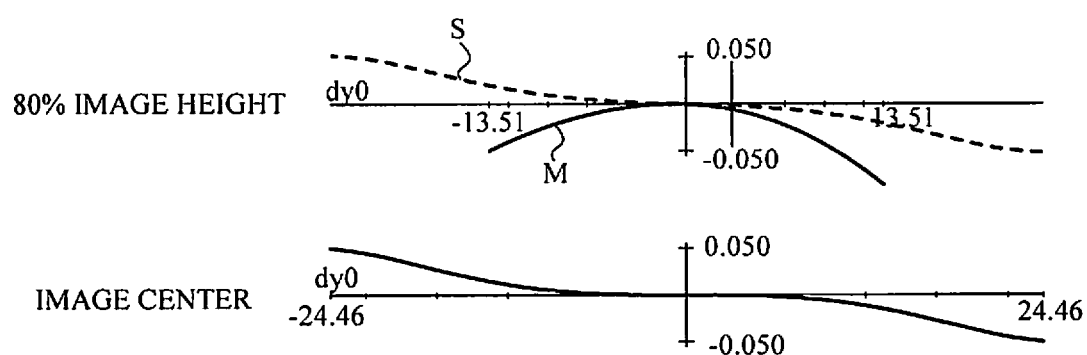
Figure 25A:
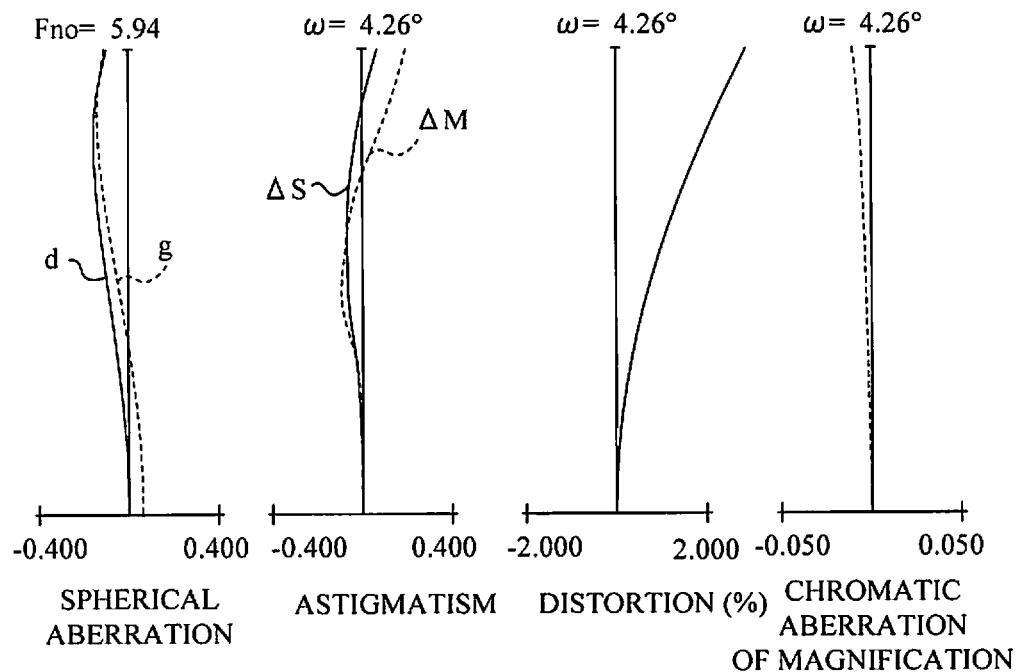
FIGS. 25A and 25B are longitudinal and lateral aberration charts of the optical system of Embodiment 6 at the telephoto end in a middle object distance in-focus state.
Figure 25B:
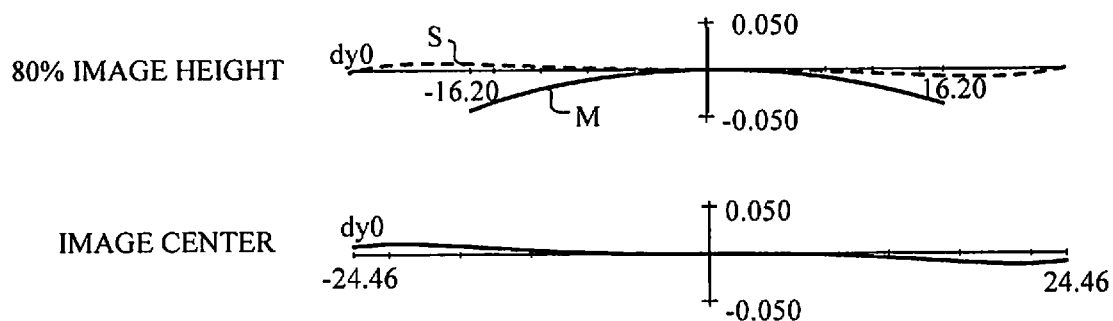

Moreover, FIGS. 24A and 24B are longitudinal and lateral aberration charts of the optical system of Embodiment 6 at the telephoto end in a state where the optical system is focused on a closest object distance (closest end). The state where the optical system is focused on the closest object distance is hereinafter referred to as "a closest object distance in-focus state". FIGS. 25A and 25B are longitudinal and lateral aberration charts of the optical system of Embodiment 6 at the telephoto end in a state where the optical system is focused on a middle object distance. The state where the optical system is focused on the middle object distance is hereinafter referred to as "a middle object distance in-focus state".

Figure 27A:
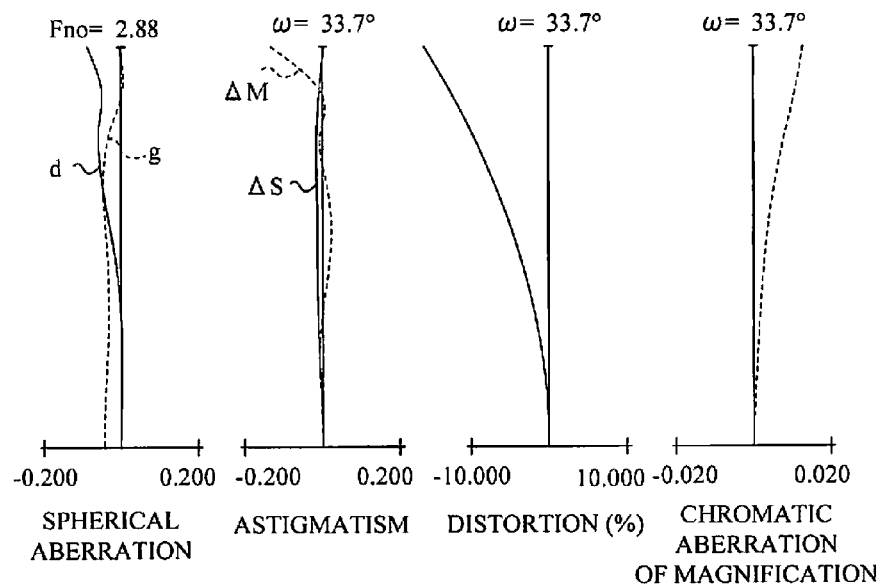
FIGS. 27A and 27B are longitudinal aberration charts of the optical system of Embodiment 7 at the wide-angle end and at a telephoto end in an infinite object distance in-focus state.
Figure 27B:
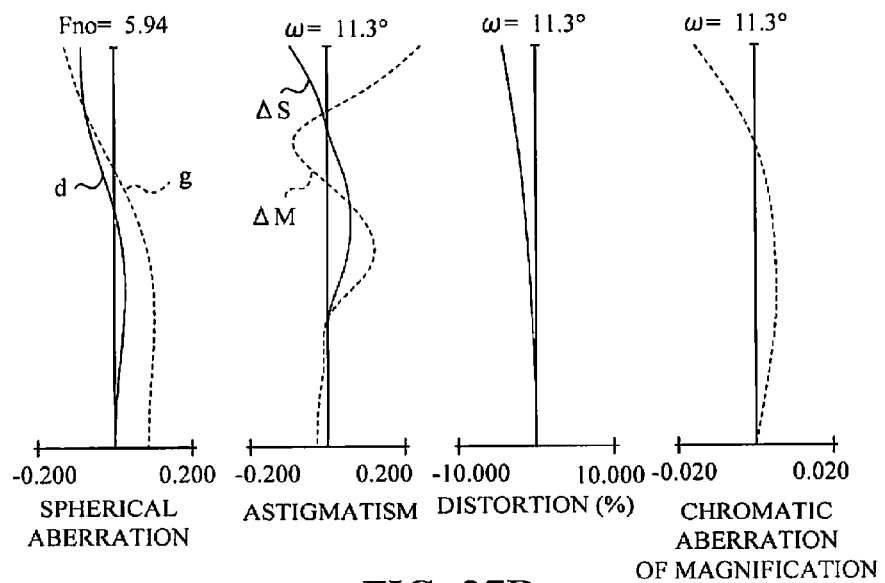
Figure 28A:
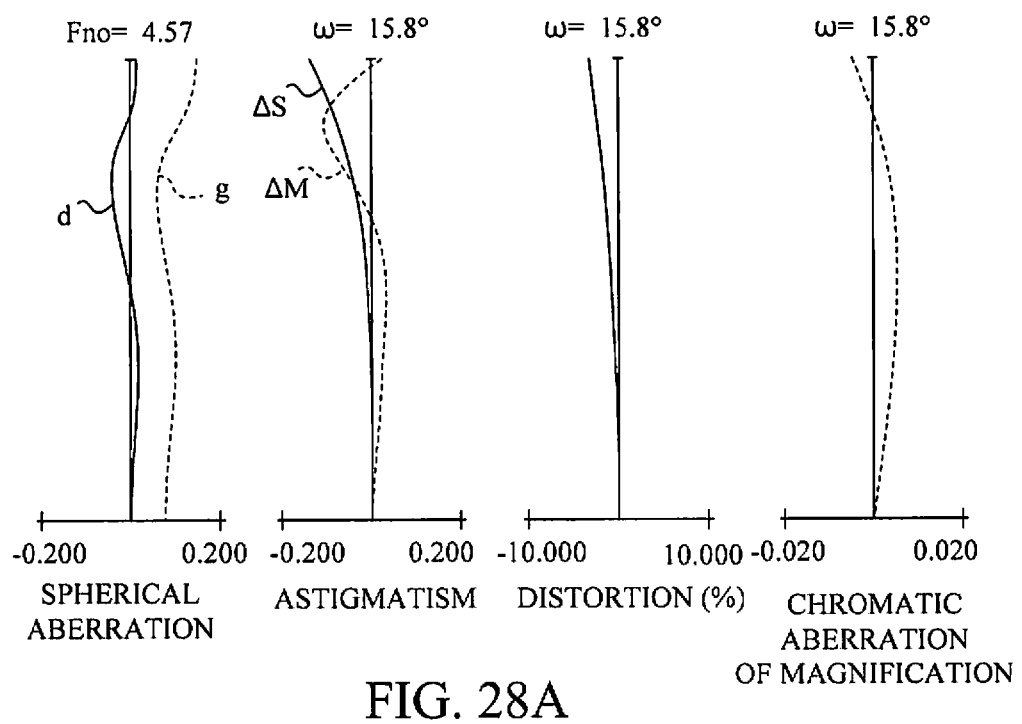
FIGS. 28A and 28B are longitudinal and lateral aberration charts of the optical system of Embodiment 7 at a middle focal length in the infinite object distance in-focus state.
Figure 28B:
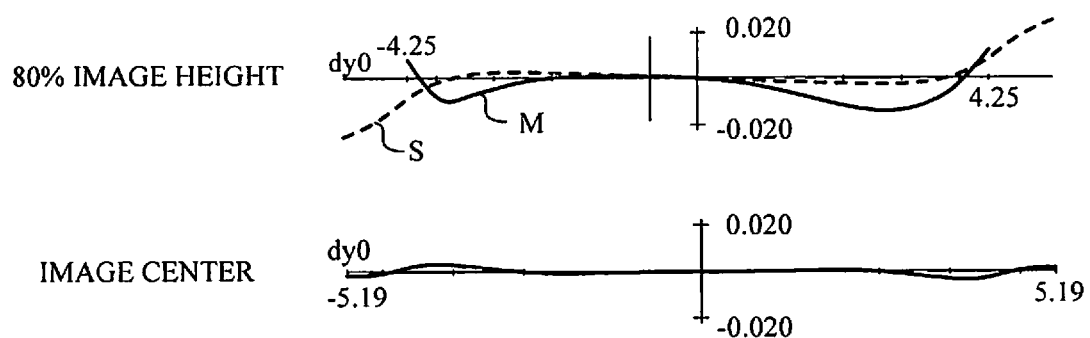
Figure 29A:
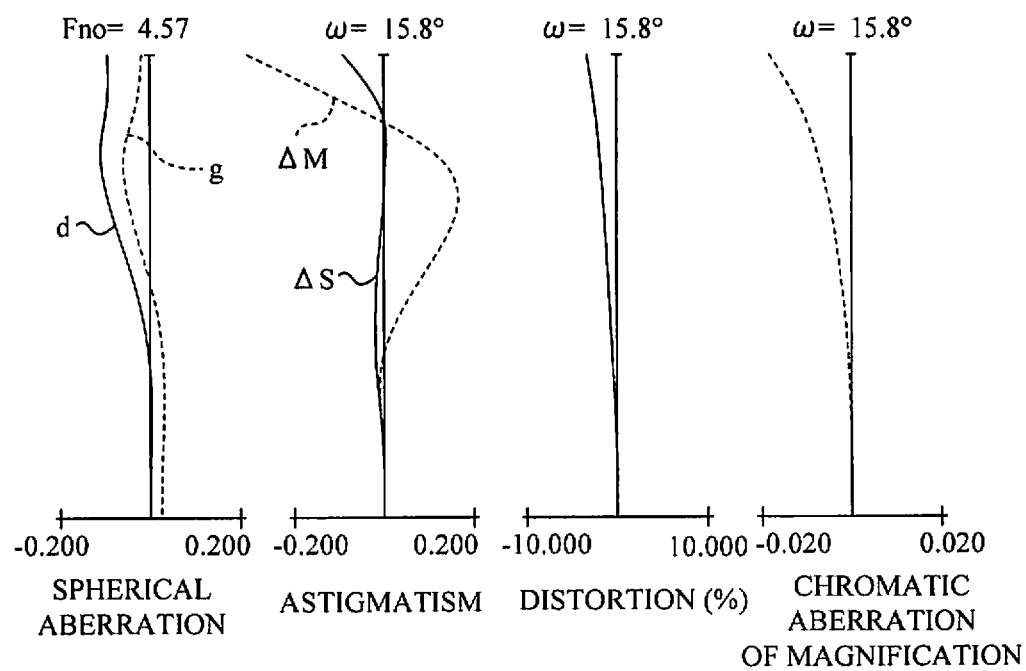
FIGS. 29A and 29B are longitudinal and lateral aberration charts of the optical system of Embodiment 7 at the middle focal length in a closest object distance in-focus state.
Figure 29B:
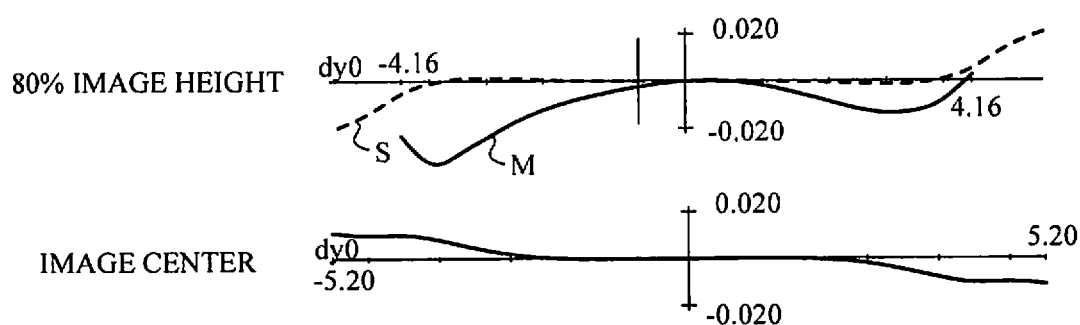
Figure 30A:
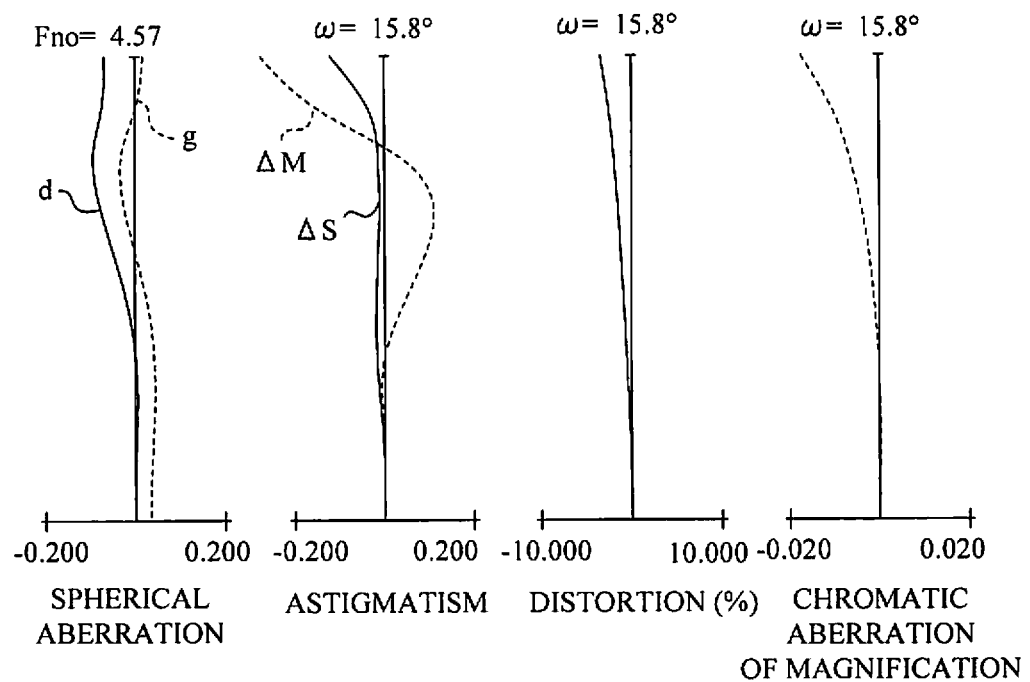
FIGS. 30A and 30B are longitudinal and lateral aberration charts of the optical system of Embodiment 7 at the middle focal length in a middle object distance in-focus state.
Figure 30B:
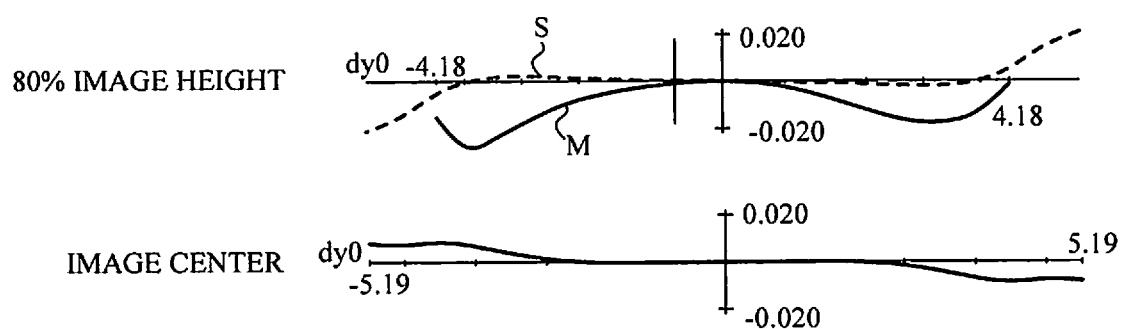

FIGS. 27A and 27B are longitudinal aberration charts of the optical system of Embodiment 7 at the wide-angle end and at a telephoto end in an infinite object distance in-focus state. FIGS. 28A and 28B are longitudinal and lateral aberration charts of the optical system of Embodiment 7 at a middle focal length in the infinite object distance in-focus state. FIGS. 29A and 29B are longitudinal and lateral aberration charts of the optical system of Embodiment 7 at the middle focal length in a closest object distance in-focus state. FIGS. 30A and 30B are longitudinal and lateral aberration charts of the optical system of Embodiment 7 at the middle focal length in a middle object distance in-focus state.

Figure 32A:
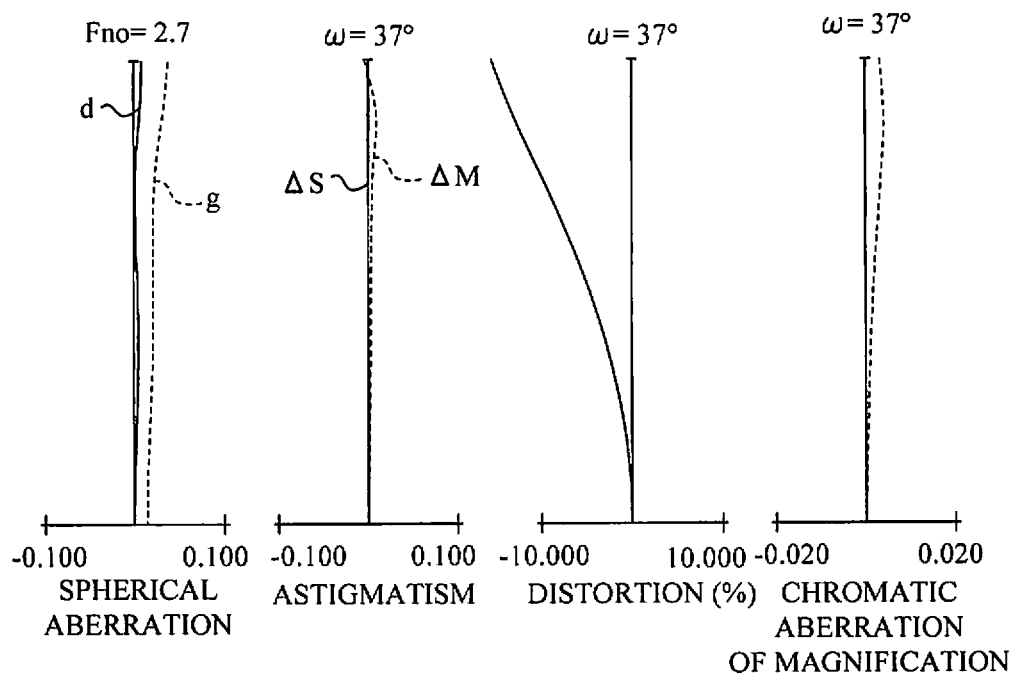
FIGS. 32A and 32B are longitudinal aberration charts of the optical system of Embodiment 8 at the wide-angle end and at a middle focal length in an infinite object distance in-focus state.
Figure 32B:
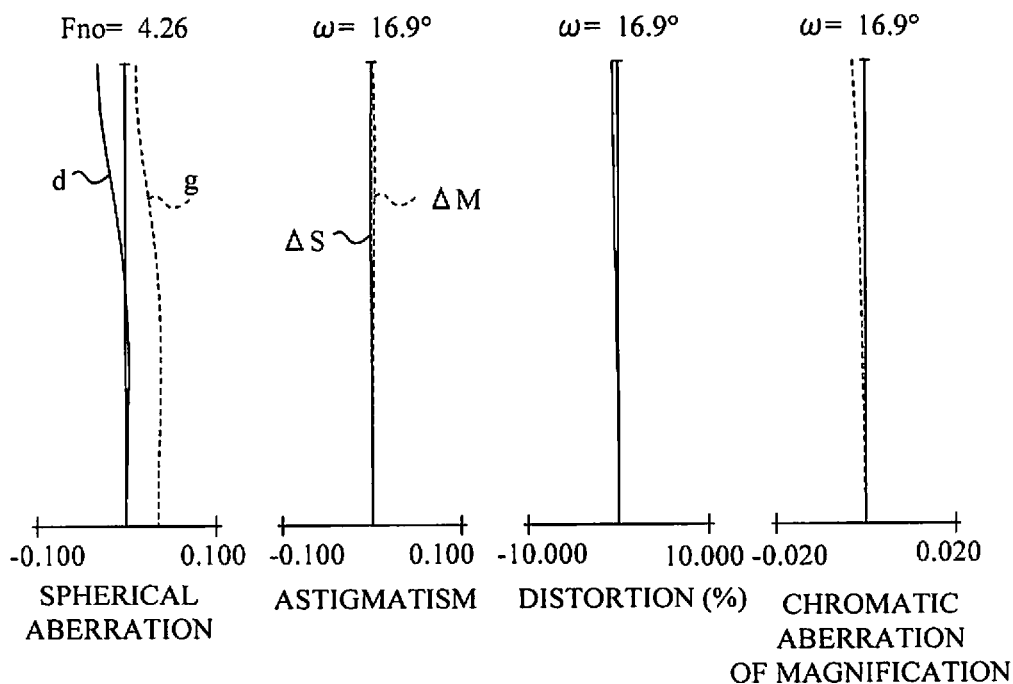
Figure 33A:
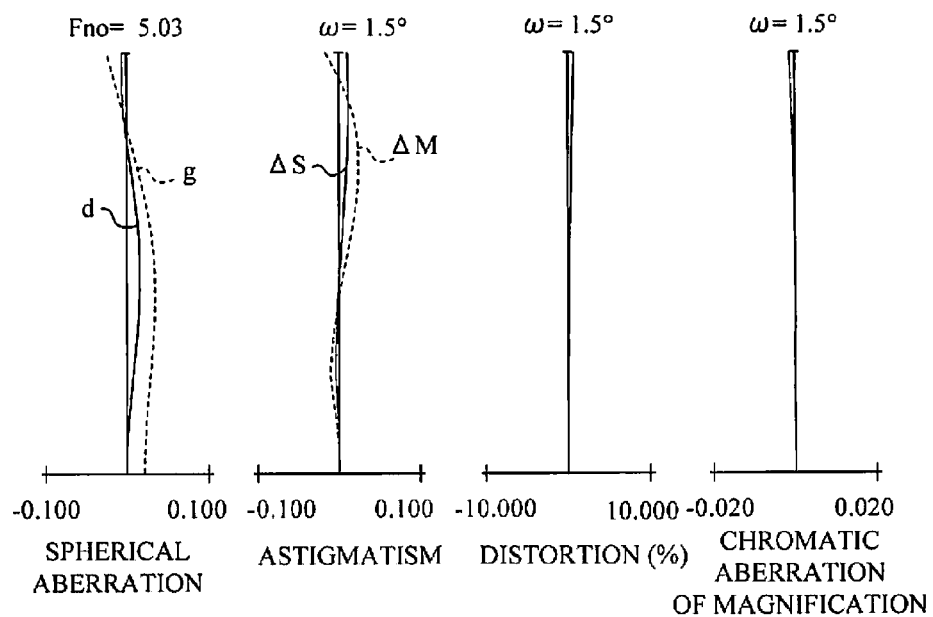
FIGS. 33A and 33B are longitudinal and lateral aberration charts of the optical system of Embodiment 8 at a telephoto end in the infinite object distance in-focus state.
Figure 33B:
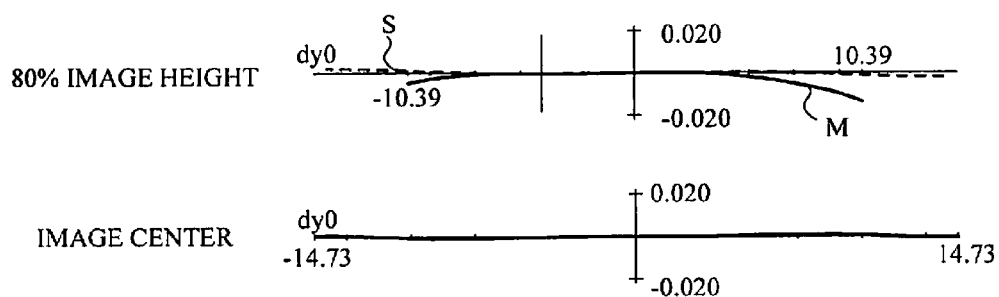
Figure 34A:
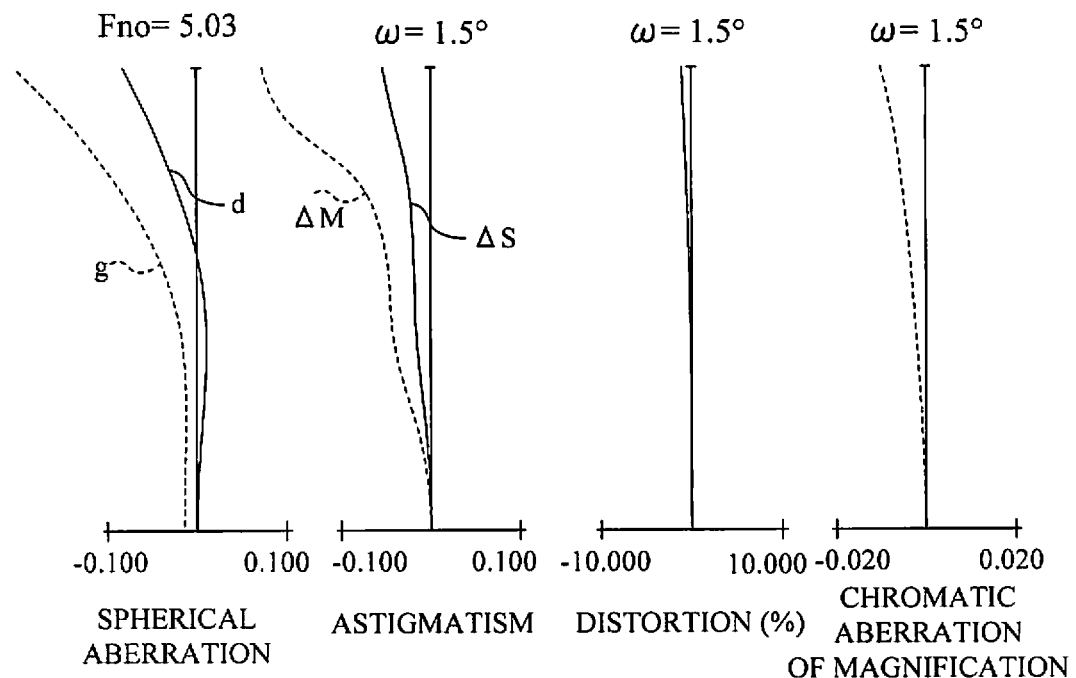
FIGS. 34A and 34B are longitudinal and lateral aberration charts of the optical system of Embodiment 8 at the telephoto end in a closest object distance in-focus state.
Figure 34B:
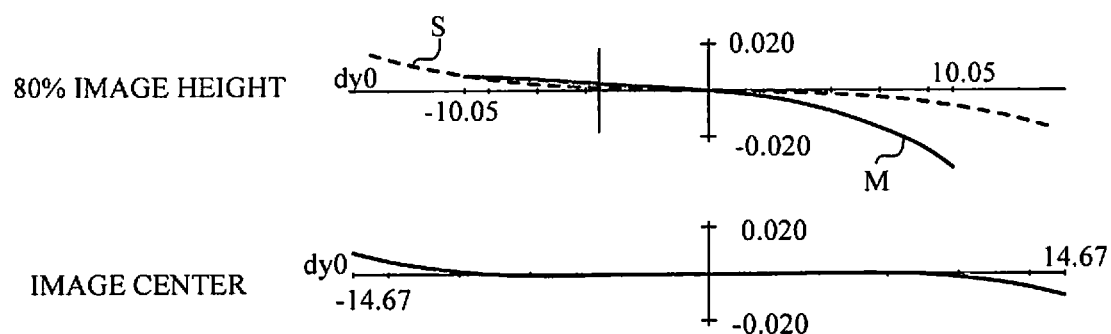
Figure 35A:
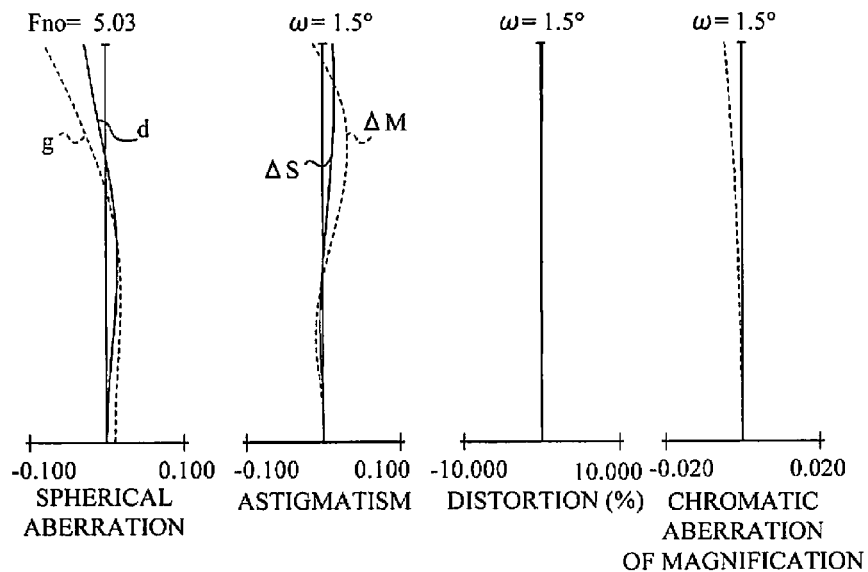
FIGS. 35A and 35B are longitudinal and lateral aberration charts of the optical system of Embodiment 8 at the telephoto end in a middle object distance in-focus state.
Figure 35B:
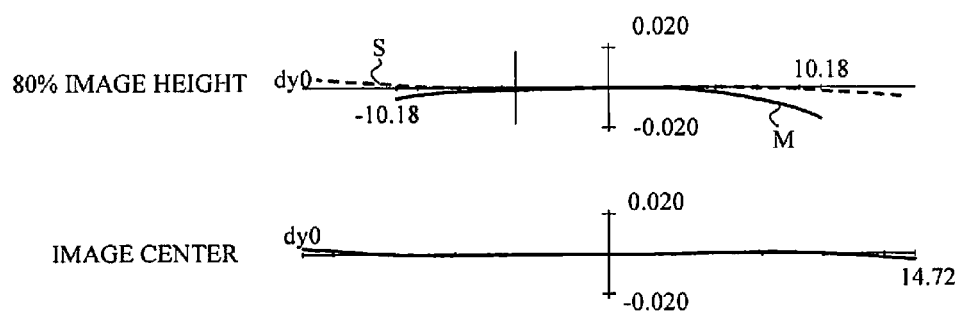

FIGS. 32A and 32B are longitudinal aberration charts of the optical system of Embodiment 8 at the wide-angle end and at a middle focal length in an infinite object distance in-focus state. FIGS. 33A and 33B are longitudinal and lateral aberration charts of the optical system of Embodiment 8 at a telephoto end in the infinite object distance in-focus state. FIGS. 34A and 34B are longitudinal and lateral aberration charts of the optical system of Embodiment 8 at the telephoto end in a closest object distance in-focus state. FIGS. 35A and 35B are longitudinal and lateral aberration charts of the optical system of Embodiment 8 at the telephoto end in a middle object distance in-focus state.

In the sectional views of each embodiment, reference characters L1 to L6 denote first to sixth lens units, reference characters GB denotes a glass block such as an optical filter or a color separation prism, and reference character SP denotes an aperture stop. Moreover, reference character IP denotes an image plane.

In each longitudinal aberration chart, reference characters d and g respectively denote aberration for a d-line and aberration for a g-line. Moreover, reference characters AM and AS respectively denote aberration in a meridional image plane and aberration in a sagittal image plane. In addition, in each lateral aberration chart, reference character S denotes aberration of sagittal rays, and reference character M denotes aberration of meridional rays. The aberration chart of the chromatic aberration of magnification shows chromatic aberration of magnification for the g-line.

The optical system of each embodiment (lens as an image capturing optical system) is designed on a premise that the image restoration process is performed, by using an image restoration filter having filter values corresponding to the aberration of the zoom lens, on an input image produced by image capturing of an object image formed by the optical system through the image sensor. On such a premise, the optical system of each of Embodiments 6 to 8 satisfies the following both conditions (9) and (10). In the conditions (9) and (10), an image height corresponding to 80 percent of a maximum image height of the optical system, that is, an image height from a center of the image sensor (image center) to a peripheral side part thereof corresponding to 80 percent of a size of the image sensor (sensor size) is referred to as "the 80 percent image height". Moreover, among meridional rays passing thorough the zoom lens, an upper ray and a lower lay each passing through a position corresponding to 70 percent of an effective light flux diameter are respectively referred to as "a 70 percent upper ray" and "a 70 percent lower ray". In addition, a middle object distance is defined as (f/dl)×520 where f represents a focal length of the entire optical system, and dl represents a diagonal length of the image sensor. The diagonal length of the image sensor is, more strictly speaking, a diagonal length of an effective image pickup area of the image sensor.

$$1 < |\Delta yum + \Delta ylm| / |\Delta yui + \Delta yli| < 12 \quad (9)$$

$$2 < |(\Delta yum + \Delta ylm)|/2p < 6 \quad (10)$$

In the conditions (9) and (10), $\Delta yum$ represents a lateral aberration amount for the d-line of the 70 percent upper ray reaching the 80 percent image height in the middle object distance in-focus state, $\Delta ylm$ represents a lateral aberration amount for the d-line of the 70 percent lower ray reaching the 80 percent image height in the middle object distance in-focus state, $\Delta yui$ represents a lateral aberration amount for the d-line of the 70 percent upper ray reaching the 80 percent image height in the infinite object distance in-focus state, and $\Delta yli$ represents a lateral aberration amount for the d-line of the 70 percent lower ray reaching the 80 percent image height in the infinite object distance in-focus state, and p represents a pixel pitch of the image sensor.

The conditions (9) and (10) are conditions for providing high quality images over the entire object distance range from the infinite object distance to the closest object distance and downsizing the optical system on a premise that the image restoration is performed.

Variation of the object distance shifts the focal plane (imaging position) from a position of the image sensor (hereinafter referred to as "a sensor position"), and thereby generally a focus lens unit is moved such that the focal plane coincides with the sensor position. However, movement of the focus lens changes relative positional relations thereof with other lens units, which increases variation of aberration, particularly field curvature, with respect to the variation of the object distance.

Moreover, movement of the focus lens from an in-focus position for the infinite object distance to another in-focus position for the closest object distance varies spherical aberration and field curvature, which causes displacement of an axial focal plane and an off-axis focal plane, resulting in image quality deterioration at the sensor position.

Such variation of the field curvature with the variation of the object distance generates a relation that optical correction of the field curvature at a certain object distance increases the field curvature at other object distances. Therefore, conventional optical systems designed without the premise that the image restoration is performed are designed, in order to provide good optical performance over the entire object distance range, so as to equalize (balance) a variation amount of the field curvature while allowing residual variation of the field curvature with the variation of the object distance over the entire object distance range.

Figure 36A:
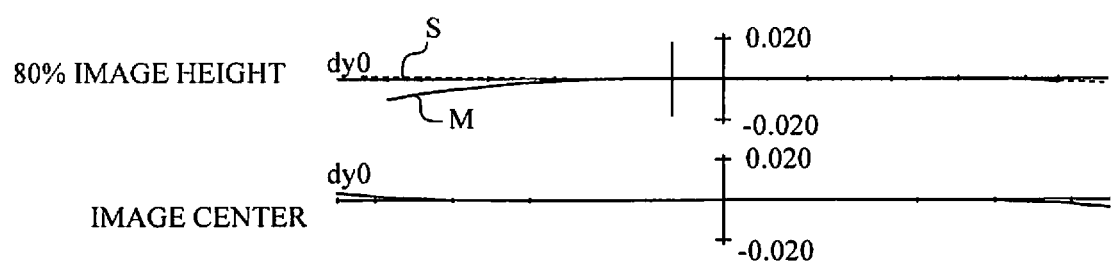
FIGS. 36A and 36B are lateral aberration charts showing aberration generated on a premise that the image restoration process is performed in Embodiments 6 to 8.

In such optical systems having the residual variation of the field curvature, intentionally generating coma aberration makes it possible to correct the variation of the field curvature with the variation of the object distance. Description of this correction method is made with reference to FIGS. 36A and 36B. FIG. 36A is typical lateral aberration charts showing lateral aberration from the infinite object distance in-focus state to the closest object distance in-focus position. In the lateral aberration at the image center shown in FIG. 36A, spherical aberration is smaller than that of general optical systems, so that an image plane where an MTF becomes peak (hereinafter referred to as "an MTF peak image plane") approximately coincides with the focal plane.

Figure 36B:
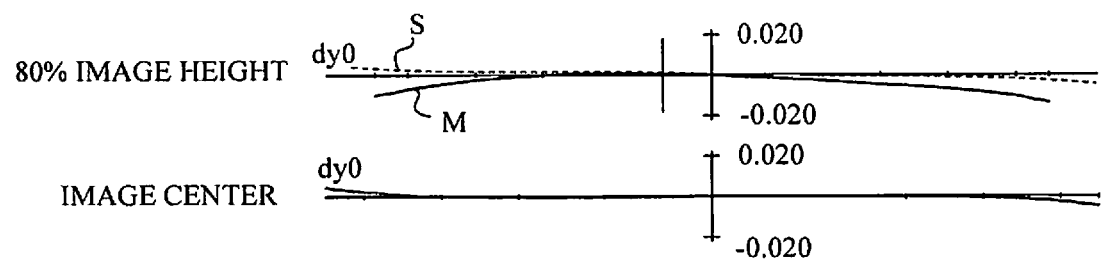

In contrast, at the 80 percent image height, the meridional plane is tilted to the over side, and thus an off-axis MTF peak image plane shifts from an axial MTF peak image plane. This is because, especially, lower rays of the meridional rays are generated in a minus direction. Therefore, as shown in FIG. 36B, generating upper rays of the meridional rays in the minus direction makes it possible to improve a tendency of such over side tilting of the entire meridional image plane.

Although the improvement of the variation of the field curvature is achieved by increase of the coma aberration and thereby resolution is deteriorated, correcting the resolution deterioration (that is, image degradation) by the image restoration enables achievement of good image quality with the improvement of the variation of the field curvature.

As described above, correcting the image degradation due to the generation of the coma aberration by the image restoration can provide an optical system capable of correcting the variation of the field curvature with the variation of the object distance.

The condition (9) limits a ratio of a coma aberration amount in the middle object distance in-focus state and that in the infinite object distance in-focus state. A higher value of the condition (9) than its upper limit excessively increases the coma aberration amount in the middle object distance in-focus state, which causes significant image degradation. On the other hand, a lower value of the condition (9) than its lower limit excessively decreases the coma aberration amount in the middle object distance in-focus state, which undesirably makes it difficult to correct the variation of the field curvature with the variation of the object distance.

It is desirable to change the numerical range of the condition (9) as follows:

$$1 < |\Delta yum + \Delta ylm|/|\Delta yui + \Delta yli| < 10 \quad (9)'$$

The condition (10) relates to improvement in image quality. A lower value of the condition (10) than its lower limit excessively decreases the coma aberration amount, which undesirably makes it difficult to correct the variation of the field curvature with the variation of the object distance. On the other hand, a higher value of the condition (10) than its upper limit excessively increases the coma aberration amount and thereby causes significant image degradation before the image restoration, which makes it impossible to provide a good restored image by the image restoration or which makes it necessary to perform extremely strong image restoration, resulting in increase in noise.

It is desirable to change the numerical range of the condition (10) as follows:

$$2 < |(\Delta yum + \Delta ylm)|/2p < 5 \quad (10)'$$

As mentioned above, in each of Embodiments 6 to 8, the middle object distance is defined as:

$$(f/dl) \times 520$$

where f represents the focal length of the entire optical system, and dl represents the diagonal length of the image sensor. A longer object distance than this middle object distance makes the focal length of the entire optical system excessively large with respect to the diagonal length of the image sensor used in, for example, Embodiment 8. In this case, the middle object distance becomes too long and thereby becomes close to the infinite object distance, which makes it difficult to decrease the variation of the field curvature with the variation of the object distance. On the other hand, a shorter object distance than the above middle object distance makes the focal length of the entire optical system excessively small with respect to the diagonal length of the image sensor used in each of Embodiments 6 and 7. In this case, the middle object distance becomes too short and thereby becomes close to the closest object distance, which also makes it difficult to decrease the variation of the field curvature with the variation of the object distance.

Conventional optical systems are not designed in consideration of generation of appropriate coma aberration for the image restoration like the optical systems of each of Embodiments 6 to 8. In other words, the conventional optical systems are, even if they satisfy any one of or both the conditions (9) and (10) in part of a middle object distance range, merely optical systems whose optical performance is not corrected.

Furthermore, the optical system of each of Embodiments 6 to 8 includes, in order from an object side to an image side, a first lens unit L1 having a positive refractive power and a second lens unit L2 having a positive refractive power.

The optical system of each of Embodiments 6 to 8 can be used for the image pickup apparatus 10 shown in FIG. 20.

Specific numerical examples (Numerical Examples 6 to 8) corresponding to Embodiments 6 to 8 are hereinafter described.

[Embodiment 6]

The optical system of Embodiment 6 (Numerical Example 6) shown in FIG. 21 is constituted by, in order from the object side to the image side, the first lens unit L1 having a positive refractive power, the second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power and the glass block GB. The third lens unit L3 includes the aperture stop SP at its most-image side position. The optical system of this embodiment has a maximum image height of 21.635 mm.

At a position of the image plane IP, a full-size image sensor having a size of 24 mm×36 mm is placed. The image sensor has a pixel pitch of 6.4 μm.

As understood from the longitudinal aberration charts at the wide-angle and telephoto ends in the infinite object distance in-focus state respectively shown in FIGS. 22A and 22B, the aberrations are sufficiently corrected. Moreover, as understood from the lateral aberration charts at the telephoto end in the middle object distance in-focus state, the closest object distance in-focus state and the infinite object distance in-focus state respectively shown in FIGS. 23B, 24B and 25B, the generation of the coma aberration decreases the variation of the field curvature at the telephoto end over the entire object distance range.

Various numerical values of the optical system of Numerical Example 6 are shown below. In the numerical values, ri, di, ndi and vdi denote same values as those in Numerical Examples 1 to 5. Moreover, the aspheric shape is expressed by the above-described expression using R, X, Y and Ai. Table 2 shows relations of Numerical Example 6 and the above-described conditions (9) and (10).

NUMERICAL EXAMPLE 6

Unit mm

Surface data

| Surface No. | r | d | nd | vd | Effective diameter |
|---|---|---|---|---|---|
| 1 | 95.784 | 6.02 | 1.48749 | 70.2 | 56.00 |
| 2 | 737.461 | 0.18 | | | 55.50 |
| 3 | 102.717 | 2.10 | 1.61340 | 44.3 | 53.80 |
| 4 | 45.455 | 9.10 | 1.49700 | 81.5 | 50.97 |
| 5 | 2528.799 | (Variable) | | | 50.29 |
| 6 | −165.094 | 1.20 | 1.83481 | 42.7 | 25.20 |
| 7 | 55.232 | 3.29 | | | 24.32 |
| 8 | −45.986 | 1.20 | 1.63854 | 55.4 | 24.28 |
| 9 | 53.394 | 2.97 | 1.84666 | 23.8 | 24.72 |
| 10 | −414.048 | (Variable) | | | 25.00 |
| 11 | 344.048 | 4.25 | 1.49700 | 81.5 | 25.60 |
| 12 | −42.005 | 0.15 | | | 25.76 |
| 13 | 66.804 | 4.35 | 1.58913 | 61.1 | 25.41 |
| 14 | −42.512 | 1.20 | 1.85026 | 32.3 | 25.09 |
| 15 | −264.354 | 1.00 | | | 24.86 |
| 16 (SP) | ∞ | (Variable) | | | 24.61 |
| 17 | −48.251 | 1.20 | 1.70154 | 41.2 | 23.00 |
| 18 | 40.610 | 3.94 | 1.80518 | 25.4 | 23.66 |
| 19 | −169.835 | (Variable) | | | 23.80 |
| 20 | −249.784 | 2.80 | 1.69680 | 55.5 | 25.20 |
| 21 | −83.232 | 0.15 | | | 25.57 |
| 22 | 181.284 | 5.19 | 1.60311 | 60.6 | 25.75 |
| 23 | −30.728 | 1.25 | 1.84666 | 23.8 | 25.66 |
| 24 | −127.921 | 0.15 | | | 25.87 |
| 25 | 99.327 | 2.35 | 1.77250 | 49.6 | 25.86 |
| 26 | −130.324 | (Variable) | | | 25.60 |
| 27 | 74.930 | 1.20 | 1.88300 | 40.8 | 25.03 |
| 28 | 29.783 | 3.57 | | | 24.31 |
| 29 | −112.308 | 2.85 | 1.80518 | 25.4 | 24.44 |
| 30 | −31.068 | 4.56 | | | 24.80 |
| 31 | −26.035 | 1.25 | 1.88300 | 40.8 | 24.41 |
| 32 | ∞ | 2.75 | | | 25.82 |
| 33 | 56.384 | 3.69 | 1.69895 | 30.1 | 29.16 |
| 34 | 967.801 | (Variable) | | | 29.56 |
| 35 | ∞ | 1.13 | 1.51633 | 64.2 | 50.00 |
| 36 | ∞ | 0.20 | | | 50.00 |
| 37 | ∞ | 0.40 | 1.51633 | 64.2 | 50.00 |
| 38 | ∞ | (Variable) | | | 50.00 |
| IP | ∞ | | | | |

-continued

Unit mm

Various data
Zoom ratio 4.02

|  | Wide | Middle | Tele |
|---|---|---|---|
| Focal length | 72.19 | 135.01 | 290.31 |
| F-number | 4.28 | 4.75 | 5.94 |
| Field angle | 16.68 | 9.10 | 4.26 |
| Image height | 21.64 | 21.64 | 21.64 |
| Entire lens length | 185.42 | 214.97 | 239.40 |
| Back focus | 0.41 | 0.41 | 0.41 |
| d5 | 3.28 | 32.82 | 57.26 |
| d10 | 25.74 | 13.79 | 1.08 |
| d16 | 5.86 | 23.88 | 44.40 |
| d19 | 18.36 | 12.28 | 4.46 |
| d26 | 13.57 | 11.99 | 0.99 |
| d34 | 42.58 | 44.16 | 55.16 |
| d38 | 0.41 | 0.41 | 0.41 |
| Entrance pupil position | 46.11 | 111.44 | 201.54 |
| Exit pupil Position | −91.42 | −101.46 | −118.76 |
| Front principal point | 61.54 | 67.51 | −215.38 |
| Rear principal point | −71.79 | −134.60 | −289.90 |

Lens unit Data

| Unit | Start surface | Focal length | Lens unit length | Front principal point | Rear principal point |
|---|---|---|---|---|---|
| L1 | 1 | 130.99 | 17.40 | 0.81 | −10.78 |
| L2 | 6 | −35.13 | 8.66 | 1.17 | −5.10 |
| L3 | 11 | 52.01 | 10.95 | 2.38 | −5.00 |
| L4 | 17 | −141.89 | 5.14 | −2.20 | −5.16 |
| L5 | 20 | 47.86 | 11.89 | 5.02 | −2.27 |
| L6 | 27 | −51.14 | 19.87 | 3.63 | −12.05 |
| GB | 35 | ∞ | 1.73 | 0.60 | −0.60 |

Single lens data

| Lens | Start surface | Focal length |
|---|---|---|
| 1 | 1 | 225.12 |
| 2 | 3 | −134.81 |
| 3 | 4 | 93.02 |
| 4 | 6 | −49.45 |
| 5 | 8 | −38.51 |
| 6 | 9 | 56.02 |
| 7 | 11 | 75.60 |
| 8 | 13 | 44.76 |
| 9 | 14 | −59.73 |
| 10 | 17 | −31.26 |
| 11 | 18 | 41.05 |
| 12 | 20 | 177.91 |
| 13 | 22 | 43.97 |
| 14 | 23 | −48.05 |
| 15 | 25 | 73.29 |
| 16 | 27 | −56.69 |
| 17 | 29 | 52.52 |
| 18 | 31 | −29.49 |
| 19 | 33 | 85.52 |
| 20 | 35 | 0.00 |
| 21 | 37 | 0.00 |

[Embodiment 7]

The optical system of Embodiment 7 (Numerical Example 7) shown in FIG. 26 is constituted by, in order from the object side to the image side, the first lens unit L1 having a positive refractive power, the second lens unit L2 having a negative refractive power, a third lens unit L3 having a positive refractive power, the aperture stop SP, a fourth lens unit L4 having a positive refractive power and the glass block GB. The optical system of this embodiment has a maximum image height of 13.66 mm. At a position of the image plane IP, an APS-C image sensor having a size of 15.2 mm×22.7 mm is placed. The image sensor has a pixel pitch of 4.3 μm.

As understood from the lateral aberration charts at the middle focal length in the infinite object distance in-focus state, the closest object distance in-focus state and the middle object distance in-focus state respectively shown in FIGS. 28B, 29B and 30B, the generation of the coma aberration decreases the variation of the field curvature at the middle focal length over the entire object distance range.

Various numerical values of the optical system of Numerical Example 7 are shown below. Table 2 shows relations of Numerical Example 7 and the above-described conditions (9) and (10).

NUMERICAL EXAMPLE 7

Unit mm

Surface data

| Surface No. | r | d | nd | vd | Effective diameter |
|---|---|---|---|---|---|
| 1 | 219.691 | 1.98 | 1.84666 | 23.9 | 41.35 |
| 2 | 77.011 | 0.80 |  |  | 38.49 |
| 3 | 110.857 | 2.79 | 1.77250 | 49.6 | 38.45 |
| 4 | −1566.128 | 0.29 |  |  | 37.69 |
| 5 | 57.811 | 3.26 | 1.77250 | 49.6 | 33.00 |
| 6 | 516.857 | (Variable) |  |  | 31.76 |
| 7* | 1449.562 | 1.45 | 1.85400 | 40.4 | 29.52 |
| 8* | 17.597 | 6.32 |  |  | 23.53 |
| 9 | −62.504 | 1.16 | 1.69100 | 54.8 | 23.28 |
| 10 | 79.992 | 0.17 |  |  | 23.14 |
| 11 | 27.282 | 2.67 | 1.94595 | 18.0 | 23.38 |
| 12 | 61.859 | (Variable) |  |  | 22.95 |
| 13* | 15.625 | 3.02 | 1.85135 | 40.1 | 13.31 |
| 14* | 127.225 | 0.37 |  |  | 12.51 |
| 15 | 13.245 | 3.60 | 1.77250 | 49.6 | 11.81 |
| 16 | 2319.692 | 0.70 | 1.80518 | 25.4 | 10.32 |
| 17 | 8.119 | 1.97 |  |  | 8.97 |
| 18 | −1265.485 | 1.74 | 1.48749 | 70.2 | 8.86 |
| 19 | −42.123 | 0.98 |  |  | 8.75 |
| 20 (SP) | ∞ | (Variable) |  |  | 8.53 |
| 21 | ∞ | (Variable) |  |  | 8.72 |
| 22* | 600.625 | 5.12 | 1.58313 | 59.4 | 27.51 |
| 23* | −35.796 | (Variable) |  |  | 28.21 |
| 24 | ∞ | 1.21 | 1.51633 | 64.1 | 58.13 |
| 25 | ∞ | 1.51 |  |  | 58.13 |
| 26 | ∞ | 0.60 | 1.51633 | 64.1 | 58.13 |
| 27 | ∞ | (Variable) |  |  | 58.13 |
| IP | ∞ |  |  |  |  |

Aspheric data

7th surface

K = 7.95128e+003      A4 = −8.46681e−006      A6 = 1.45376e−008

8th surface

K = 3.72976e−001      A4 = −1.13801e−005      A6 = −4.49670e−009
A8 = −4.98598e−010    A10 = 1.72434e−012

13th surface

K = −2.06246e−001     A4 = −1.23394e−005      A6 = 1.79103e−007
A8 = −4.52541e−009    A10 = 2.60955e−011

14th surface

K = −5.86105e+001     A4 = 8.28096e−006       A6 = 1.05159e−007
A8 = −2.30730e−009

22nd surface

K = 1.81624e+003      A4 = −1.28722e−005      A6 = 2.00678e−007
A8 = −8.68491e−010

-continued

Unit mm

23rd surface

K = 1.08981e+000  A4 = −2.12065e−005  A6 = 2.34886e−007
A8 = −9.22692e−010  A10 = 3.32500e−013

Various data
Zoom ratio 3.81

|  | Wide | Middle | Tele |
|---|---|---|---|
| Focal length | 18.03 | 47.42 | 68.66 |
| F-number | 2.88 | 4.57 | 5.94 |
| Field angle | 33.69 | 15.83 | 11.25 |
| Image height | 12.02 | 13.45 | 13.66 |
| Entire lens length | 87.58 | 100.81 | 110.99 |
| Back focus | 2.34 | 2.34 | 2.34 |
| d6 | 1.10 | 14.03 | 20.22 |
| d12 | 23.85 | 6.03 | 0.99 |
| d20 | 0.77 | 2.42 | 16.50 |
| d21 | 11.46 | 29.23 | 23.11 |
| d23 | 6.32 | 5.03 | 6.09 |
| d27 | 2.34 | 2.34 | 2.34 |
| Entrance pupil position | 28.04 | 50.51 | 65.42 |
| Exit pupil Position | −29.96 | −94.15 | −169.72 |
| Front principal point | 36.01 | 74.62 | 106.68 |
| Rear principal point | −15.69 | −45.08 | −66.32 |

Lens unit Data

| Unit | Start surface | Focal length | Lens unit length | Front principal point | Rear principal point |
|---|---|---|---|---|---|
| L1 | 1 | 81.28 | 9.10 | 3.63 | −1.92 |
| L2 | 7 | −20.76 | 11.78 | 0.97 | −8.20 |
| L3 | 13 | 23.78 | 12.40 | −5.10 | −12.01 |
| FC | 21 | ∞ | 0.00 | 0.00 | −0.00 |
| L4 | 22 | 58.11 | 5.12 | 3.06 | −0.18 |
| GB | 24 | ∞ | 3.32 | 1.35 | −1.35 |

Single lens data

| Lens | Start surface | Focal length |
|---|---|---|
| 1 | 1 | −140.95 |
| 2 | 3 | 134.11 |
| 3 | 5 | 84.00 |
| 4 | 7 | −20.87 |
| 5 | 9 | −50.61 |
| 6 | 11 | 49.73 |
| 7 | 13 | 20.67 |
| 8 | 15 | 17.23 |
| 9 | 16 | −10.12 |
| 10 | 18 | 89.34 |
| 11 | 22 | 58.11 |
| 12 | 24 | 0.00 |
| 13 | 26 | 0.00 |

[Embodiment 8]

The optical system of Embodiment 8 (Numerical Example 8) shown in FIG. 31 is constituted by, in order from the object side to the image side, the first lens unit L1 having a positive refractive power, the second lens unit L2 having a negative refractive power, the aperture stop SP, a third lens unit L3 having a positive refractive power, a fourth lens unit L4 having a negative refractive power, a fifth lens unit L5 having a positive refractive power and the glass block GB. The optical system of this embodiment has a maximum image height of 3.875 mm. At a position of the image plane IP, a 1/2.3″-type image sensor having a size of 4.65 mm×6.2 mm is placed. The image sensor has a pixel pitch of 1.4 μm.

As understood from the longitudinal aberration charts at the wide-angle end and the middle focal length in the infinite object distance in-focus state respectively shown in FIGS. 32A and 32B, the aberrations are sufficiently corrected. Moreover, as understood from the lateral aberration charts at the telephoto end in the infinite object distance in-focus state, the closest object distance in-focus state and the middle object distance in-focus state respectively shown in FIGS. 33B, 34B and 35B, the generation of the coma aberration decreases the variation of the field curvature at the telephoto end over the entire object distance range.

Various numerical values of the optical system of Numerical Example 8 are shown below. Table 2 shows relations of Numerical Example 8 and the above-described conditions (9) and (10).

NUMERICAL EXAMPLE 8

Unit mm

Surface data

| Surface No. | r | d | nd | vd | Effective diameter |
|---|---|---|---|---|---|
| 1 | 112.067 | 1.80 | 1.80610 | 33.3 | 39.40 |
| 2 | 52.885 | 5.03 | 1.49700 | 81.5 | 35.90 |
| 3 | −218.600 | 0.18 |  |  | 35.80 |
| 4 | 45.553 | 3.22 | 1.59282 | 68.6 | 34.70 |
| 5 | 131.490 | (Variable) |  |  | 34.20 |
| 6 | 120.679 | 0.95 | 1.88300 | 40.8 | 19.70 |
| 7 | 8.615 | 4.92 |  |  | 14.10 |
| 8 | −34.305 | 0.70 | 1.77250 | 49.6 | 13.90 |
| 9 | 28.642 | 0.20 |  |  | 13.80 |
| 10 | 16.947 | 2.30 | 1.92286 | 18.9 | 14.10 |
| 11 | 89.165 | (Variable) |  |  | 13.80 |
| 12 (SP) | ∞ | (Variable) |  |  | 6.68 |
| 13* | 9.778 | 4.30 | 1.55332 | 71.7 | 9.50 |
| 14* | −74.715 | 1.67 |  |  | 9.50 |
| 15 | 38.527 | 0.50 | 1.64769 | 33.8 | 9.00 |
| 16 | 10.092 | 0.37 |  |  | 9.00 |
| 17 | 13.822 | 0.50 | 1.80400 | 46.6 | 9.00 |
| 18 | 8.013 | 2.11 | 1.48749 | 70.2 | 9.00 |
| 19 | −31.006 | (Variable) |  |  | 8.31 |
| 20 | −564.447 | 0.70 | 1.48749 | 70.2 | 8.60 |
| 21 | 26.449 | (Variable) |  |  | 8.70 |
| 22 | 20.740 | 2.25 | 1.78590 | 44.2 | 11.80 |
| 23 | −55.591 | 1.26 | 1.94595 | 18.0 | 11.70 |
| 24 | −1698.441 | (Variable) |  |  | 11.60 |
| 25 | ∞ | 0.30 | 1.51633 | 64.1 | 20.00 |
| 26 | ∞ | 0.47 |  |  | 20.00 |
| 27 | ∞ | 0.50 | 1.51633 | 64.1 | 20.00 |
| 28 | ∞ | (Variable) |  |  | 20.00 |
| IP | ∞ |  |  |  |  |

Aspheric data

13th surface

K = −5.29634e−001  A4 = −2.26010e−005  A6 = 1.07748e−007
A8 = −2.96223e−008  A10 = 7.23156e−010

14th surface

K = −2.41360e+002  A4 = −2.87477e−005  A6 = 3.05881e−007

Various data
Zoom ratio 33.54

|  | Wide | Middle | Tele |
|---|---|---|---|
| Focal length | 4.42 | 12.77 | 148.25 |
| F-number | 2.70 | 4.26 | 5.03 |
| Field angle | 37.01 | 16.88 | 1.50 |
| Image height | 3.33 | 3.88 | 3.88 |
| Entire lens length | 94.78 | 94.62 | 138.53 |
| Back focus | 0.53 | 0.53 | 0.53 |
| d5 | 0.92 | 17.42 | 62.79 |
| d11 | 31.72 | 17.57 | 1.27 |
| d12 | 12.69 | 0.50 | 3.21 |

-continued

Unit mm

| | | | |
|---|---|---|---|
| d19 | 2.68 | 3.23 | 2.48 |
| d21 | 3.22 | 5.67 | 24.20 |
| d24 | 8.78 | 15.48 | 9.83 |
| d28 | 0.53 | 0.53 | 0.53 |
| Entrance pupil position | 18.62 | 47.44 | 564.42 |
| Exit pupil Position | −5771.10 | −49.53 | 129.32 |
| Front principal point | 23.04 | 56.95 | 883.31 |
| Rear principal point | −3.89 | −12.24 | −147.72 |

Lens unit Data

| Unit | Start surface | Focal length | Lens unit length | Front principal point | Rear principal point |
|---|---|---|---|---|---|
| L1 | 1 | 82.06 | 10.23 | 2.82 | −3.76 |
| L2 | 6 | −9.87 | 9.07 | 0.74 | −6.39 |
| SP | 12 | ∞ | 0.00 | 0.00 | −0.00 |
| L3 | 13 | 18.85 | 9.45 | −0.20 | −7.09 |
| L4 | 20 | −51.81 | 0.70 | 0.45 | −0.02 |
| L5 | 22 | 28.04 | 3.51 | −0.07 | −1.98 |
| GB | 25 | ∞ | 1.27 | 0.50 | −0.50 |

Single lens data

| Lens | Start surface | Focal length |
|---|---|---|
| 1 | 1 | −125.94 |
| 2 | 2 | 86.21 |
| 3 | 4 | 115.95 |
| 4 | 6 | −10.55 |
| 5 | 8 | −20.11 |
| 6 | 10 | 22.33 |
| 7 | 13 | 15.92 |
| 8 | 15 | −21.26 |
| 9 | 17 | −24.66 |
| 10 | 18 | 13.30 |
| 11 | 20 | −51.81 |
| 12 | 22 | 19.47 |
| 13 | 23 | −60.78 |
| 14 | 25 | 0.00 |
| 15 | 27 | 0.00 |

TABLE 2

| | Numerical Example 6 | Numerical Example 7 | Numerical Example 8 |
|---|---|---|---|
| Condition (9) | 9.9 | 1.9 | 1.3 |
| Condition (10) | 2.9 | 4.1 | 2.6 |

Each of Embodiments 6 to 8 can achieve a compact optical system capable of improving image quality with generating appropriate aberration for the image restoration. Performing image capturing using this optical system and then performing the image restoration process can achieve a compact image pickup apparatus capable of providing high quality images.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2012-160421 and 2012-160422, filed on Jul. 19, 2013, which are hereby incorporated by reference herein in their entirety.

What is claimed is:

1. An optical system capable of performing variation of magnification, the optical system comprising in order from an object side to an image side:
a first lens unit; and
a second lens unit, at least one of the first and second lens units being moved during the variation of magnification,
wherein the optical system forms an optical image on an image sensor provided in an image pickup apparatus, and
wherein the optical system satisfies the following conditions:

$|(\Delta TMyu+\Delta TMyl)/(\Delta WMyu+\Delta WMyl)|<0.67$ $0.75<|(\Delta WMyu+\Delta WMyl)|/2P<16.0$ where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and, among meridional rays passing through the optical system, an upper ray and a lower lay each passing through a position corresponding to 70 percent of an effective light flux diameter are respectively referred to as a 70 percent upper ray and a 70 percent lower ray,
$\Delta WMyu$ represents a lateral aberration amount for a d-line of the 70 percent upper ray reaching the 80 percent image height at the wide-angle side middle focal length,
$\Delta WMyl$ represents a lateral aberration amount for the d-line of the 70 percent lower ray reaching the 80 percent image height at the wide-angle side middle focal length,
$\Delta TMyu$ represents a lateral aberration amount for the d-line of the 70 percent upper ray reaching the 80 percent image height at the telephoto side middle focal length,
$\Delta TMyl$ represents a lateral aberration amount for the d-line of the 70 percent lower ray reaching the 80 percent image height at the telephoto side middle focal length,
P represents a pixel pitch of the image sensor, and
when fw represents a focal length of the optical system at the wide-angle end, ft represents a focal length of the optical system at the telephoto end, and fm=√(fw×ft),
the wide-angle side middle focal length fwm is expressed as fwm=√(fw×fm), and
the telephoto side middle focal length ftm is expressed as ftm=√(fm×ft).

2. An optical system according to claim 1, wherein the first lens unit has a positive refractive power, and the second lens unit has a negative refractive power.

3. An optical system according to claim 2, wherein the optical system satisfies the following condition:

$0.30<f1/ft<1.20$ $-0.20<f2/ft<-0.03$ where f1 represents a focal length of the first lens unit, and f2 represents a focal length of the second lens unit.

4. An optical system according to claim 1, wherein the first lens unit has a negative refractive power, and the second lens unit has a positive refractive power.

5. An optical system according to claim 4, wherein the optical system satisfies the following conditions:

$-1.20<f1/ft<-0.30$ $0.20<f2/ft<1.10$ where f1 represents a focal length of the first lens unit, and f2 represents a focal length of the second lens unit.

6. An image pickup apparatus comprising:
   an image sensor photoelectrically converting an object image formed by an optical system; and
   an image processor configured to perform an image restoration process on an input image input from the image sensor by using an image restoration filter having filter values corresponding to aberration of the optical system,
   wherein the optical system is capable of performing variation of magnification and comprises, in order from an object side to an image side, a first lens unit and a second lens unit, at least one of the first and second lens units being moved during the variation of magnification, and
   wherein the optical system satisfies the following conditions:

$|(\Delta TMyu+\Delta TMyl)/(\Delta WMyu+\Delta WMyl)|<0.67$ $0.75<|(\Delta WMyu+\Delta WMyl)|/2P<16.0$ where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and, among meridional rays passing through the optical system, an upper ray and a lower lay each passing through a position corresponding to 70 percent of an effective light flux diameter are respectively referred to as a 70 percent upper ray and a 70 percent lower ray,
   ΔWMyu represents a lateral aberration amount for a d-line of the 70 percent upper ray reaching the 80 percent image height at the wide-angle side middle focal length,
   ΔWMyl represents a lateral aberration amount for the d-line of the 70 percent lower ray reaching the 80 percent image height at the wide-angle side middle focal length,
   ΔTMyu represents a lateral aberration amount for the d-line of the 70 percent upper ray reaching the 80 percent image height at the telephoto side middle focal length,
   ΔTMyl represents a lateral aberration amount for the d-line of the 70 percent lower ray reaching the 80 percent image height at the telephoto side middle focal length,
   P represents a pixel pitch of the image sensor, and
   when fw represents a focal length of the optical system at the wide-angle end, ft represents a focal length of the optical system at the telephoto end, and fm=√(fw×ft),
   the wide-angle side middle focal length fwm is expressed as fwm=√(fw×fm), and
   the telephoto side middle focal length ftm is expressed as ftm=√(fm×ft).

7. An optical system capable of performing variation of magnification, the optical system comprising in order from an object side to an image side:
   a first lens unit; and
   a second lens unit, at least one of the first and second lens units being moved during the variation of magnification,
   wherein the optical system forms an optical image on an image sensor provided in an image pickup apparatus, and
   wherein the optical system satisfies the following conditions:

$Stm/Swm<0.67$ $0.75<Swm/2P<16.0$ where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and a diameter of a spot formed by a light flux included in an area up to 70 percent of an effective light flux diameter in a point image intensity distribution of a d-line at a position where an MTF in a meridional direction for the d-line passing through the optical system and then reaching the 80 percent image height becomes peak is referred to as a 70 percent spot diameter,
   Swm represents the 70 percent spot diameter at the wide-angle side middle focal length,
   Stm represents the 70 percent spot diameter at the telephoto side middle focal length,
   P represents a pixel pitch of the image sensor, and
   when fw represents a focal length of the optical system at the wide-angle end, ft represents a focal length of the optical system at the telephoto end, and fm=√(fw×ft),
   the wide-angle side middle focal length fwm is expressed as fwm=√(fw×fm), and
   the telephoto side middle focal length ftm is expressed as ftm=√(fm×ft).

8. An optical system according to claim 7, wherein the first lens unit has a positive refractive power, and the second lens unit has a negative refractive power.

9. An optical system according to claim 8, wherein the optical system satisfies the following conditions:

$0.30<f1/ft<1.20$ $-0.20<f2/ft<-0.03$ where f1 represents a focal length of the first lens unit, and f2 represents a focal length of the second lens unit.

10. An optical system according to claim 7, wherein the first lens unit has a negative refractive power, and the second lens unit has a positive refractive power.

11. An optical system according to claim 10, wherein the optical system satisfies the following condition:

$-1.20<f1/ft<-0.30$ $0.20<f2/ft<1.10$ where f1 represents a focal length of the first lens unit, and f2 represents a focal length of the second lens unit.

12. An image pickup apparatus comprising:
   an image sensor photoelectrically converting an object image formed by an optical system; and
   an image processor configured to perform an image restoration process on an input image input from the image sensor by using an image restoration filter having filter values corresponding to aberration of the optical system,
   wherein the optical system is capable of performing variation of magnification and comprises, in order from an object side to an image side, a first lens unit and a second lens unit, at least one of the first and second lens units being moved during the variation of magnification, and
   wherein the optical system satisfies the following conditions:

$Stm/Swm<0.67$ $0.75<Swm/2P<16.0$ where, when a middle focal length closer to a wide-angle end of the optical system than to a telephoto end thereof is referred to as a wide-angle side middle focal length, another middle focal length closer to the telephoto end than to the wide-angle end is referred to as a telephoto side middle focal length, an image height corresponding to 80 percent of a maximum image height of the optical system is referred to as an 80 percent image height, and a diameter of a spot formed by a light flux included in an area up to 70 percent of an effective light flux diameter in a point image intensity distribution of a d-line at a position where an MTF in a meridional direction for the d-line passing through the optical system and then reaching the 80 percent image height becomes peak is referred to as a 70 percent spot diameter, Swm represents the 70 percent spot diameter at the wide-angle side middle focal length, Stm represents the 70 percent spot diameter at the telephoto side middle focal length, P represents a pixel pitch of the image sensor, and when fw represents a focal length of the optical system at the wide-angle end, ft represents a focal length of the optical system at the telephoto end, and $fm=\sqrt{(fw \times ft)}$, the wide-angle side middle focal length fwm is expressed as $fwm=\sqrt{(fw \times fm)}$, and the telephoto side middle focal length ftm is expressed as $ftm=\sqrt{(fm \times ft)}$.

13. An optical system capable of focusing on various object distances, the optical system comprising:

a focus lens unit movable for focusing; and another lens unit, wherein the optical system forms an optical image on an image sensor provided in an image pickup apparatus, and wherein the optical system satisfies the following conditions in a case where an image restoration process is performed on an input image input from the image sensor by using an image restoration filter having filter values corresponding to aberration of the optical system:

$$1 < |\Delta yum + \Delta ylm| / |\Delta yui + \Delta yli| < 12$$

$$2 < |(\Delta yum + \Delta ylm)| / 2p < 6$$

where, when an image height corresponding to 80 percent of a maximum image height of the optical system is referred to as an 80 percent image height, and, among meridional rays passing thorough the optical system, an upper ray and a lower lay each passing through a position corresponding to 70 percent of an effective light flux diameter are respectively referred to as a 70 percent upper ray and a 70 percent lower ray, Δyum represents a lateral aberration amount for a d-line of the 70 percent upper ray reaching the 80 percent image height in a state where the optical system is focused on the middle object distance, Δylm represents a lateral aberration amount for the d-line of the 70 percent lower ray reaching the 80 percent image height in the state where the optical system is focused on the middle object distance, Δyui represents a lateral aberration amount for the d-line of the 70 percent upper ray reaching the 80 percent image height in a state where the optical system is focused on an infinite object distance, Δyli represents a lateral aberration amount for the d-line of the 70 percent lower ray reaching the 80 percent image height in the state where the optical system is focused on the infinite object distance, and p represents a pixel pitch of the image sensor, and when f represents a focal length of the entire optical system, and dl represents a diagonal length of the image sensor, the middle object distance is defined as (f/dl)×520.

14. An optical system according to claim 13, wherein the optical system includes a first lens unit having a positive refractive power, and a second lens unit having a negative refractive power.

15. An image pickup apparatus comprising:

an image sensor photoelectrically converting an object image formed by an optical system; and an image processor configured to perform an image restoration process on an input image input from the image sensor by using an image restoration filter having filter values corresponding to aberration of the optical system, wherein the optical system is capable of focusing on various object distances and comprises a focus lens unit movable for focusing and another lens unit, and wherein the optical system satisfies the following condition:

$$1 < |\Delta yum + \Delta ylm| / |\Delta yui + \Delta yli| < 12$$

$$2 < |(\Delta yum + \Delta ylm)| / 2p < 6$$

where, when an image height corresponding to 80 percent of a maximum image height of the optical system is referred to as an 80 percent image height, and, among meridional rays passing thorough the optical system, an upper ray and a lower lay each passing through a position corresponding to 70 percent of an effective light flux diameter are respectively referred to as a 70 percent upper ray and a 70 percent lower ray, Δyum represents a lateral aberration amount for a d-line of the 70 percent upper ray reaching the 80 percent image height in a state where the optical system is focused on the middle object distance, Δylm represents a lateral aberration amount for the d-line of the 70 percent lower ray reaching the 80 percent image height in the state where the optical system is focused on the middle object distance, Δyui represents a lateral aberration amount for the d-line of the 70 percent upper ray reaching the 80 percent image height in a state where the optical system is focused on an infinite object distance, Δyli represents a lateral aberration amount for the d-line of the 70 percent lower ray reaching the 80 percent image height in the state where the optical system is focused on the infinite object distance, and p represents a pixel pitch of the image sensor, and when f represents a focal length of the entire optical system, and dl represents a diagonal length of the image sensor, the middle object distance is defined as (f/dl)×520.

* * * * *